FIG_2n

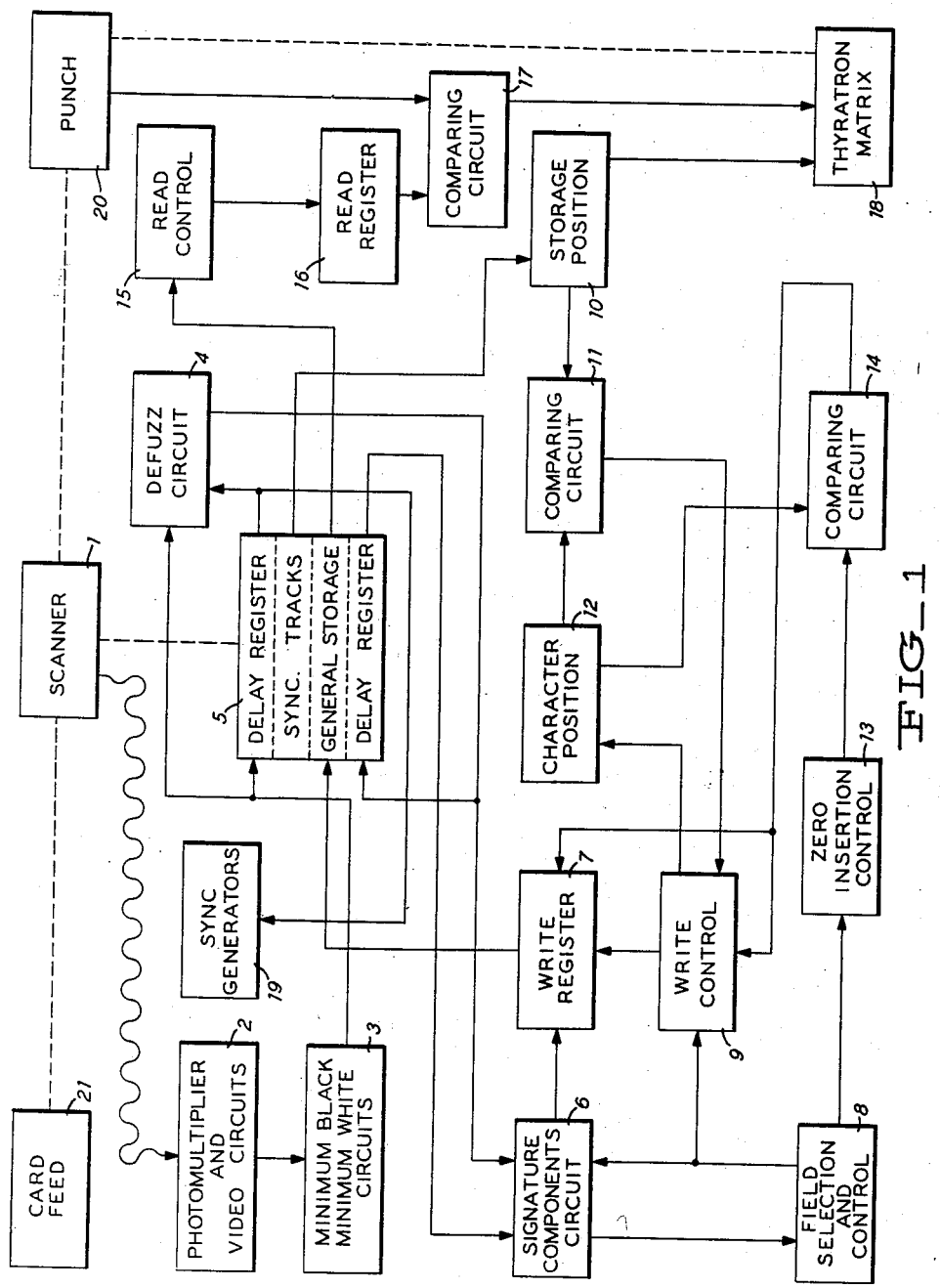
FIG_1

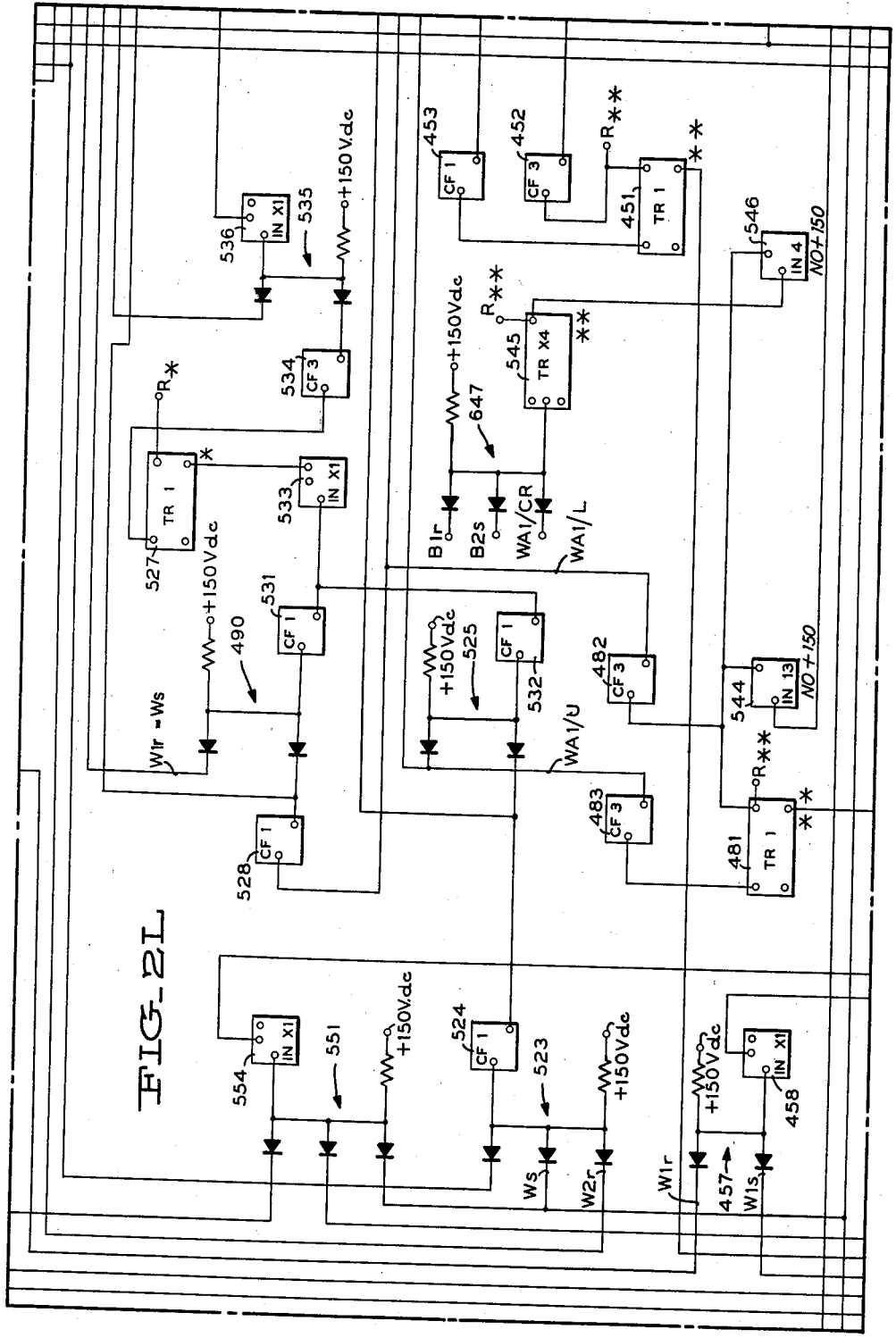
FIG_2L

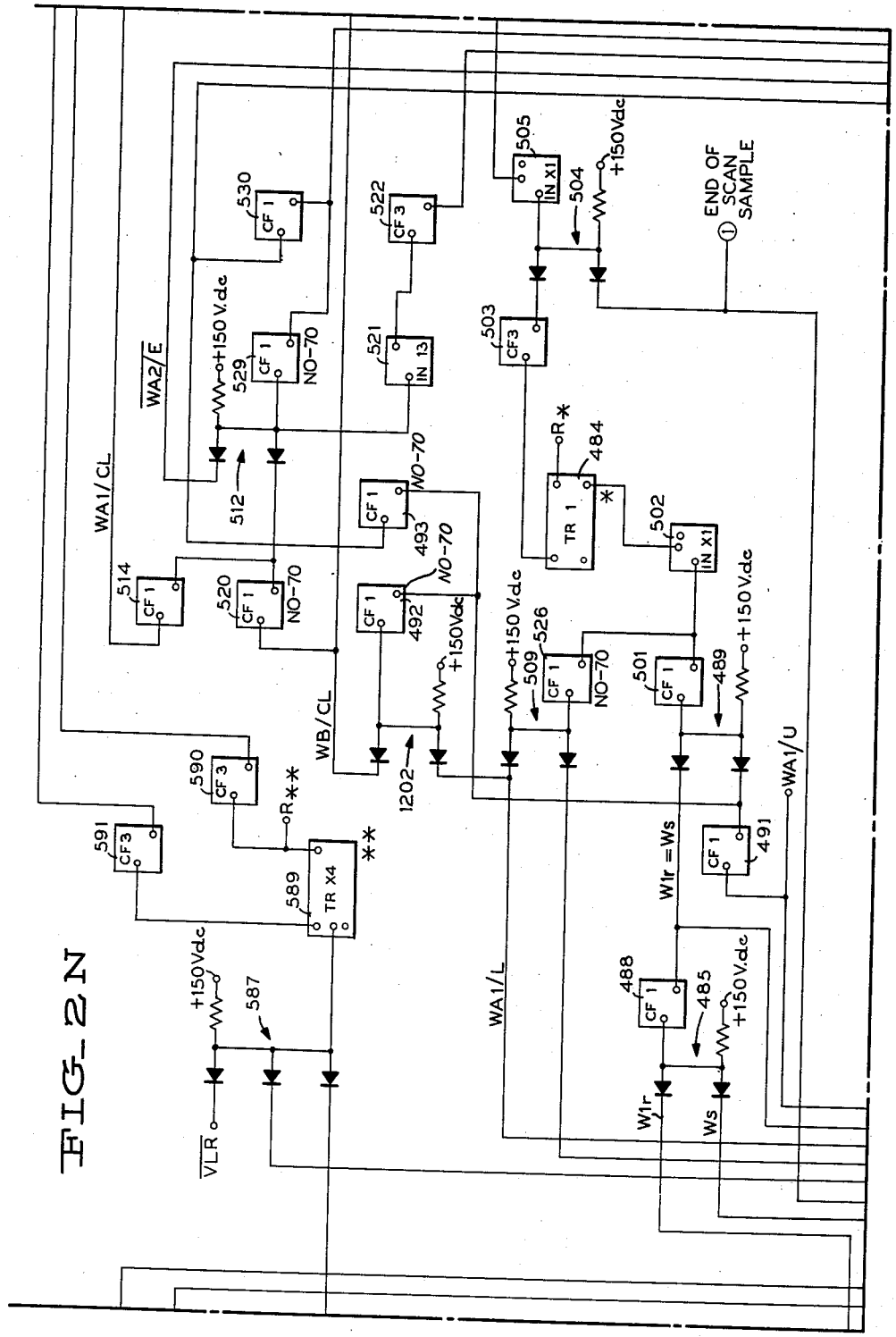

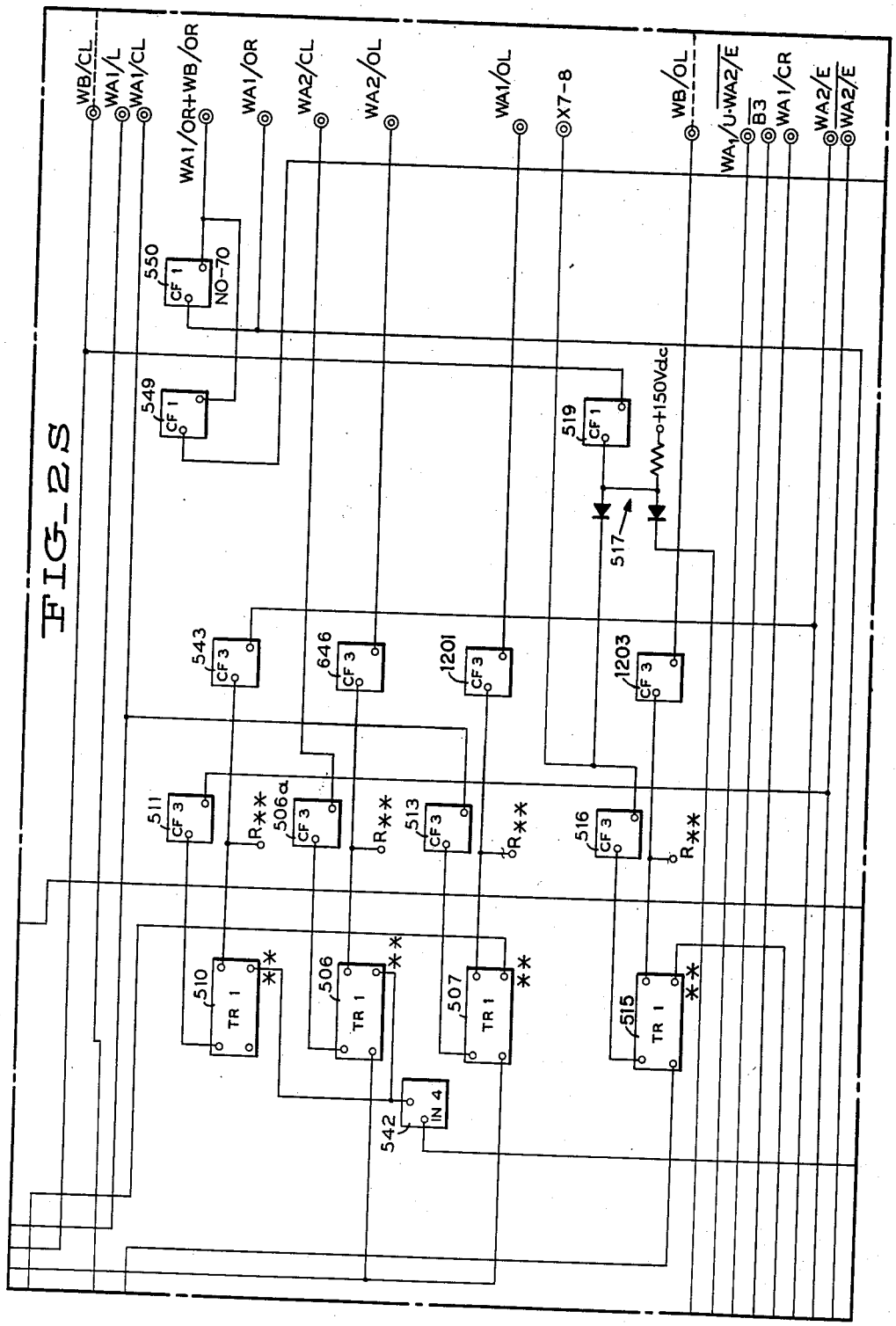

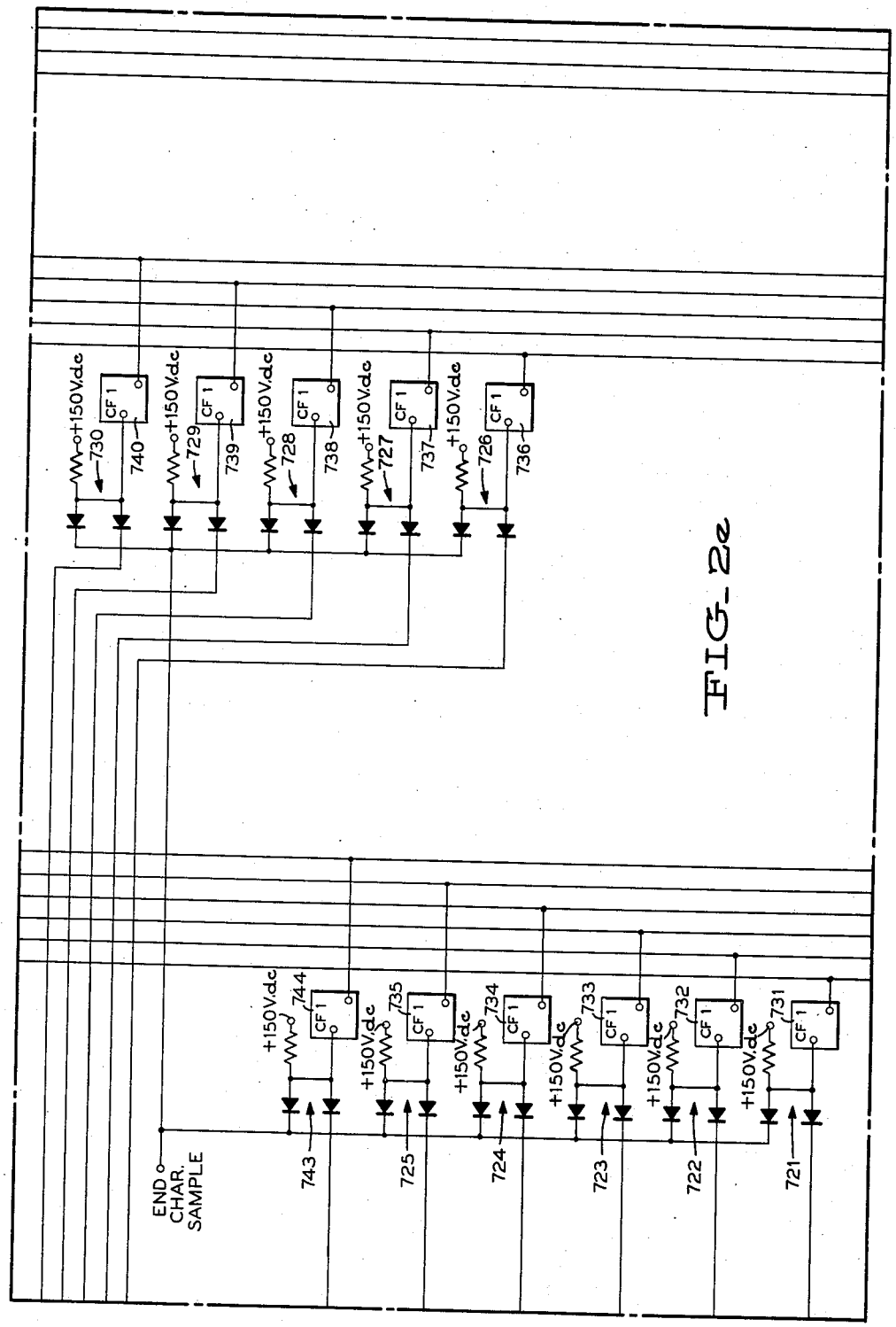

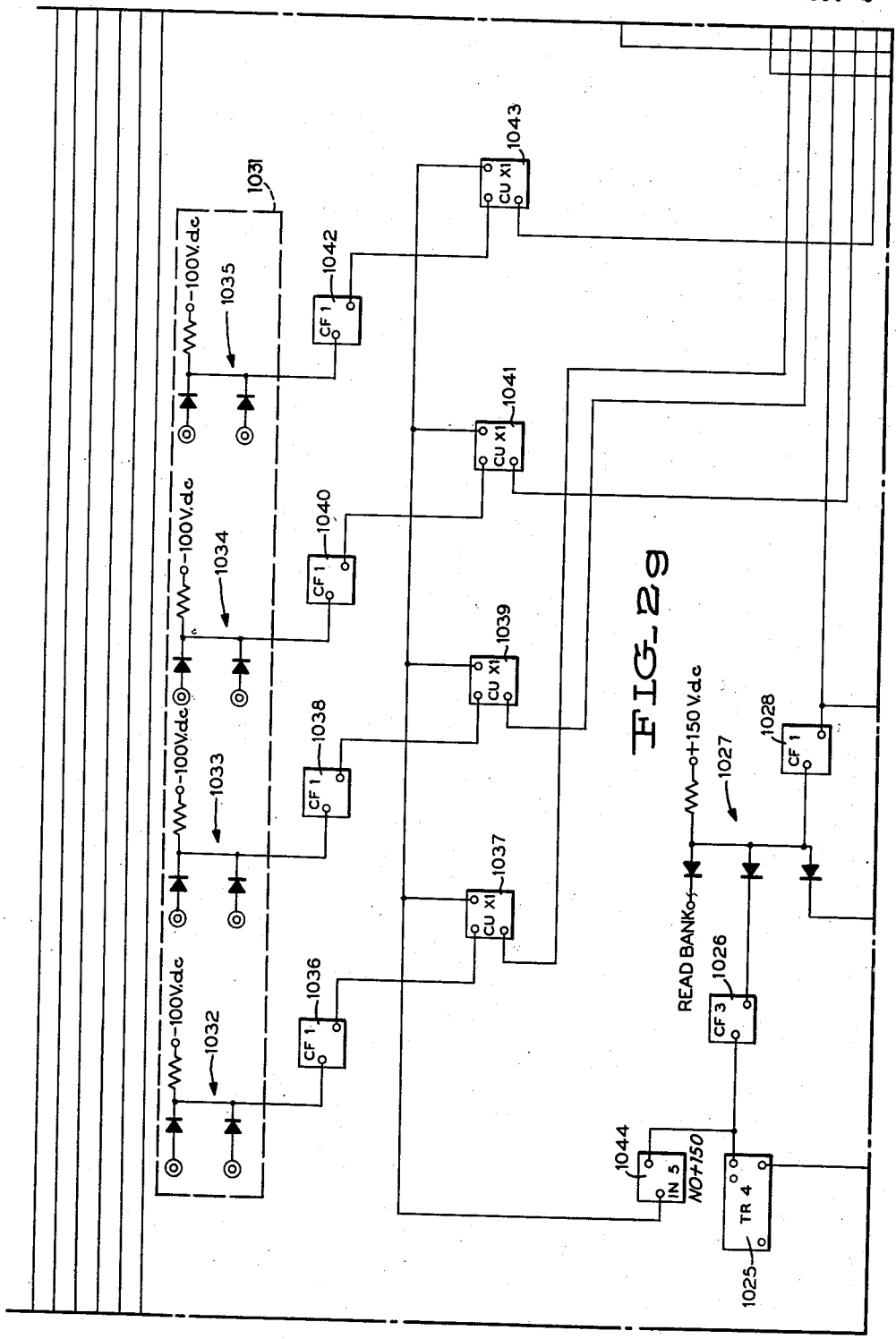
FIG_29

Dec. 6, 1960

F. M. DEMER ET AL 2,963,683

CHARACTER SENSING SYSTEM

Filed Dec. 31, 1956

| FIG. 2A | FIG. 2D | FIG. 2G | FIG. 2K | FIG. 2N | FIG. 2R | FIG. 2a | FIG. 2d | FIG. 2g | FIG. 2j | FIG. 2n |
| FIG. 2B | FIG. 2E | FIG. 2H | FIG. 2L | FIG. 2P | FIG. 2S | FIG. 2b | FIG. 2e | FIG. 2h | FIG. 2k | FIG. 2p |
| FIG. 2C | FIG. 2F | FIG. 2J | FIG. 2M | FIG. 2Q | FIG. 2T | FIG. 2c | FIG. 2f | FIG. 2i | FIG. 2m | FIG. 2q |

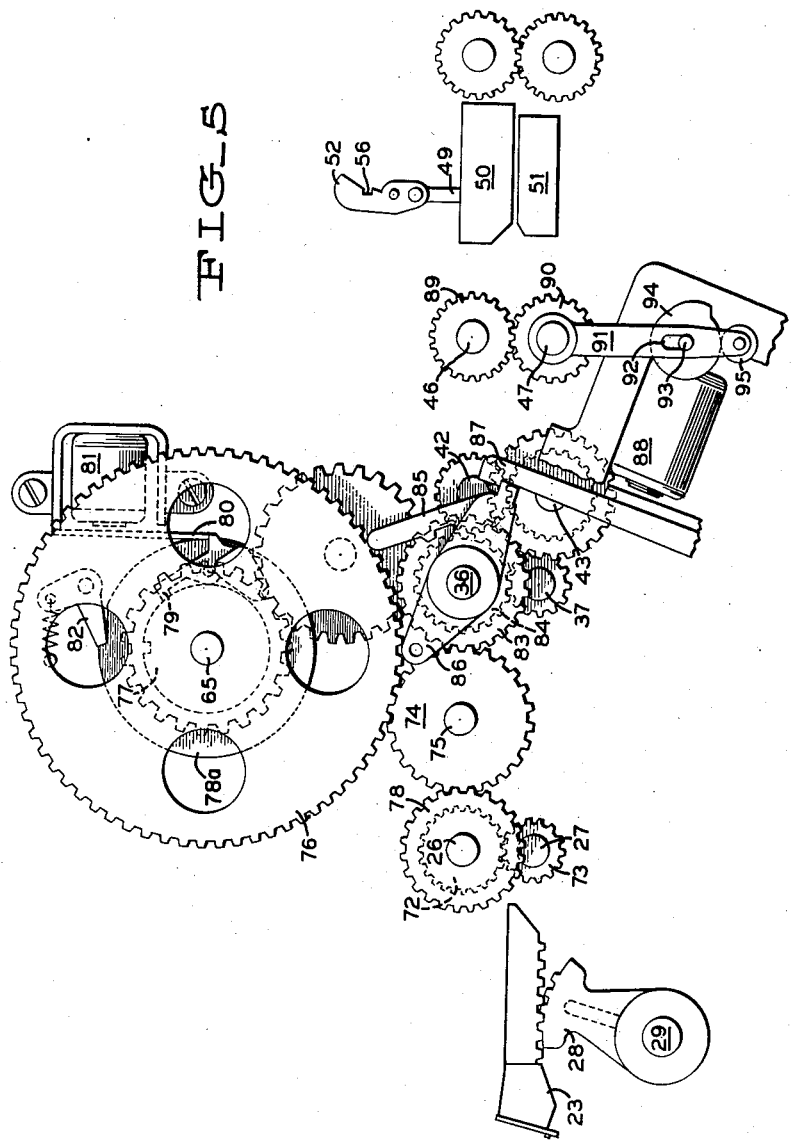

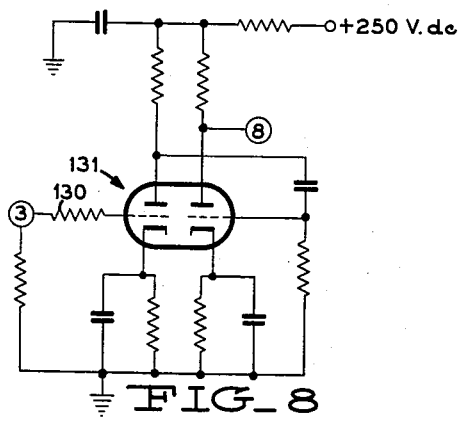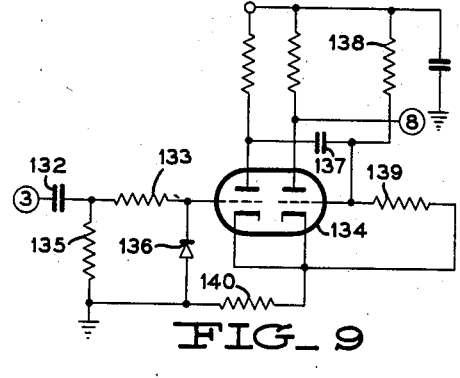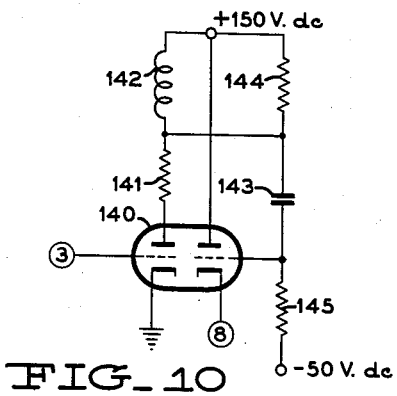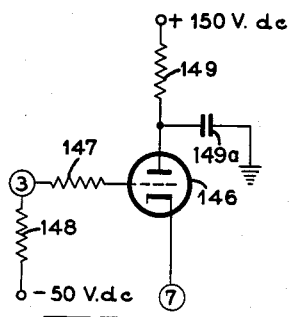

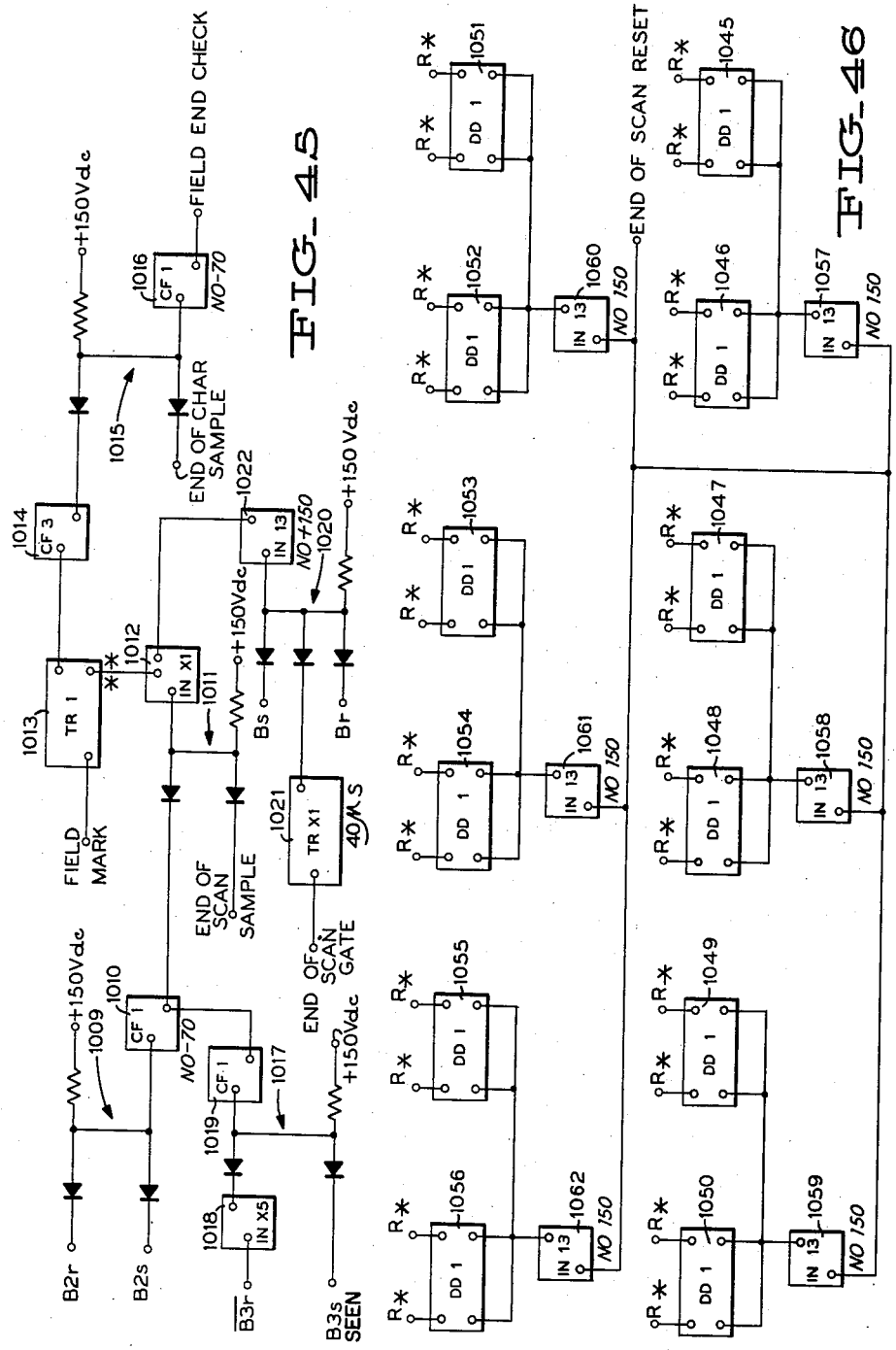

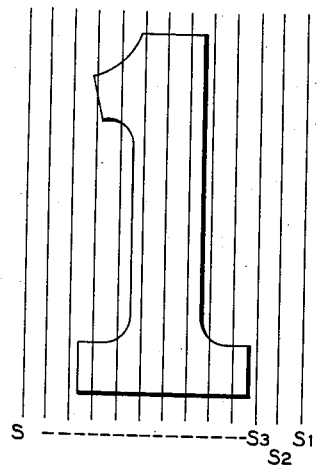
FIG_52a
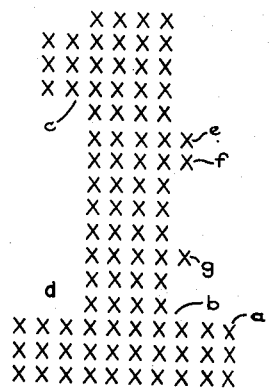
FIG_52b
FIG_52c
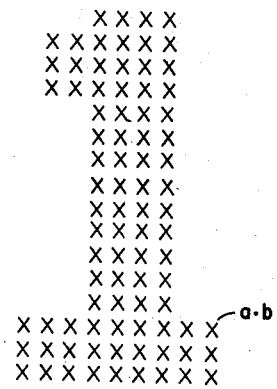

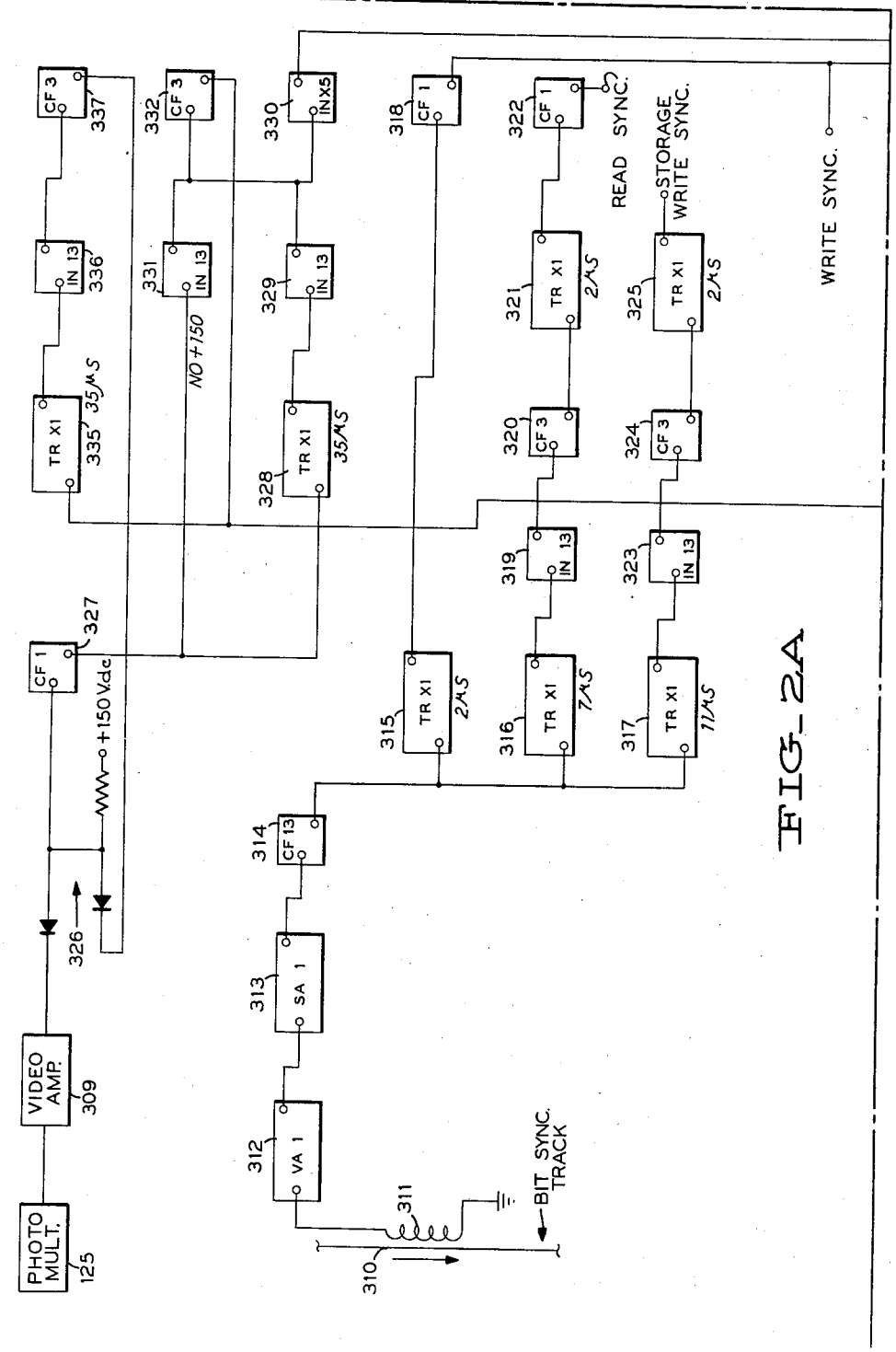

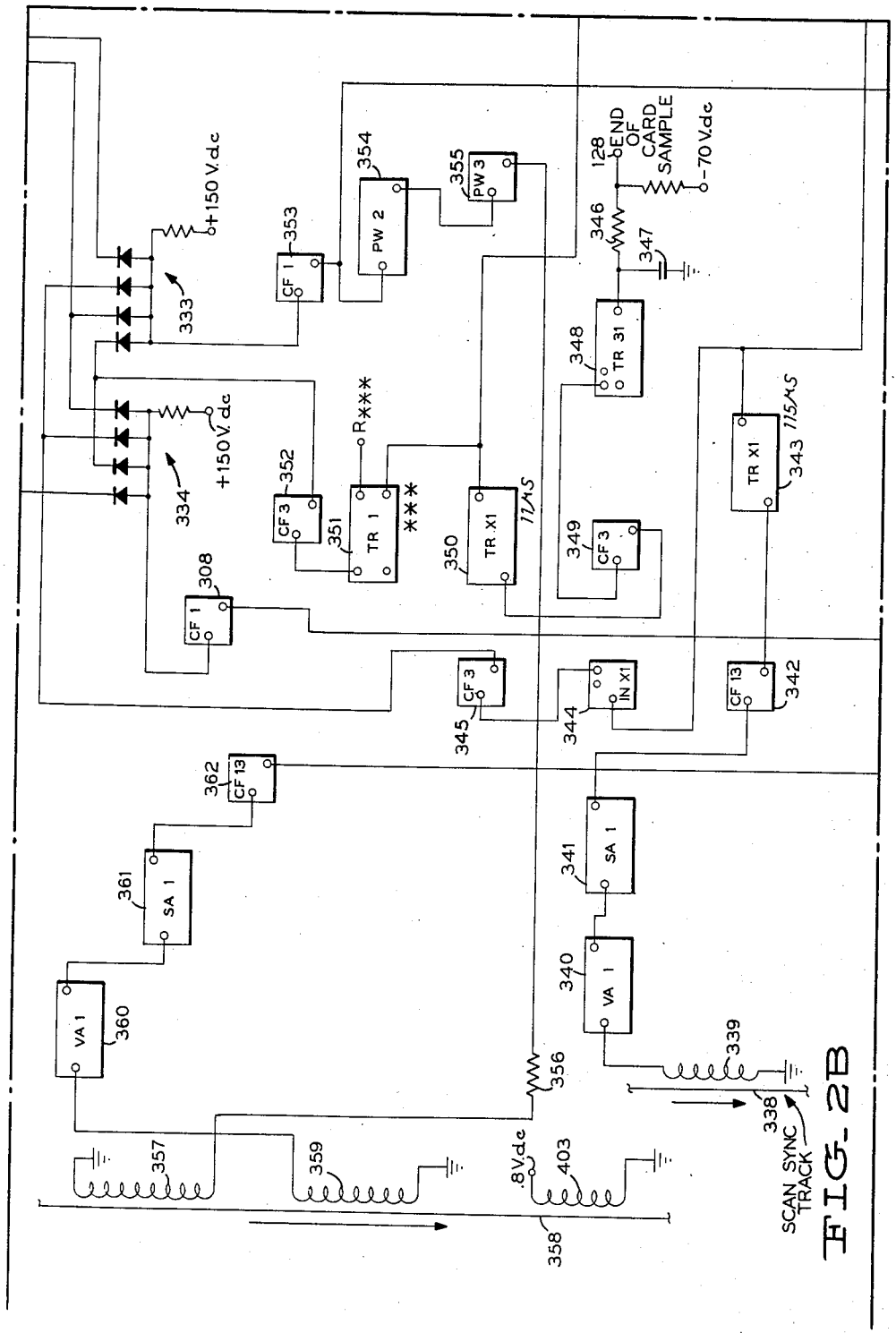

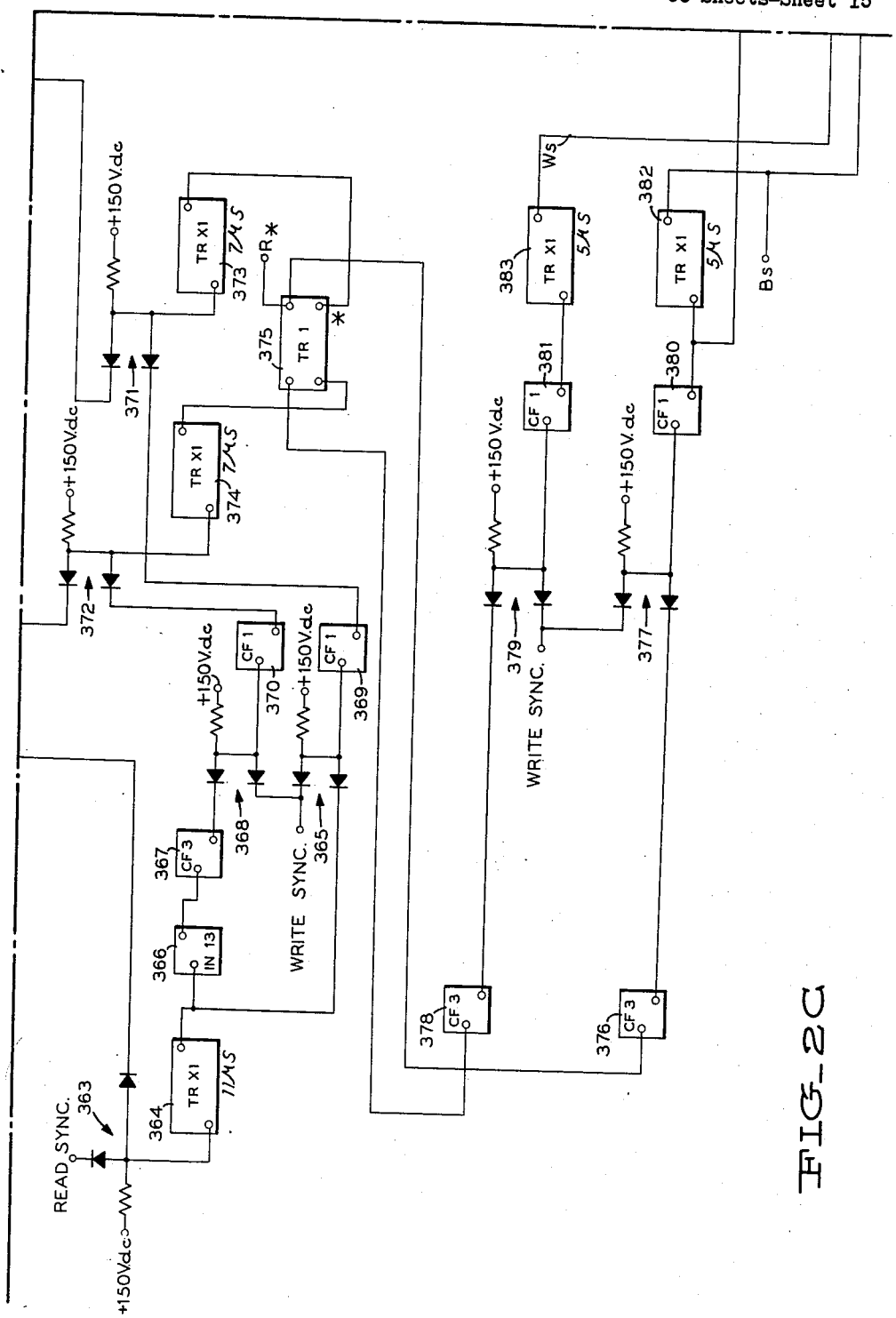

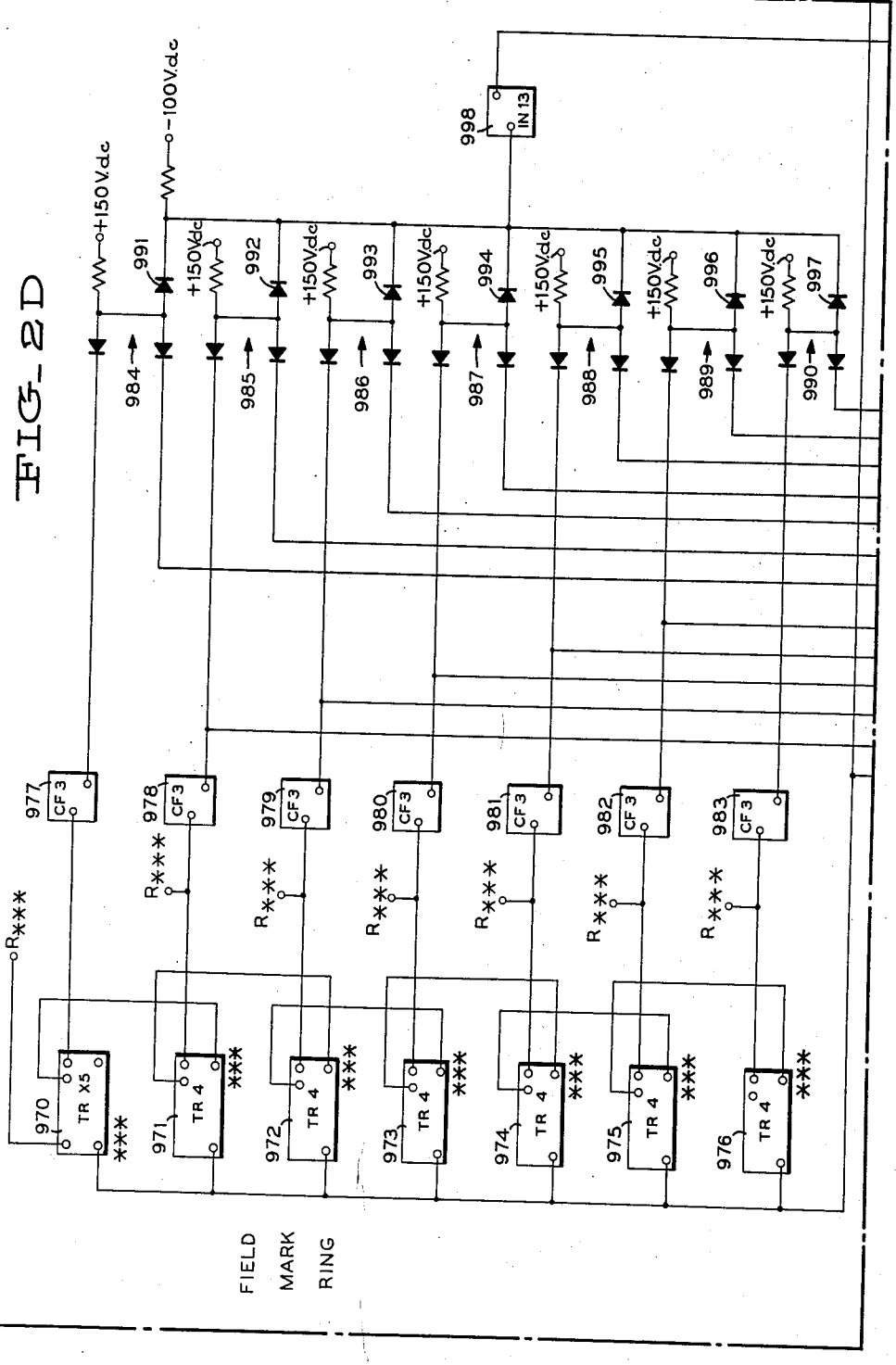

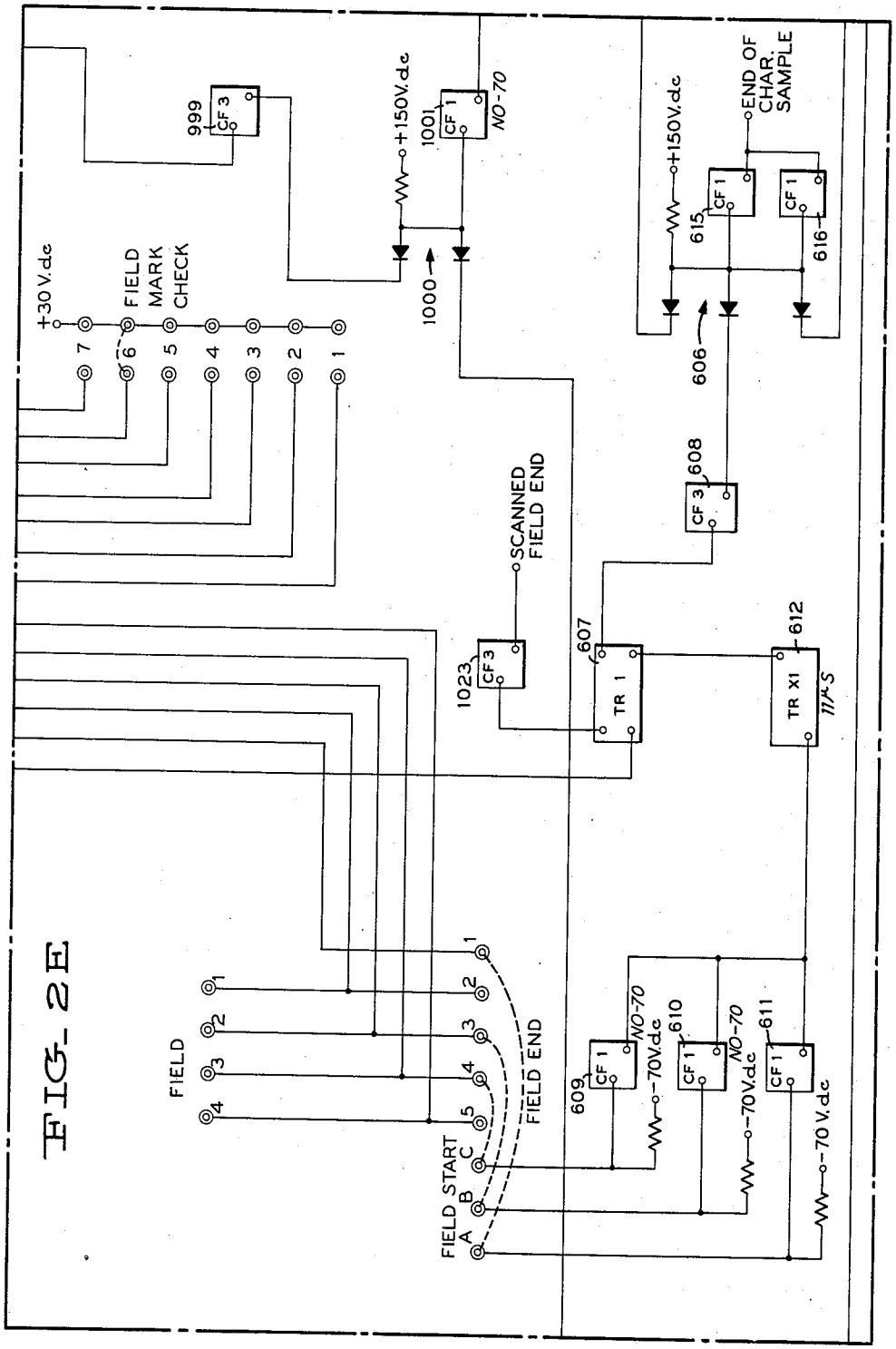

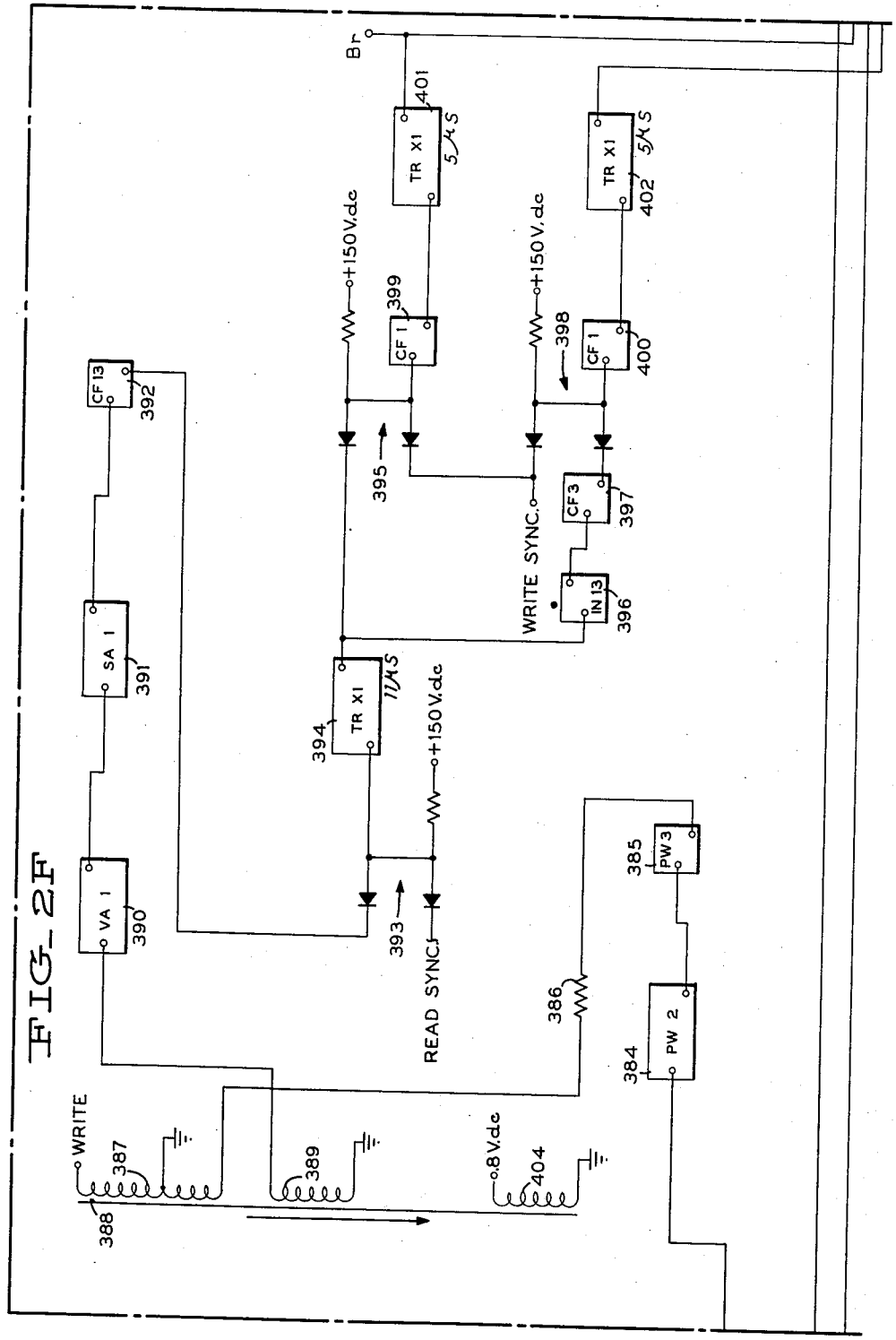

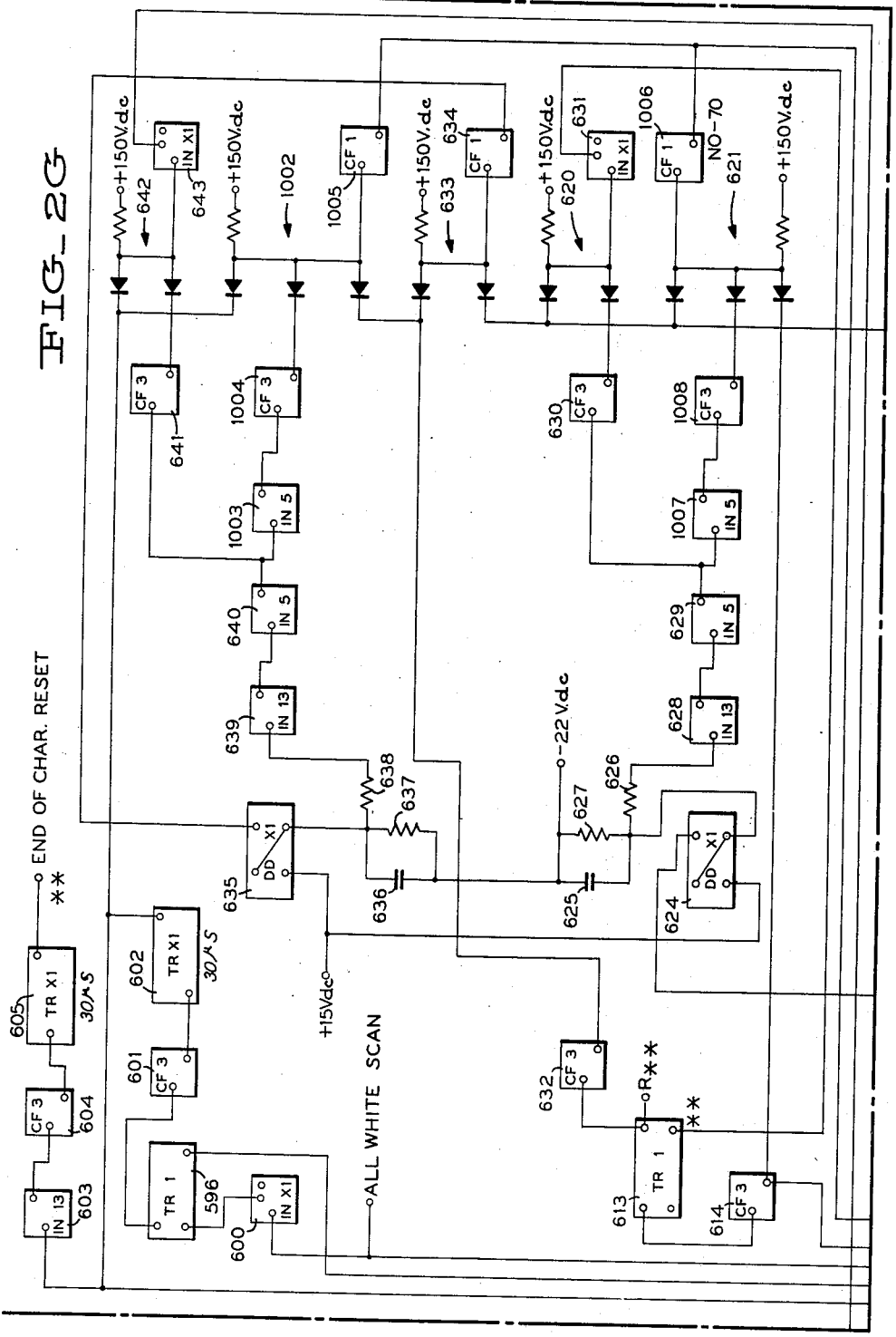

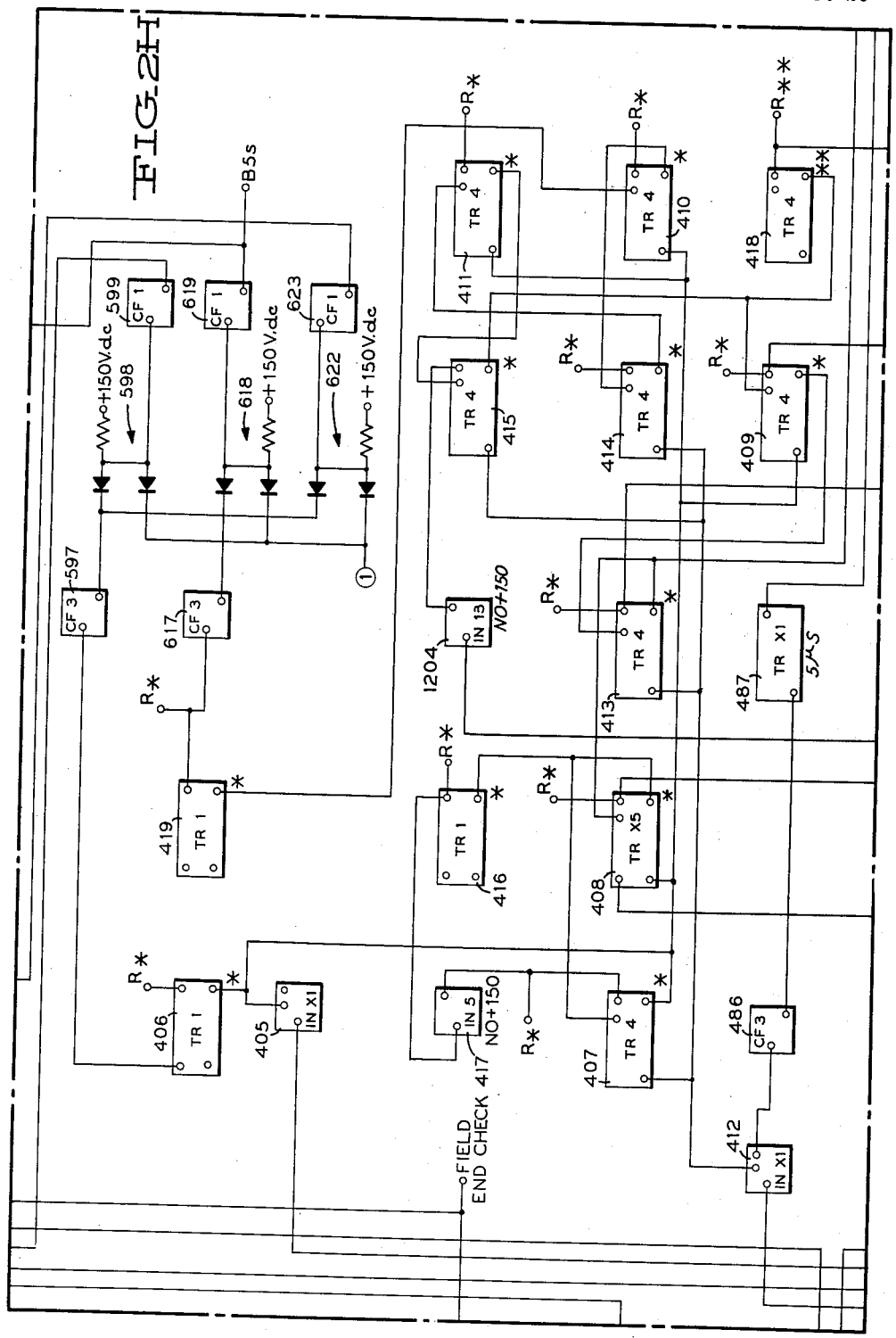

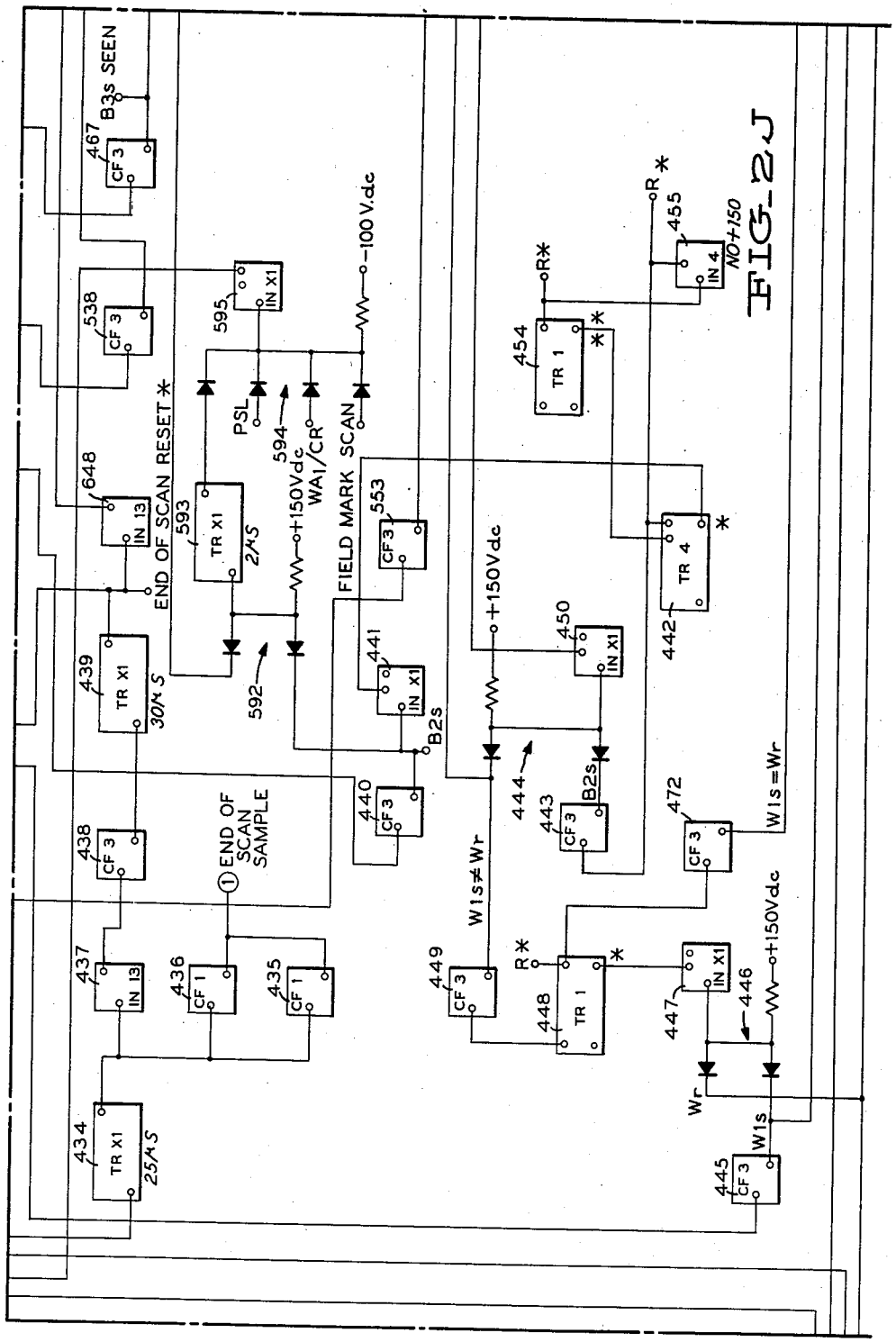

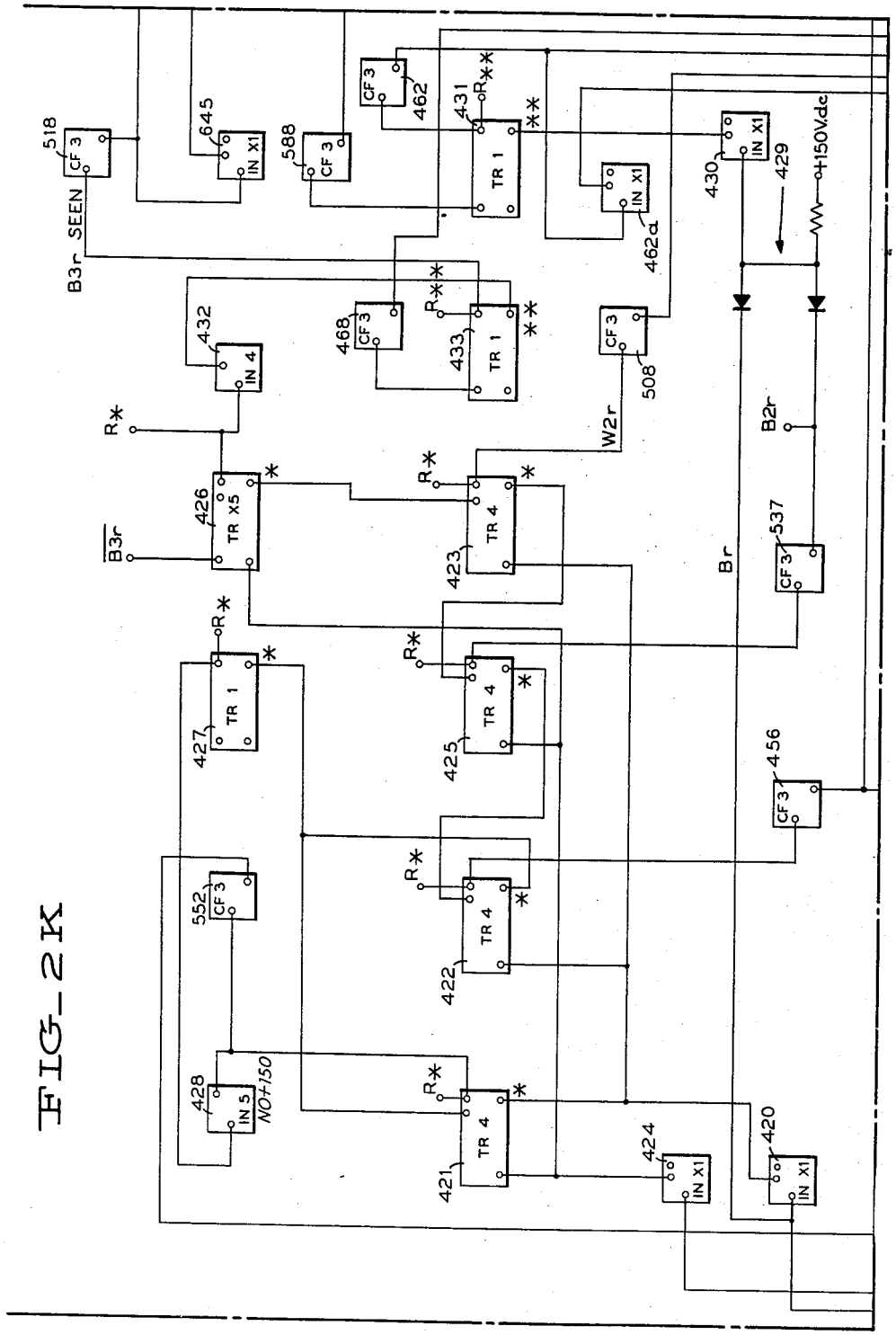

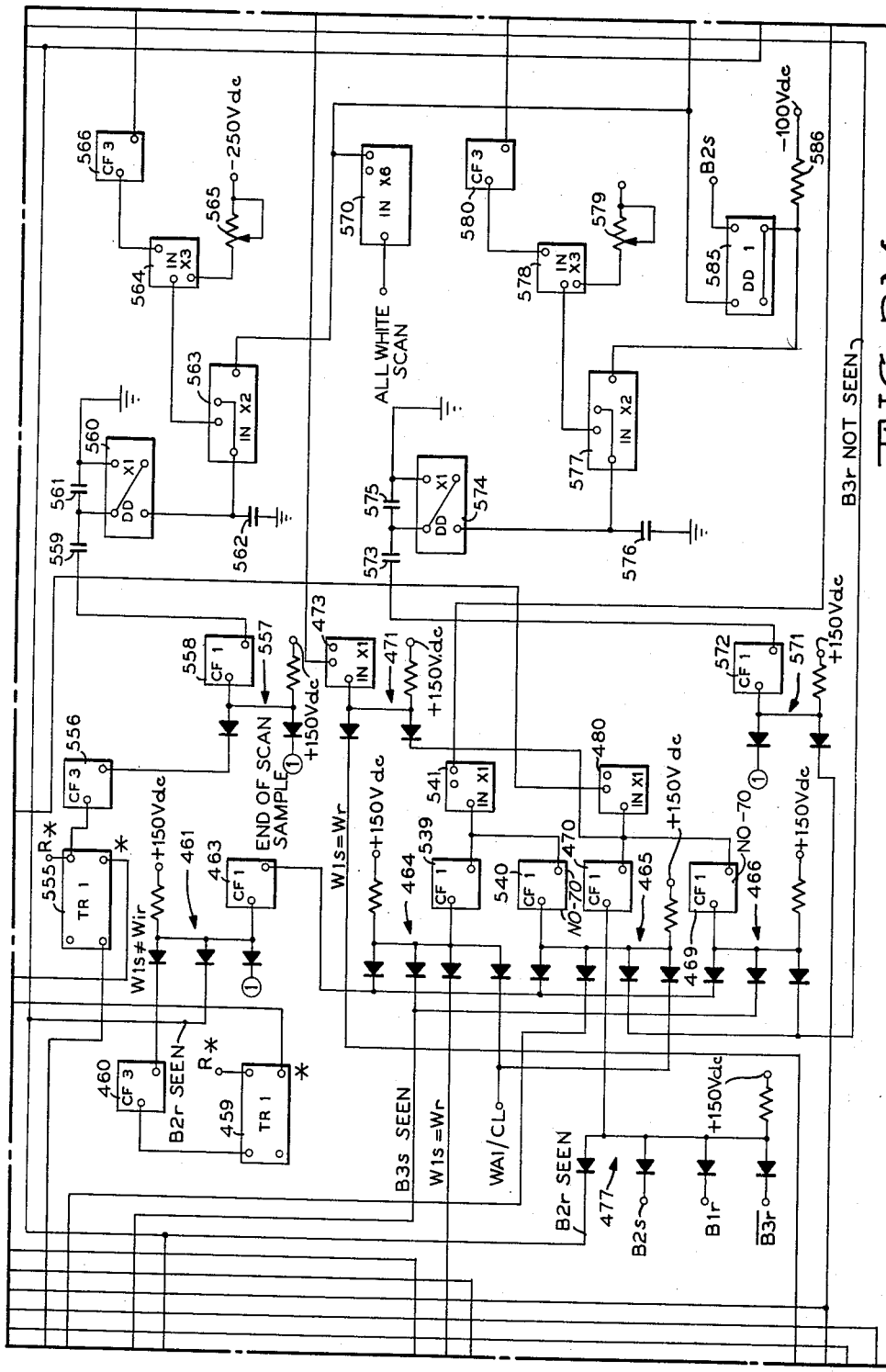

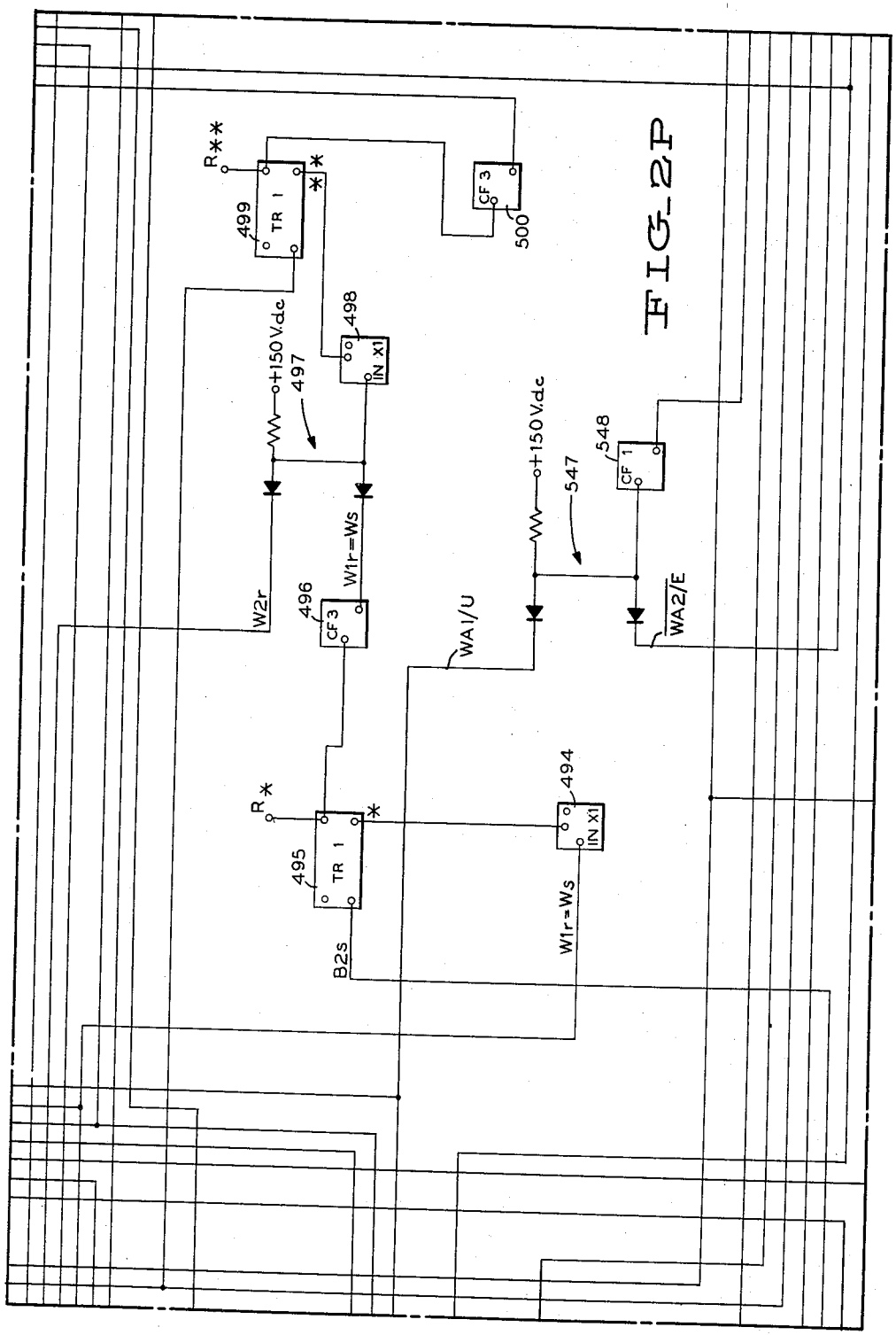

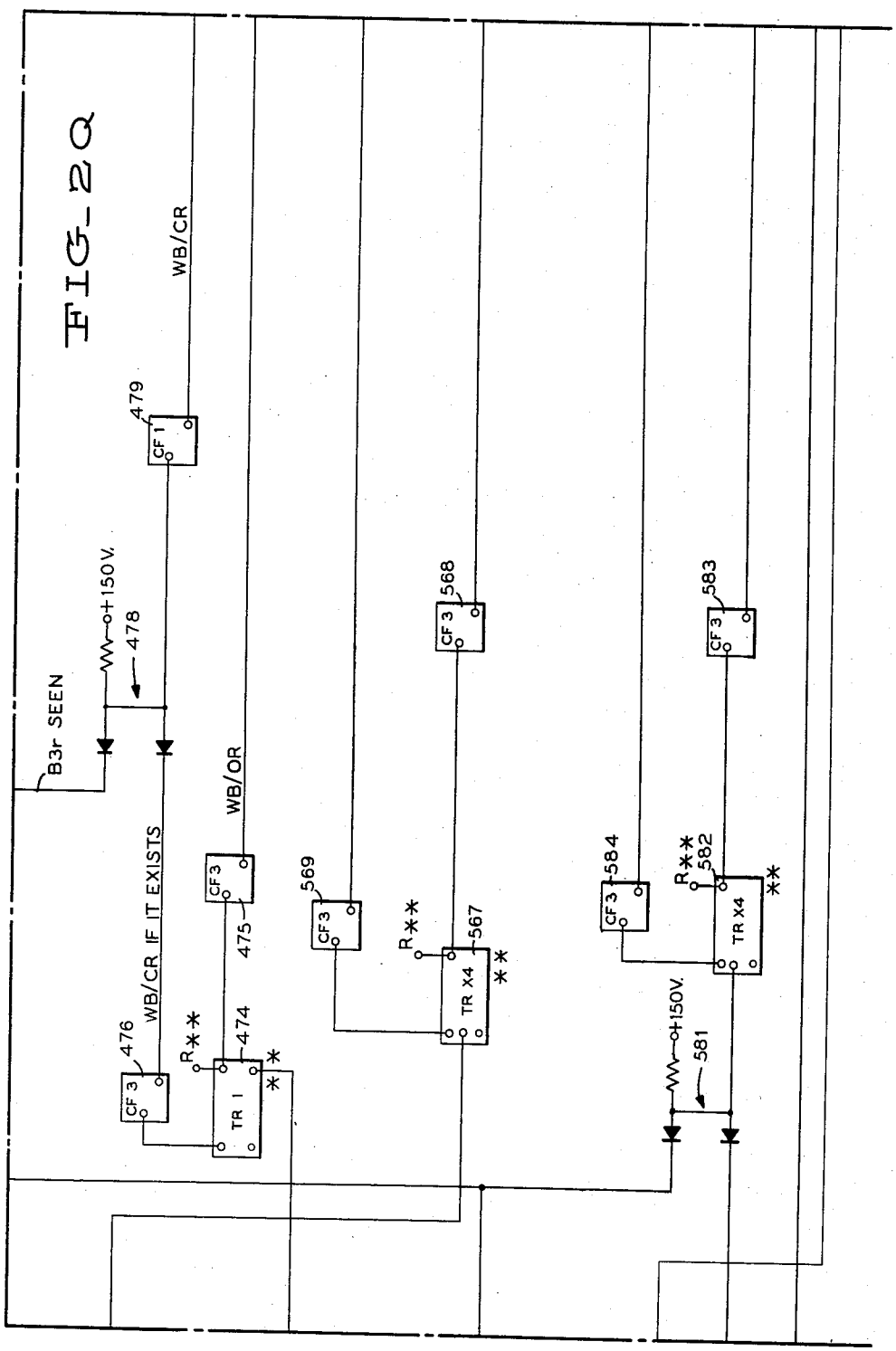

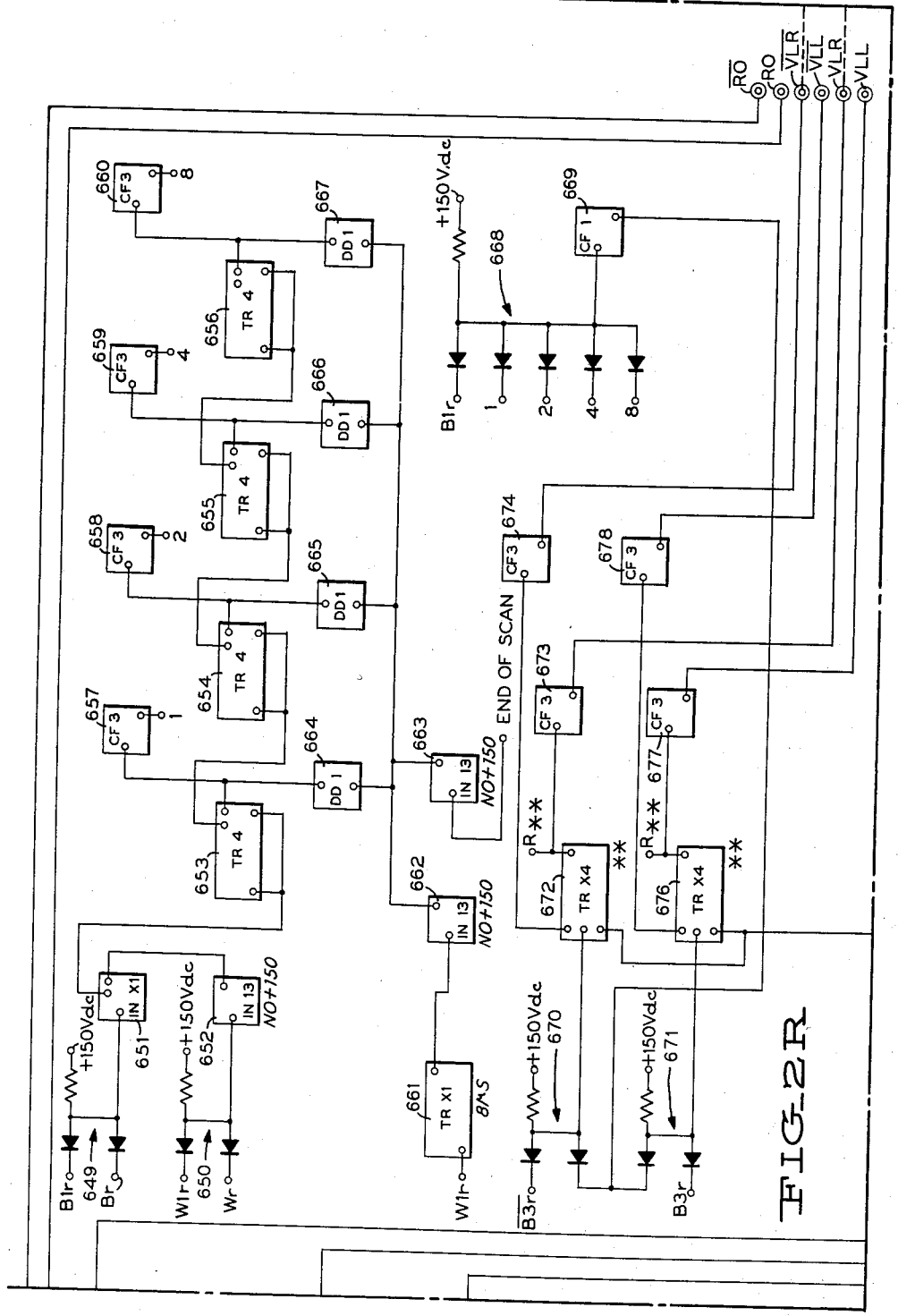

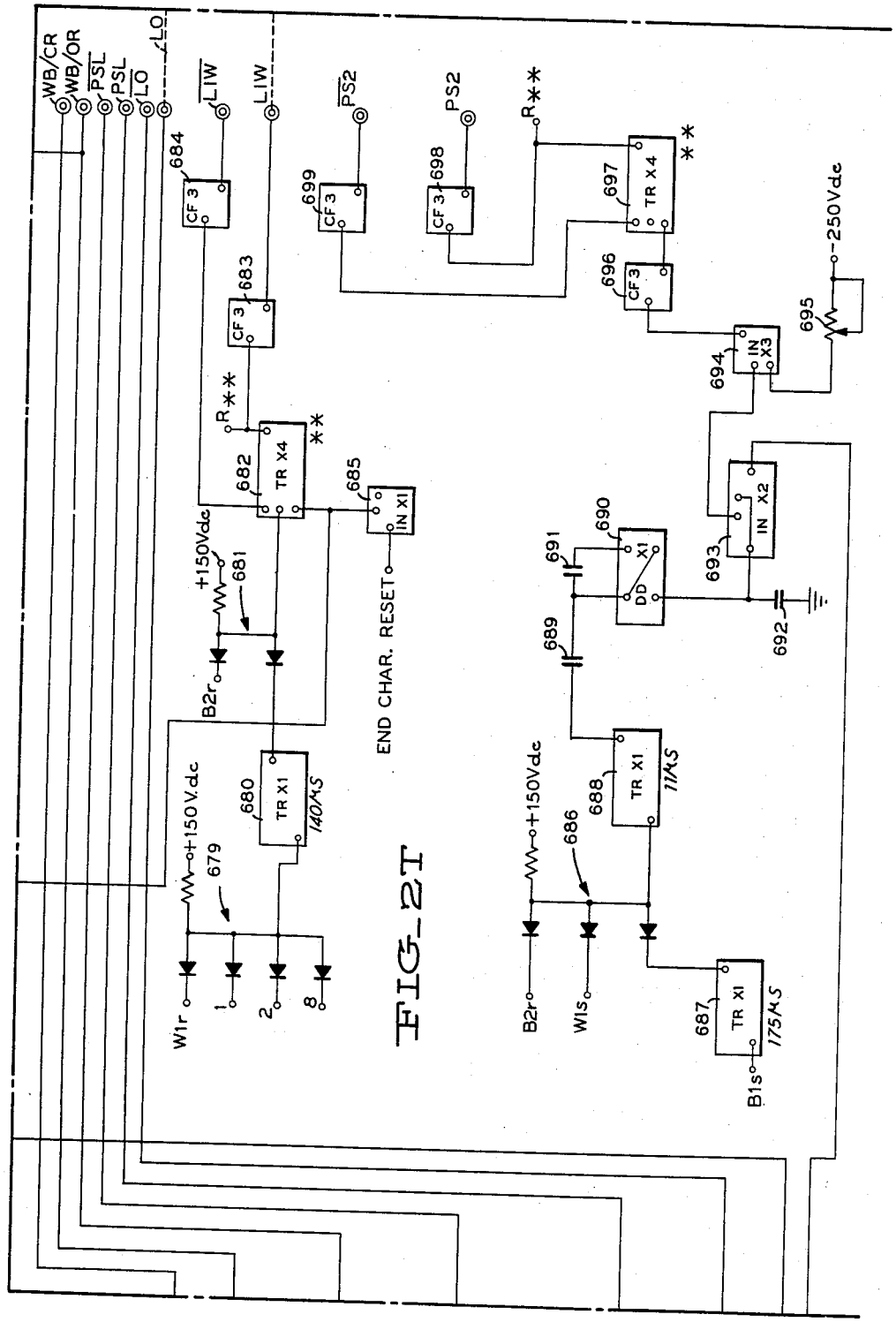
FIG_2T

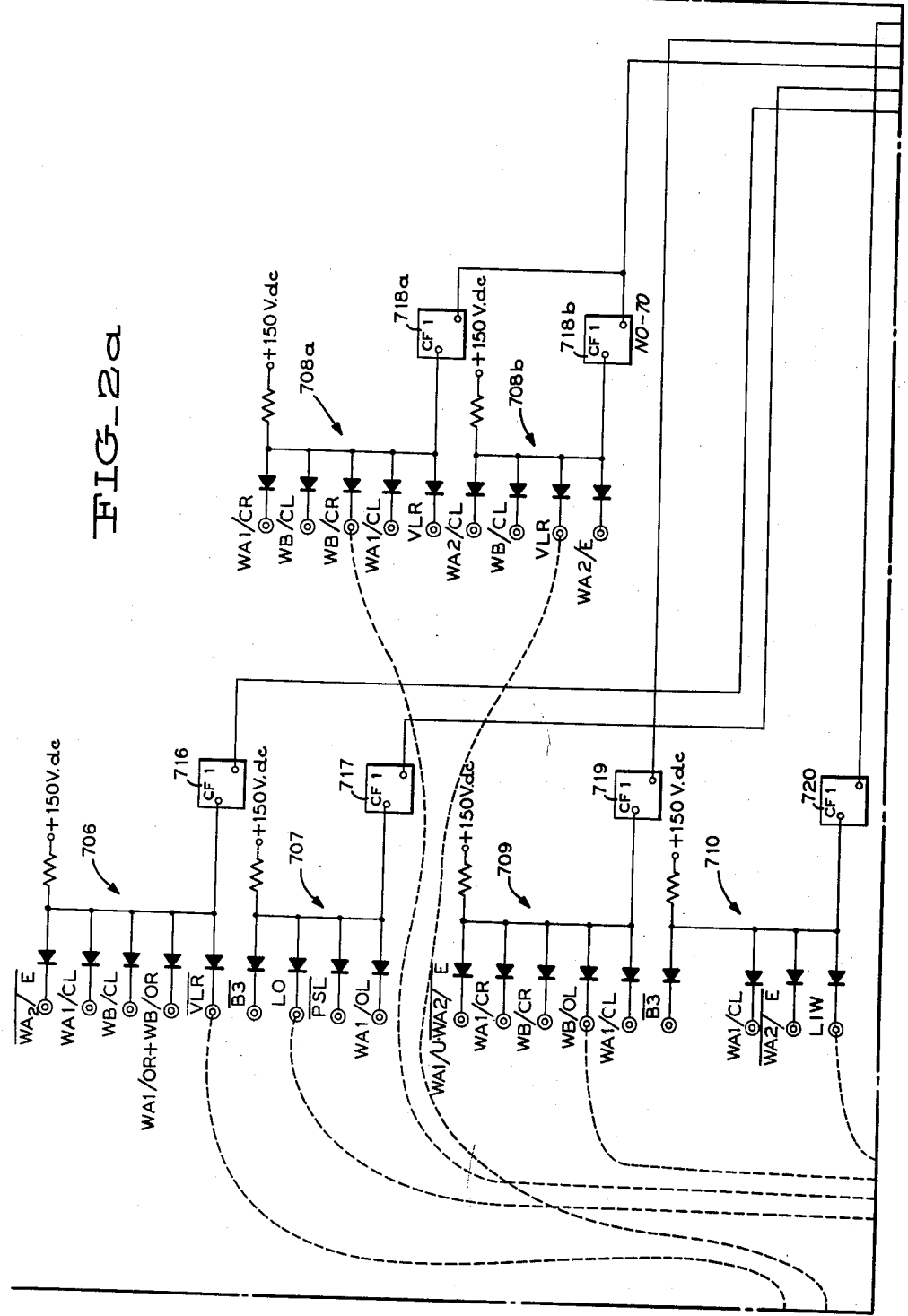

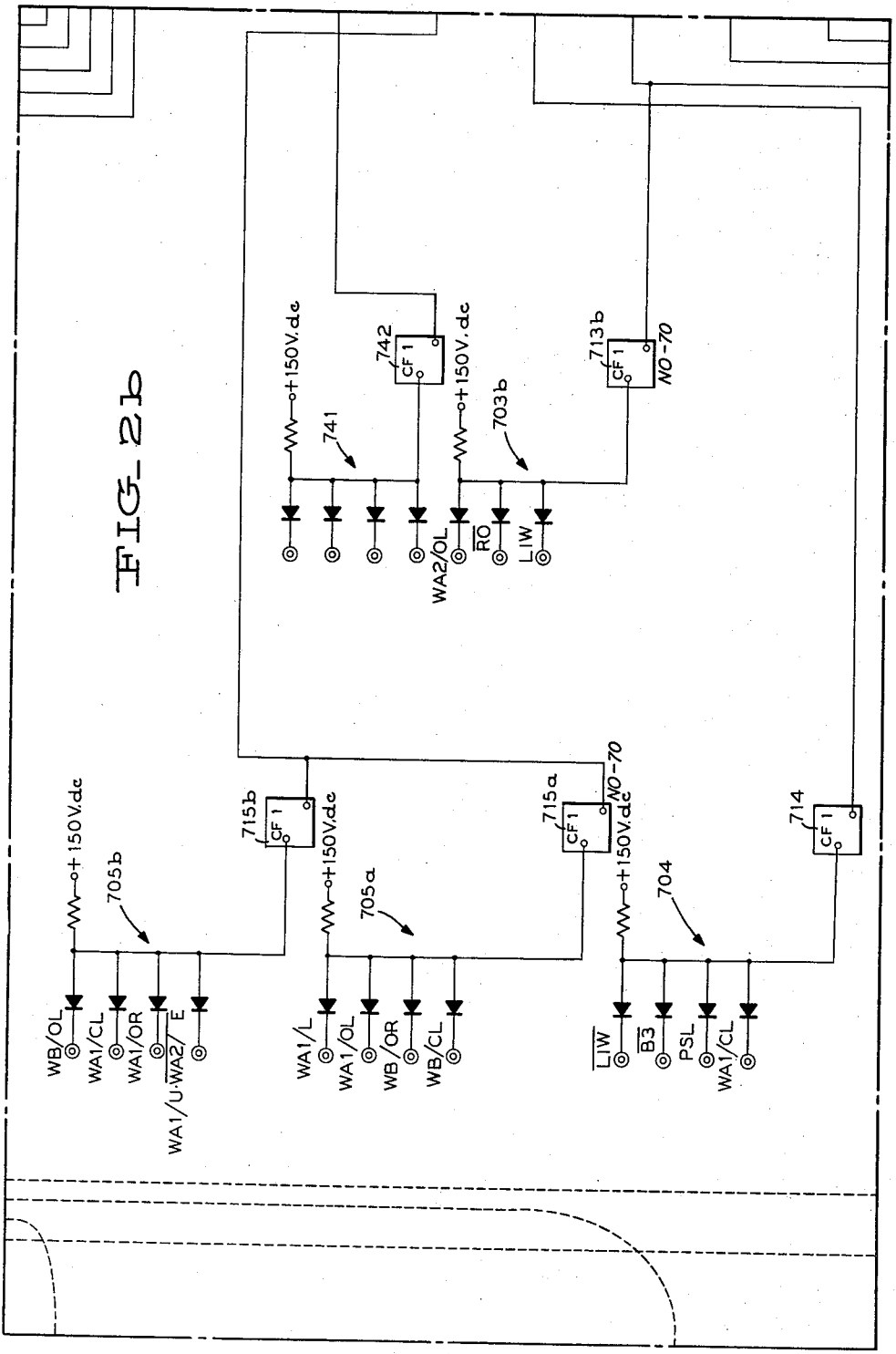

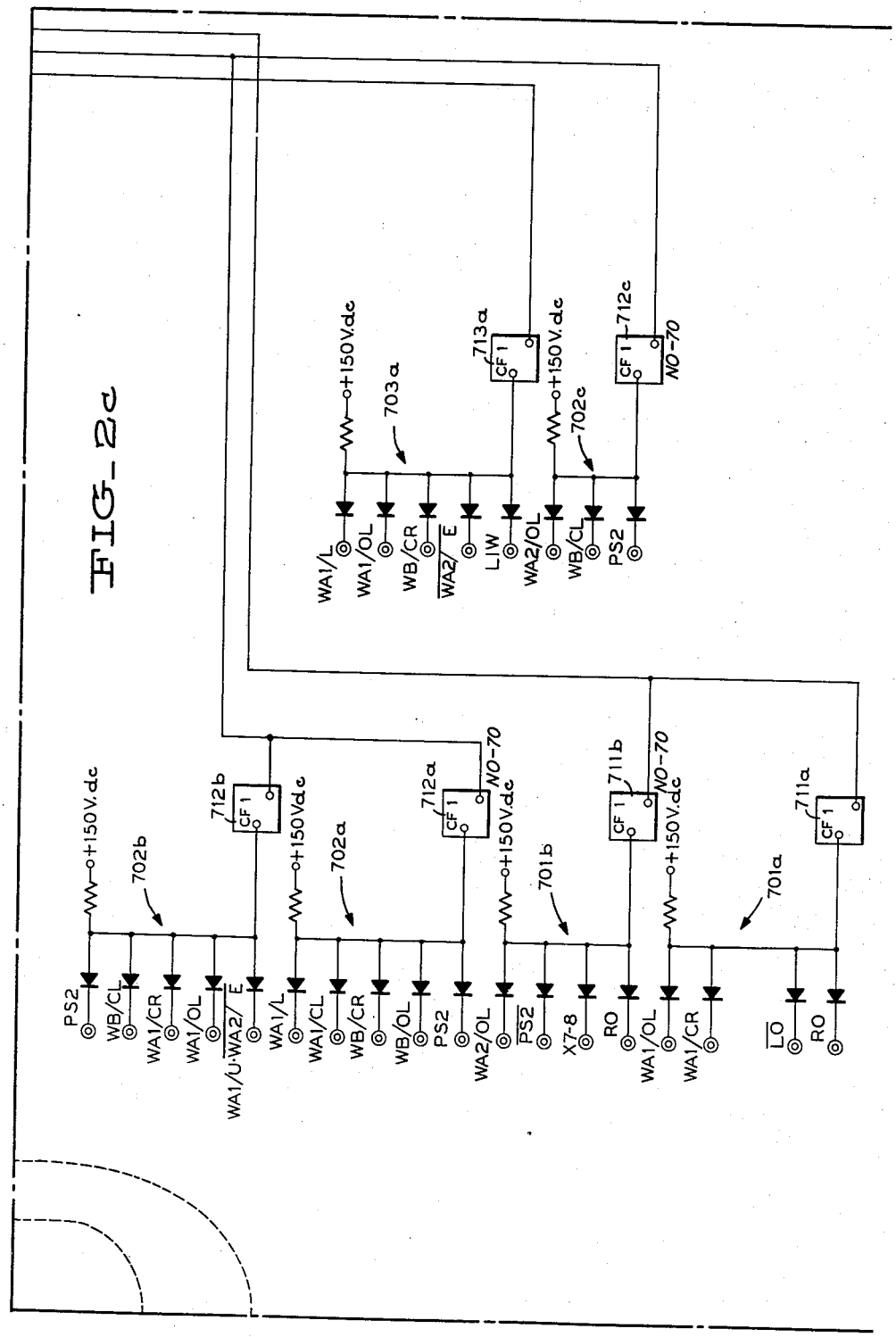

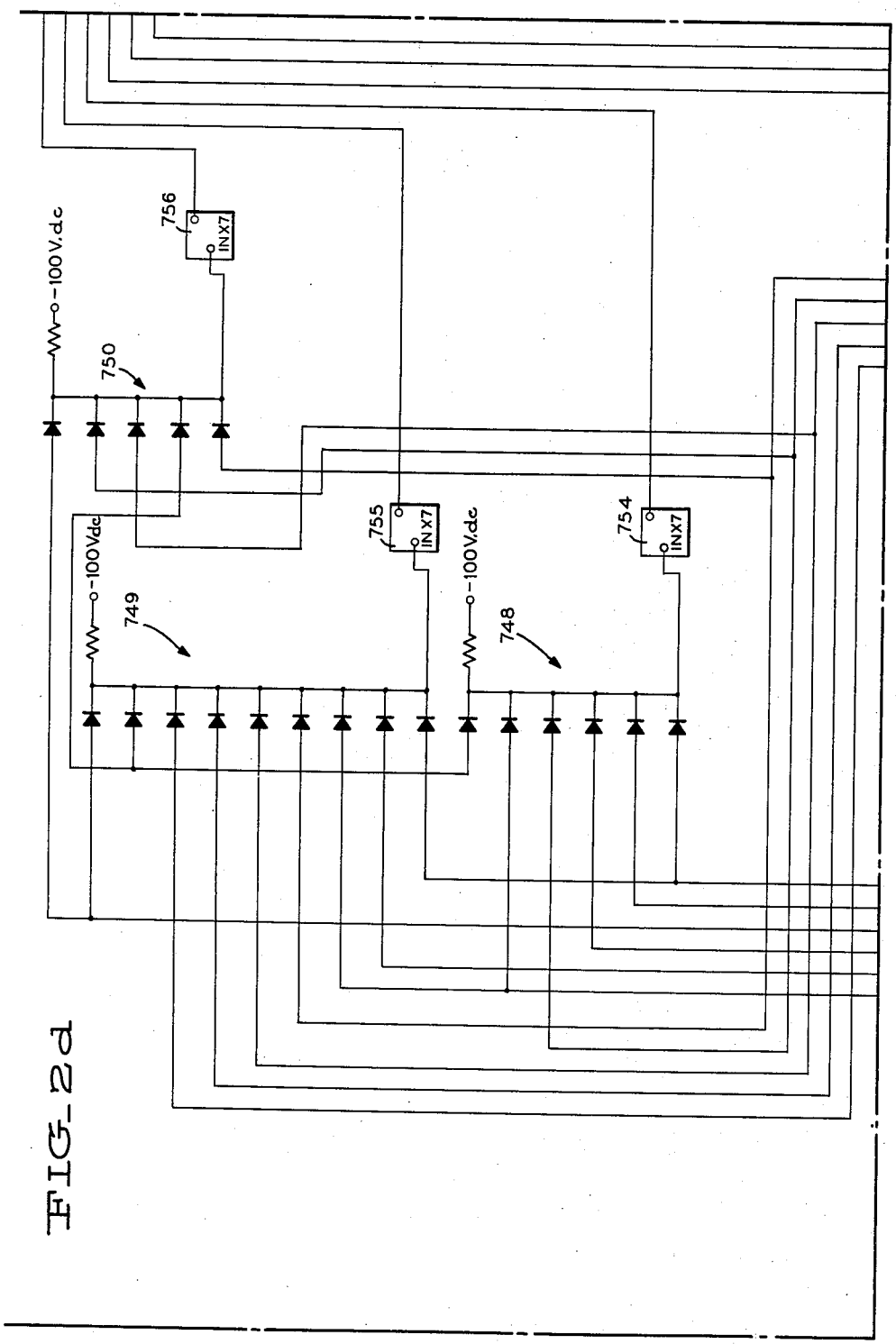

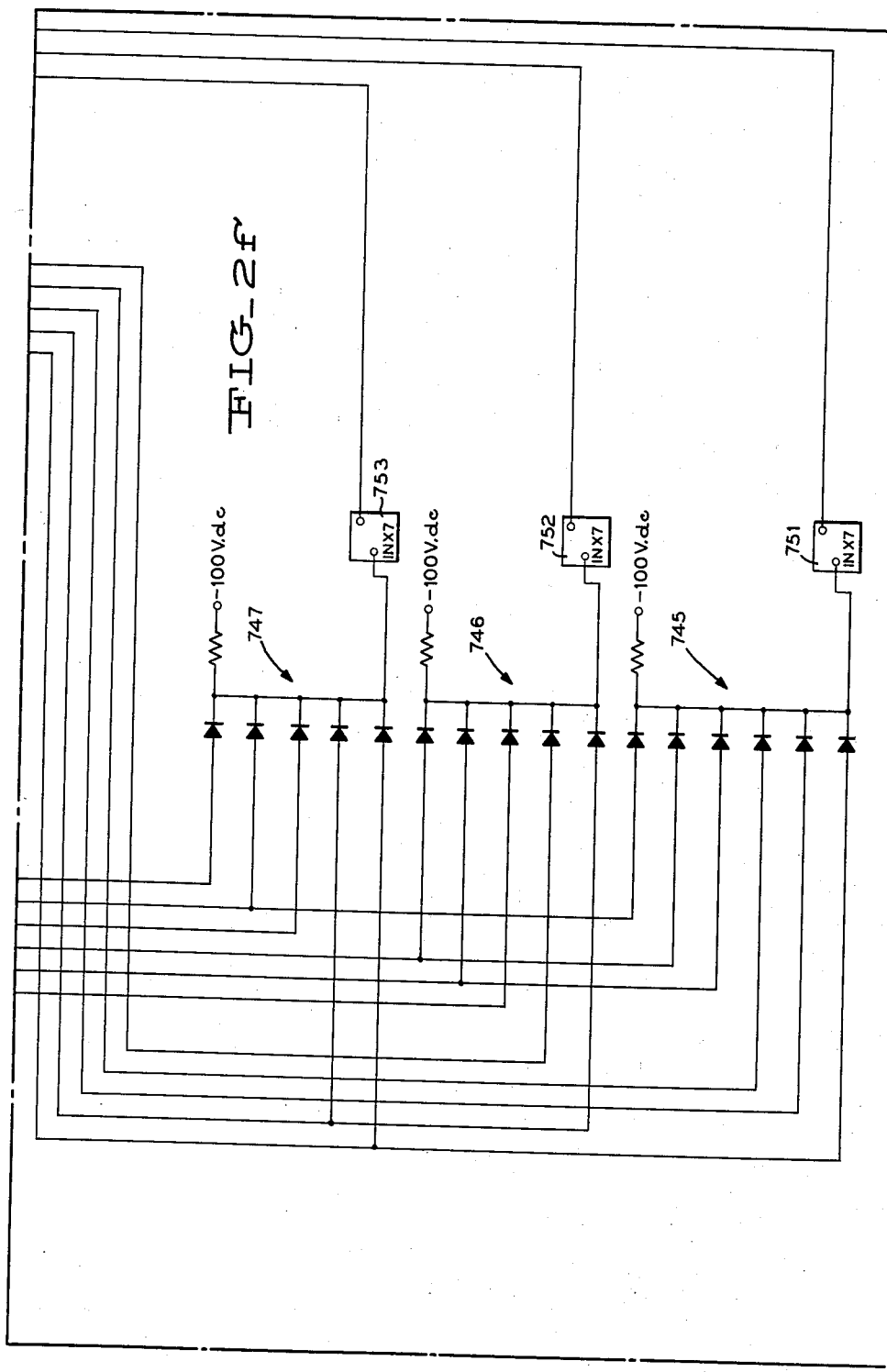

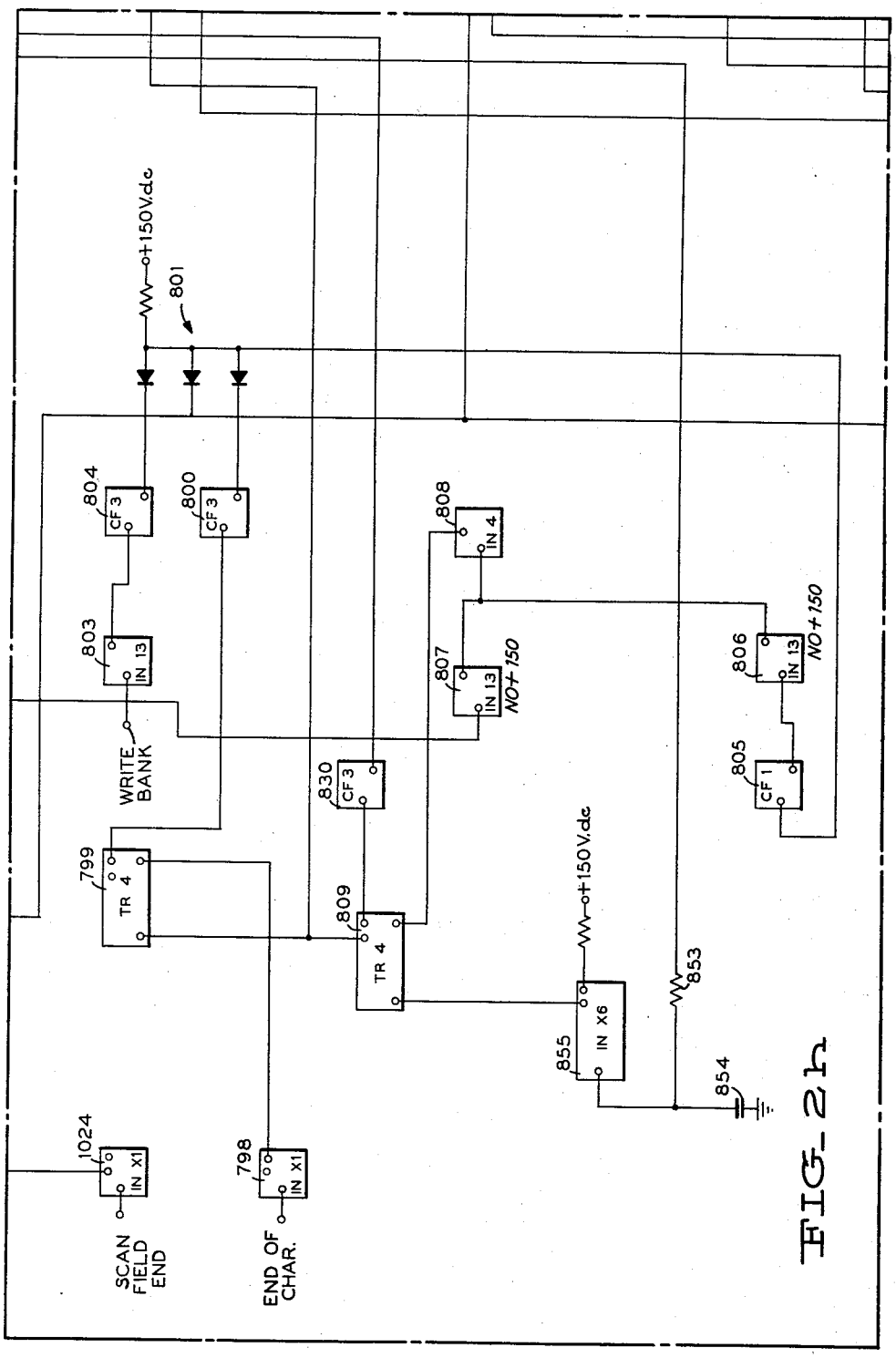

Dec. 6, 1960     F. M. DEMER ET AL     2,963,683
CHARACTER SENSING SYSTEM
Filed Dec. 31, 1956     56 Sheets-Sheet 34

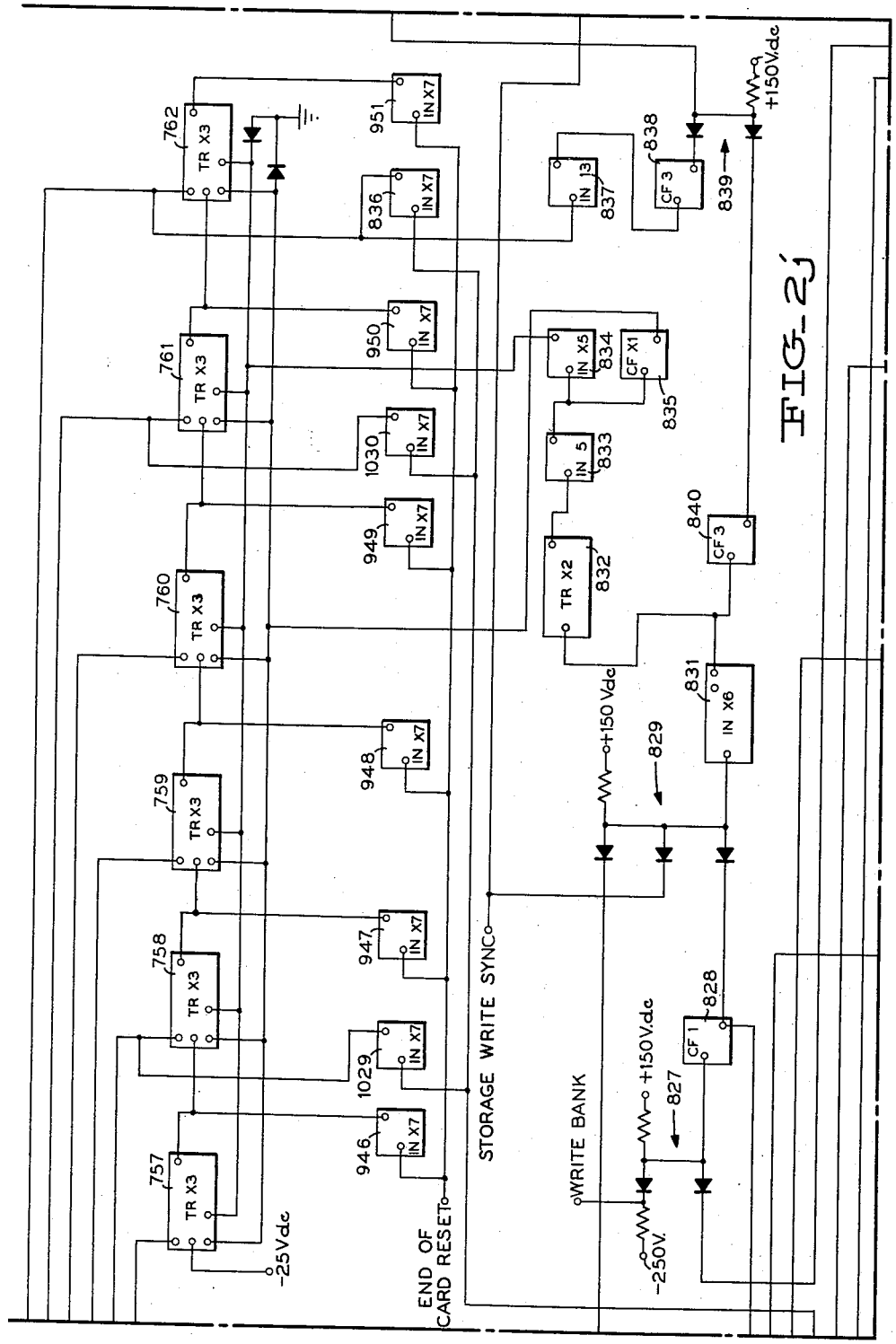
FIG_2j

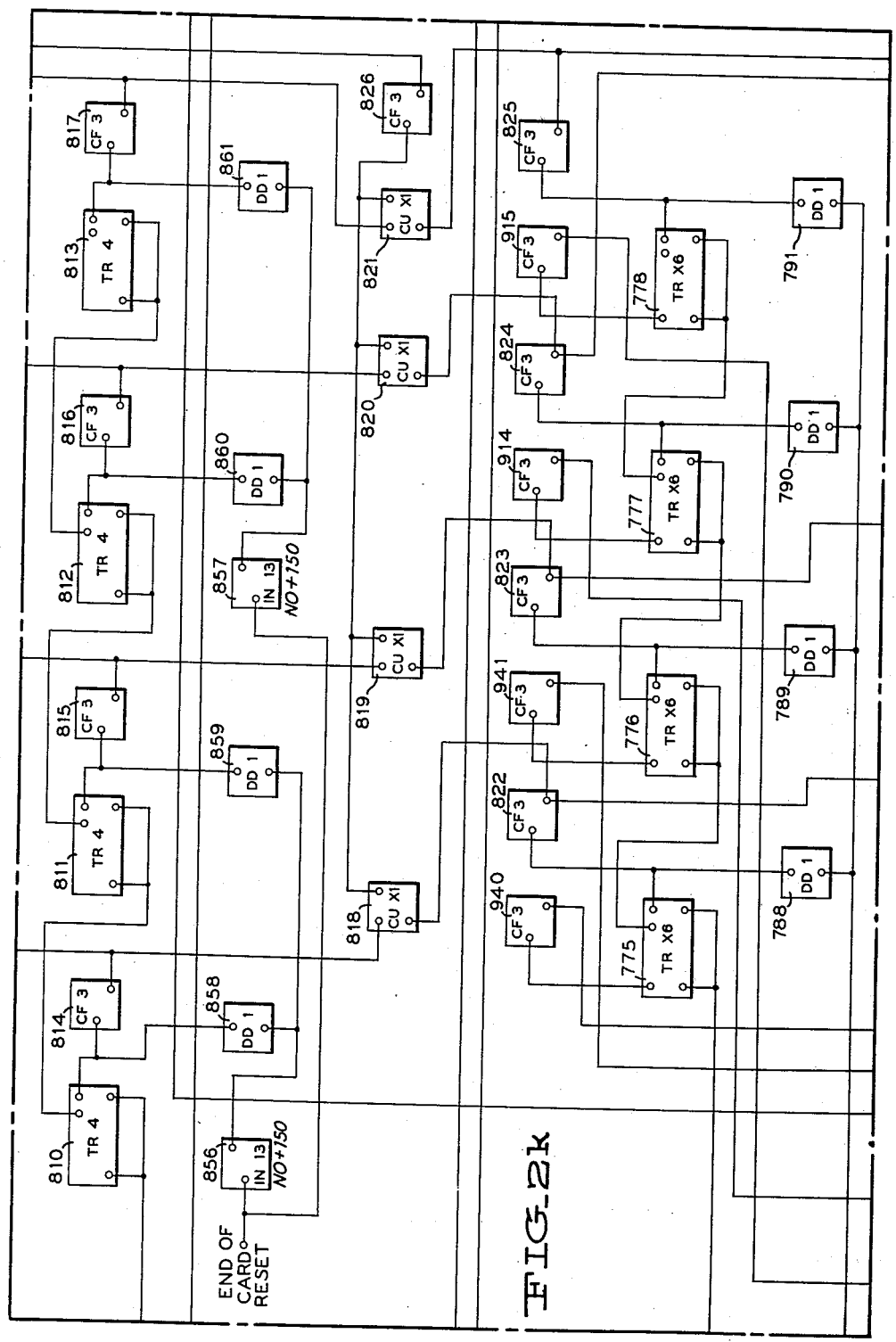

Dec. 6, 1960   F. M. DEMER ET AL   2,963,683
CHARACTER SENSING SYSTEM
Filed Dec. 31, 1956   56 Sheets-Sheet 38
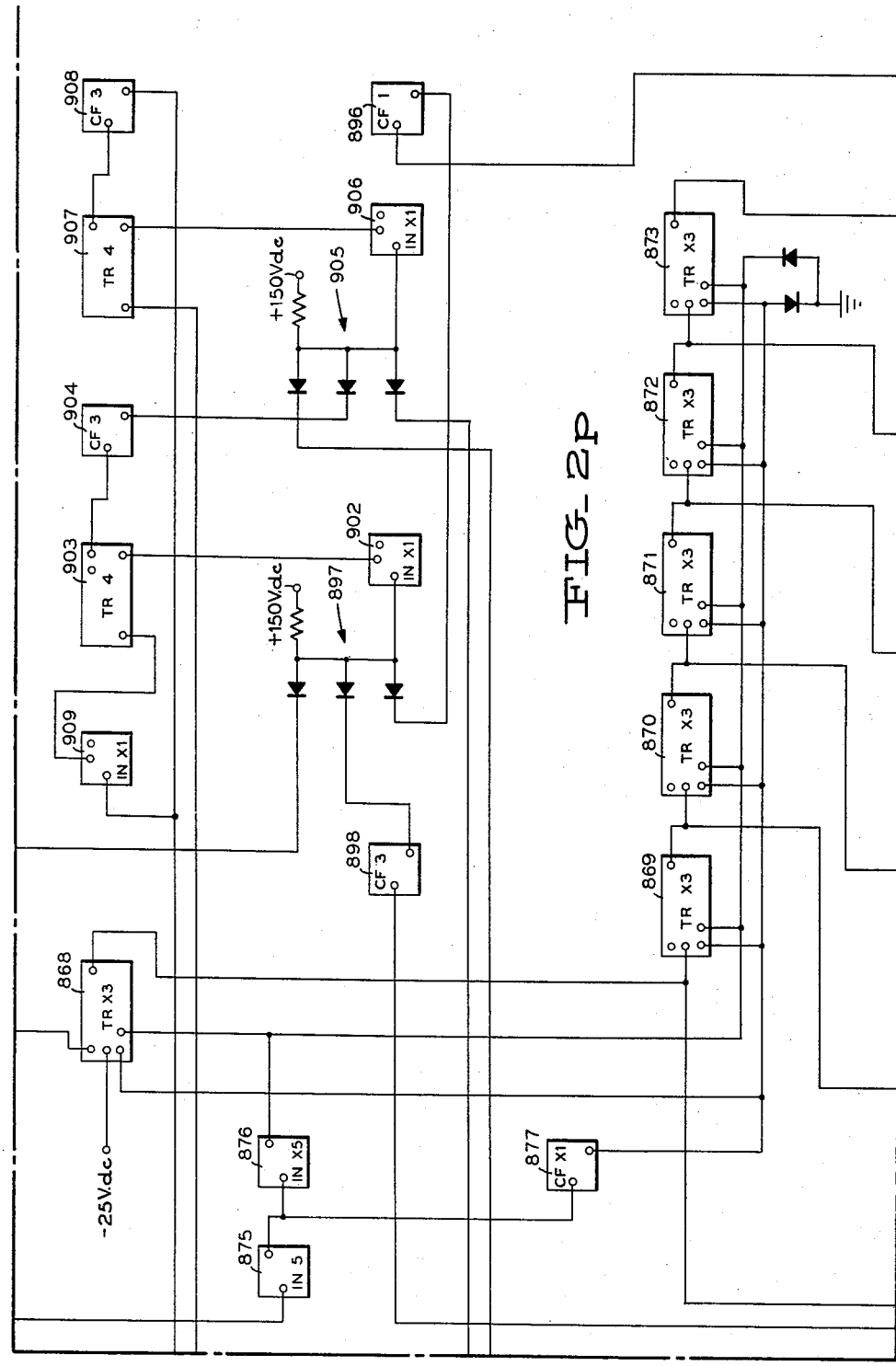
FIG_2P

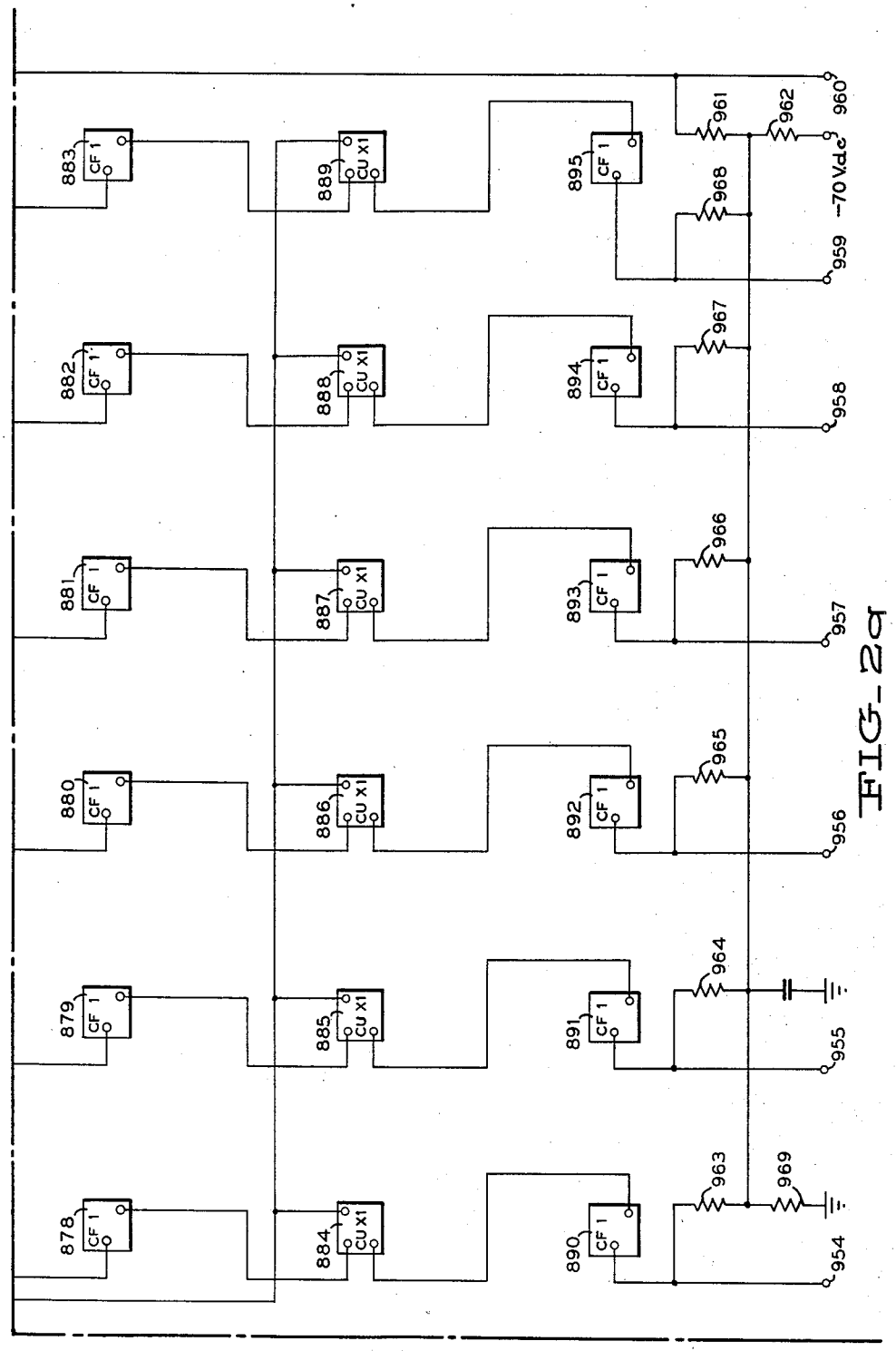

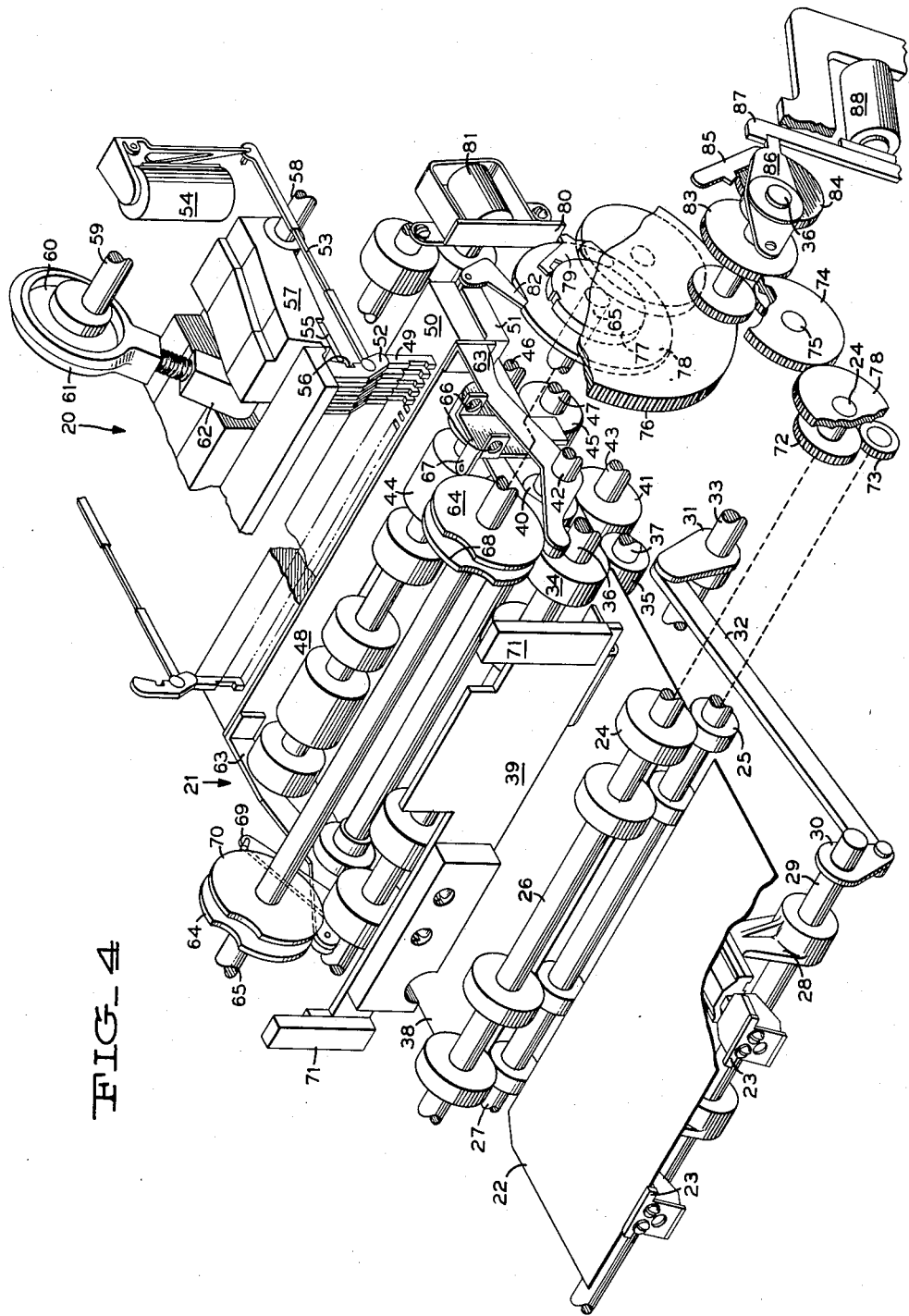

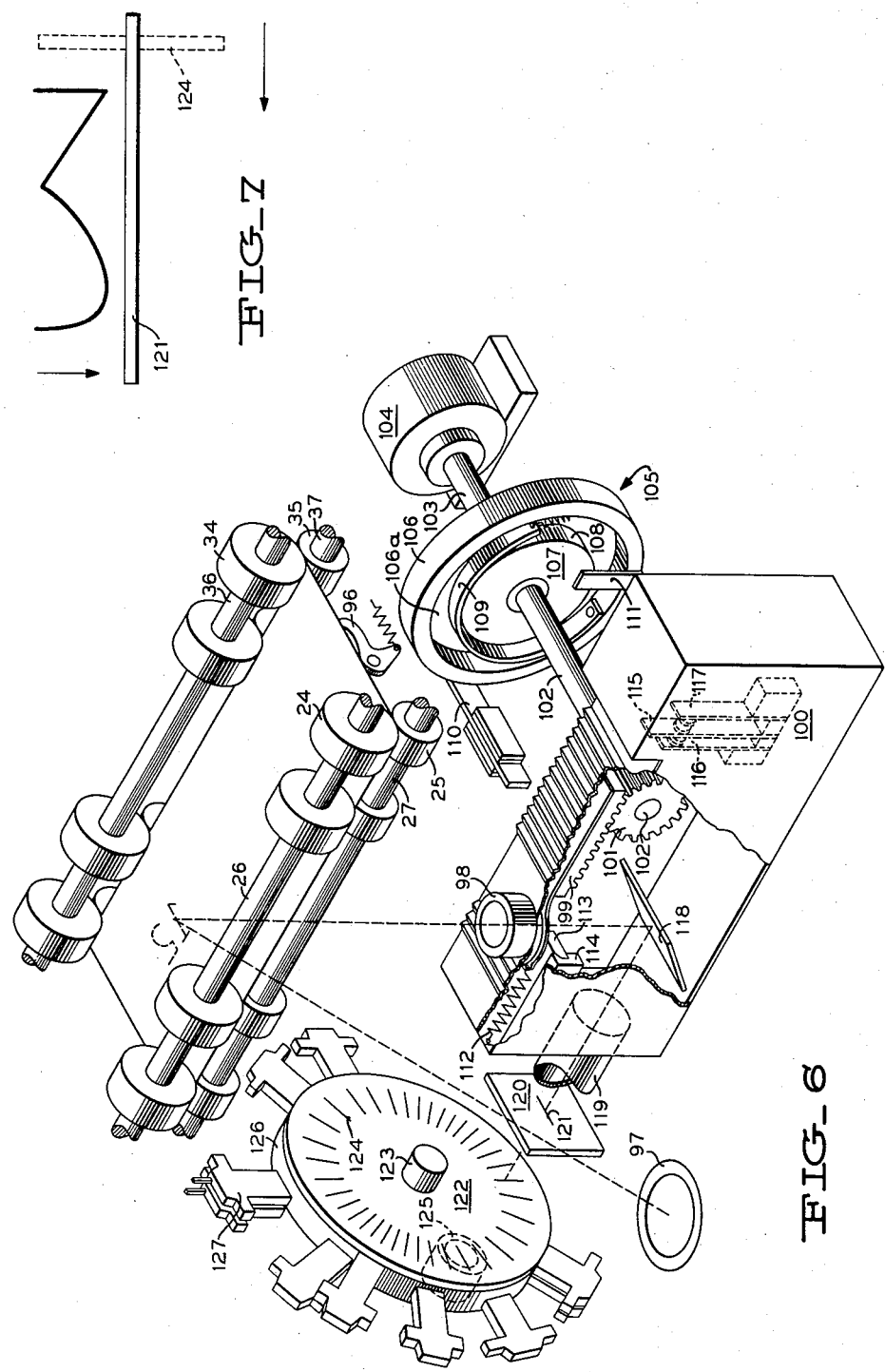

Dec. 6, 1960    F. M. DEMER ET AL    2,963,683
CHARACTER SENSING SYSTEM
Filed Dec. 31, 1956    56 Sheets-Sheet 42
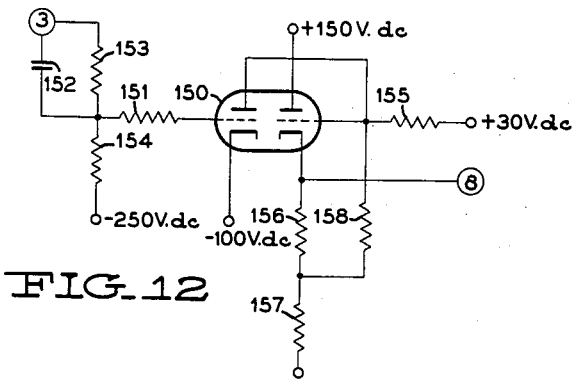
FIG_12
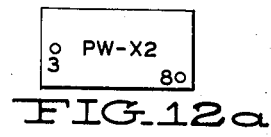
FIG_12a
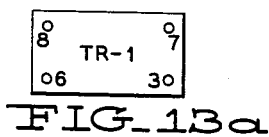
FIG_13a
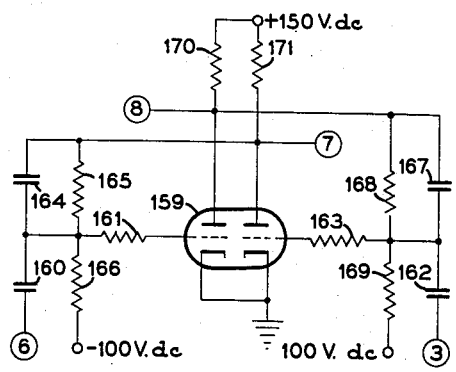
FIG_13
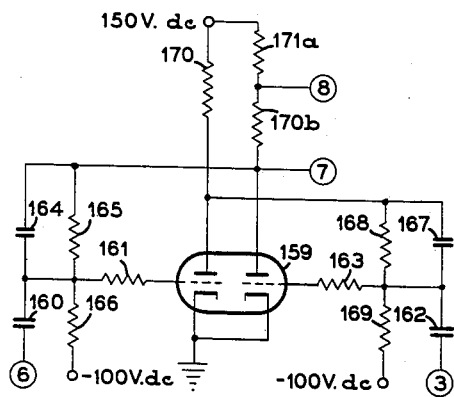
FIG_14
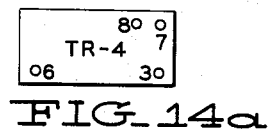
FIG_14a
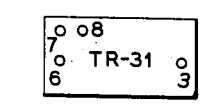
FIG_15a
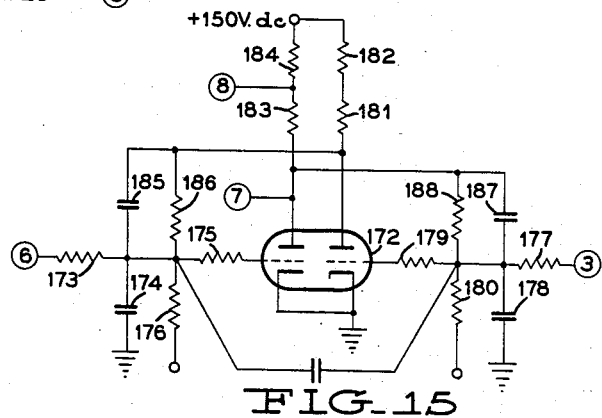
FIG_15

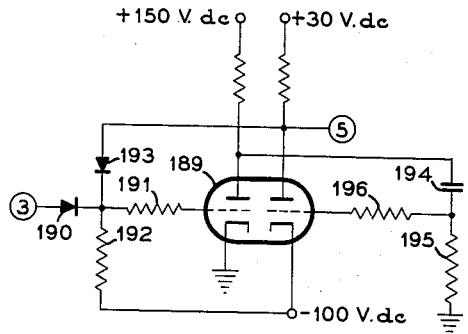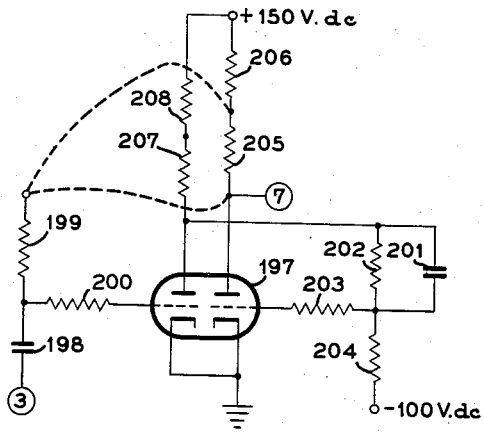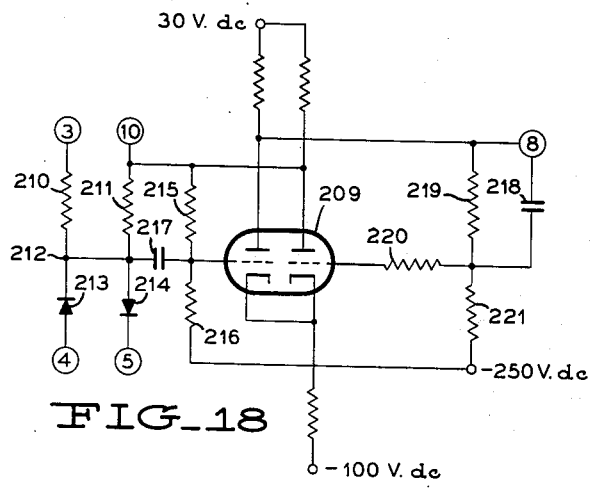

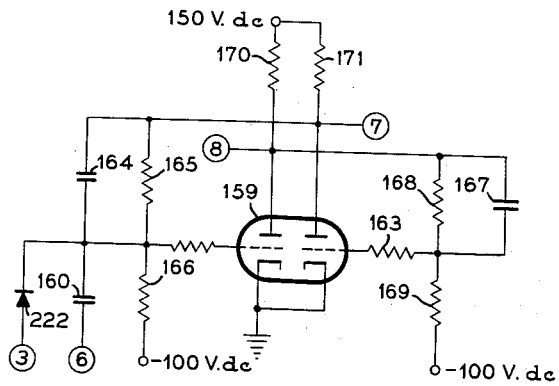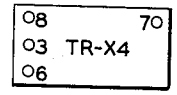
FIG_19  FIG_19a
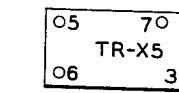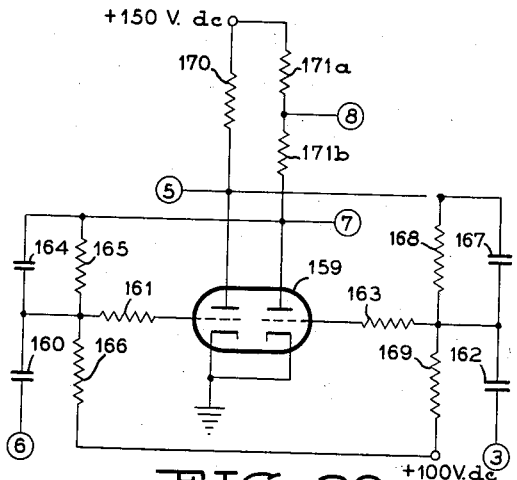
FIG_20a  FIG_20
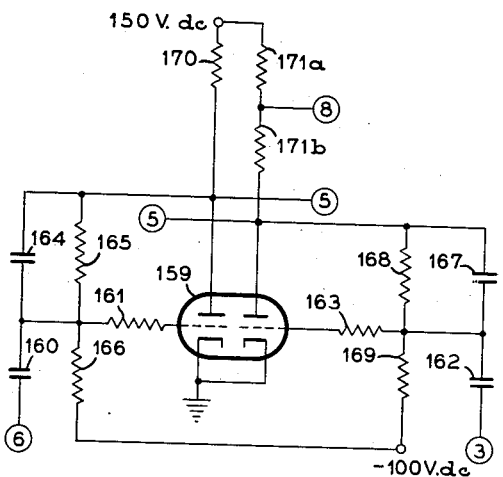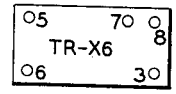
FIG_21  FIG_21a

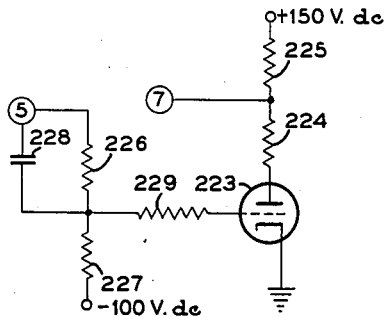
FIG.22
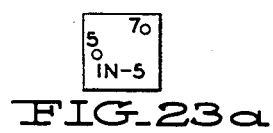
FIG.22a
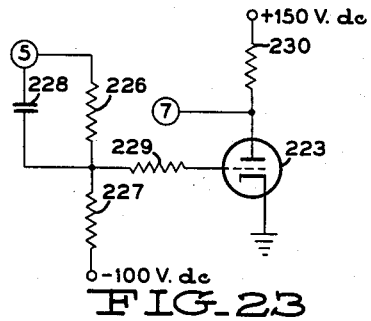
FIG.23a
FIG.23
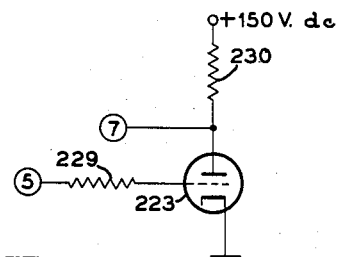
FIG.24a
FIG.24
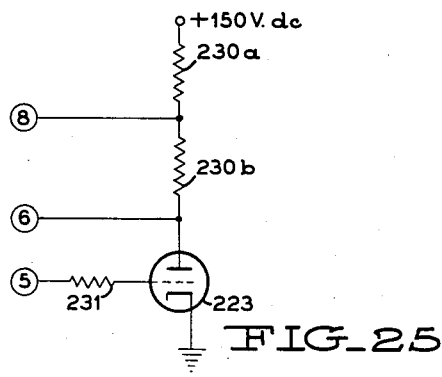
FIG.25
FIG.25a

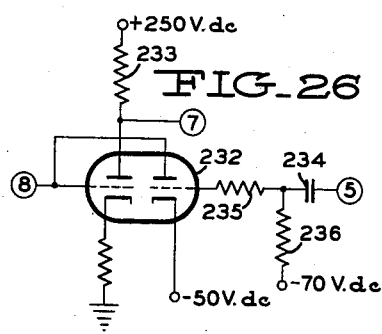
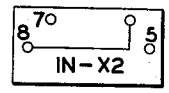
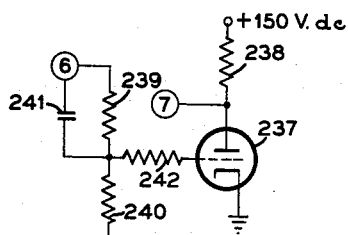
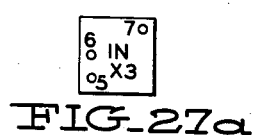
FIG_26
FIG_26a
FIG_27
FIG_27a
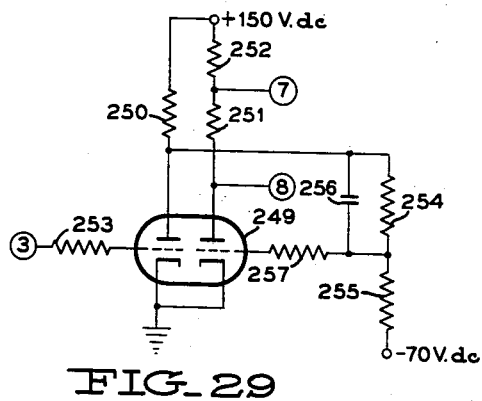
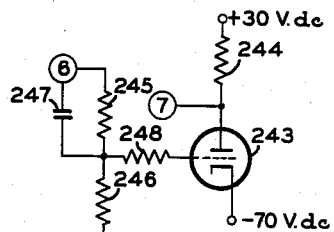
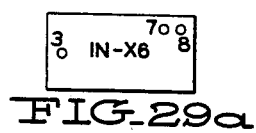
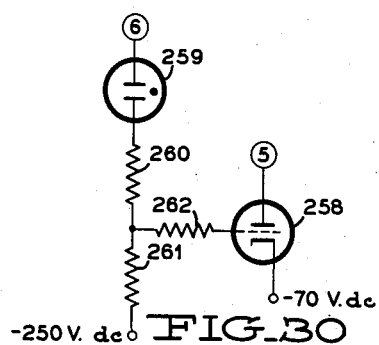
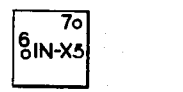
FIG_28
FIG_28a
FIG_29
FIG_29a
FIG_30
FIG_30a

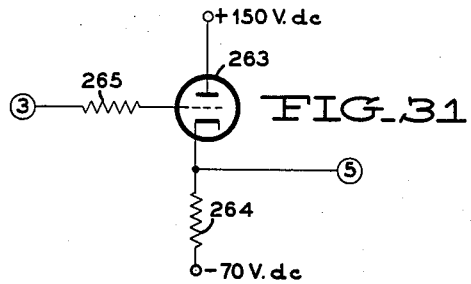
FIG_31
FIG_31a
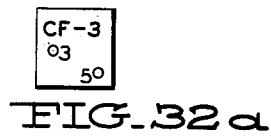
FIG_32a
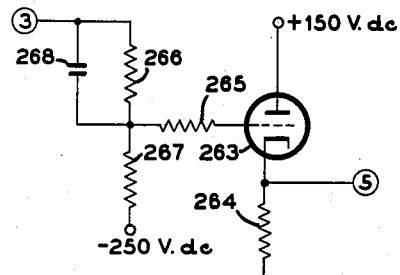
FIG_32
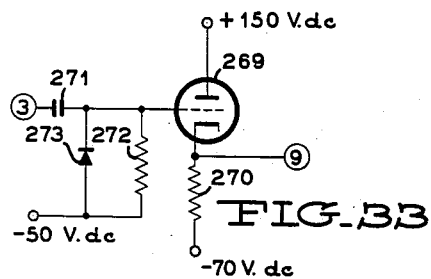
FIG_33
FIG_33a
FIG_34a
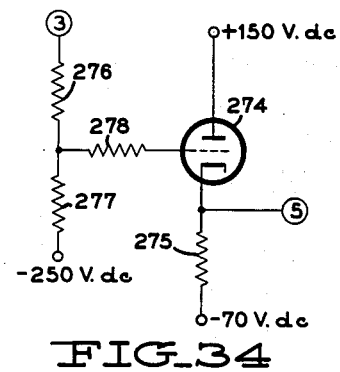
FIG_34

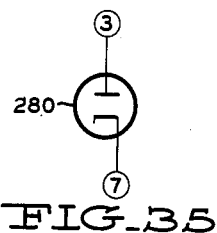
FIG_35
FIG_35a
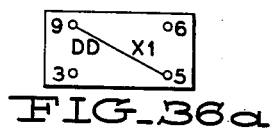
FIG_36a
FIG_36
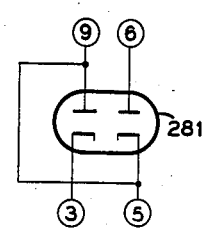
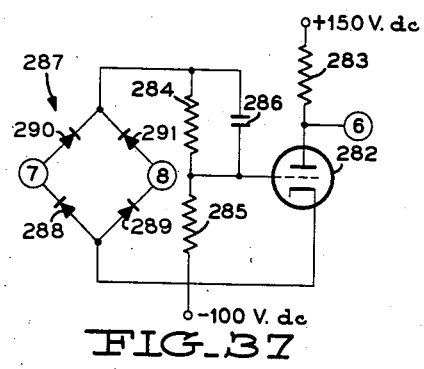
FIG_37
FIG_37a
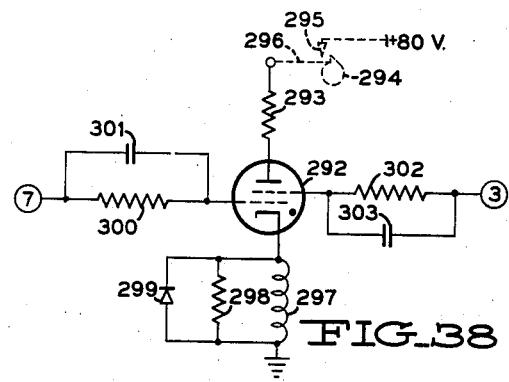
FIG_38a
FIG_38

Dec. 6, 1960     F. M. DEMER ET AL     2,963,683
CHARACTER SENSING SYSTEM
Filed Dec. 31, 1956
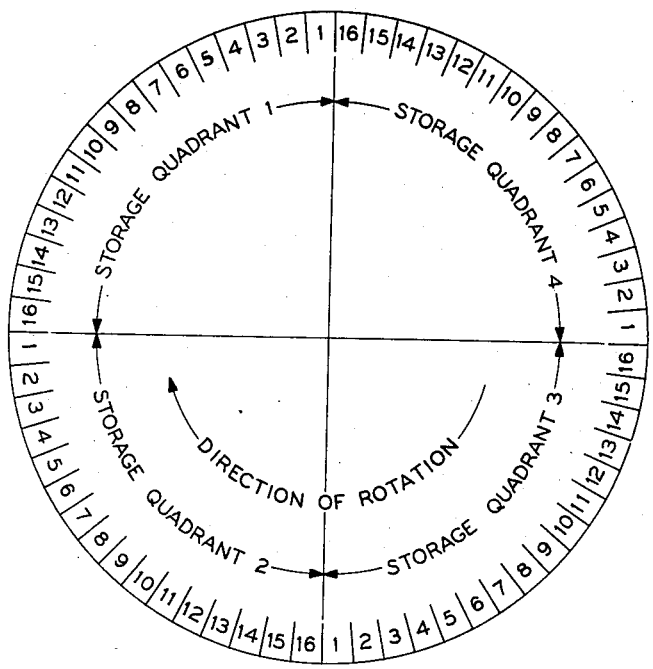
FIG_39
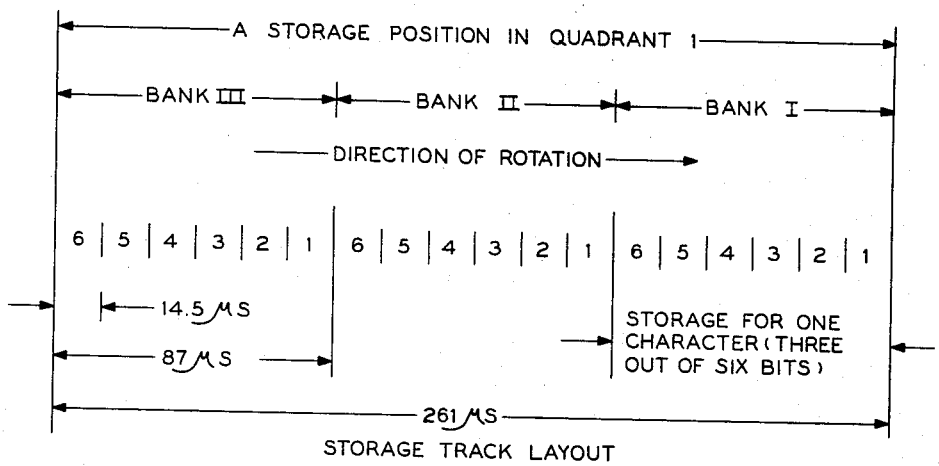
STORAGE TRACK LAYOUT
FIG_40

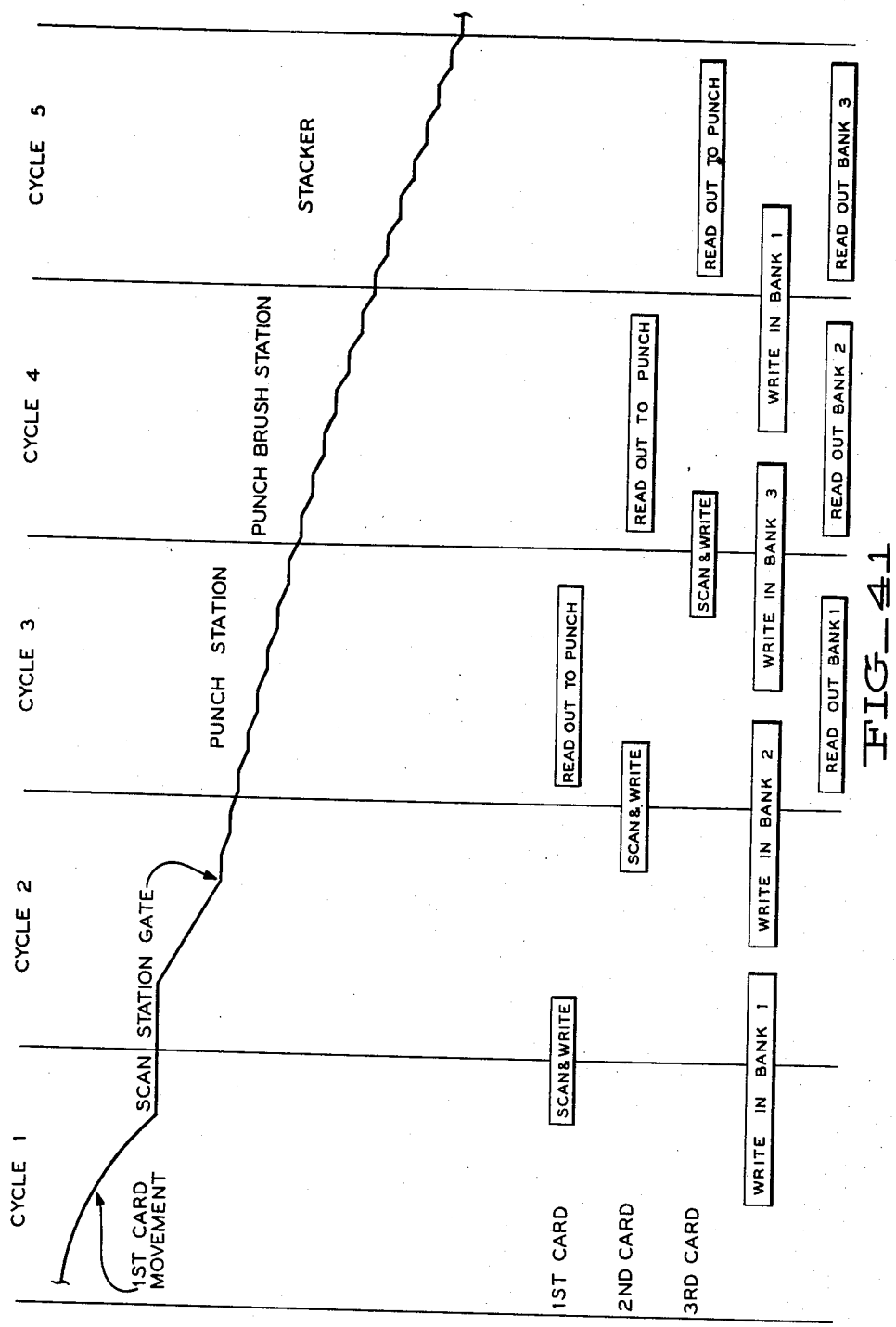

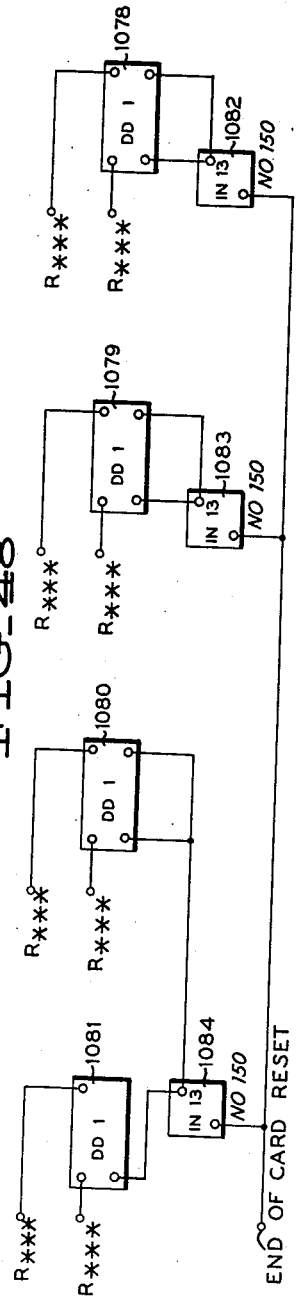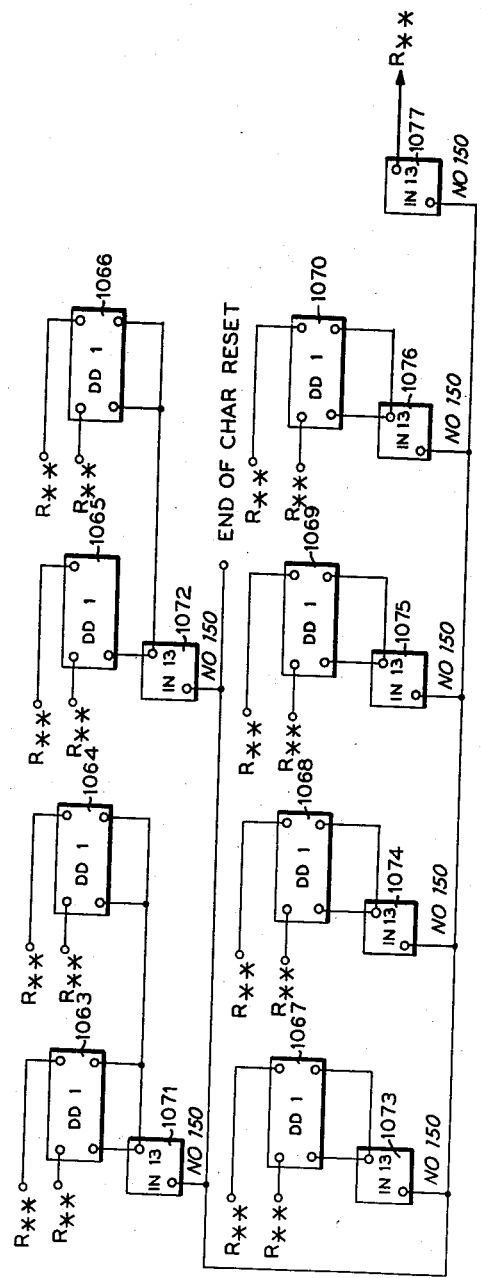

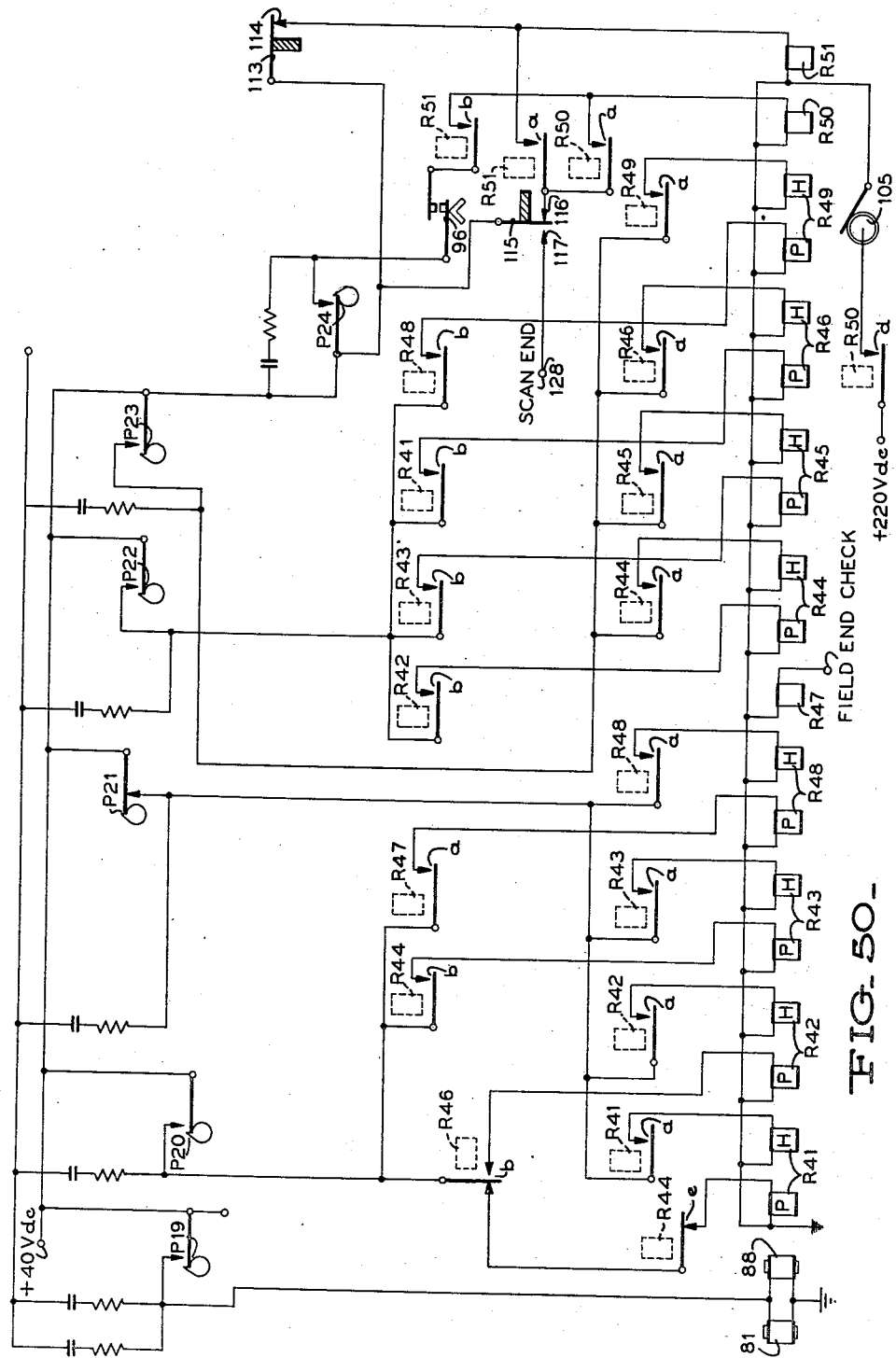

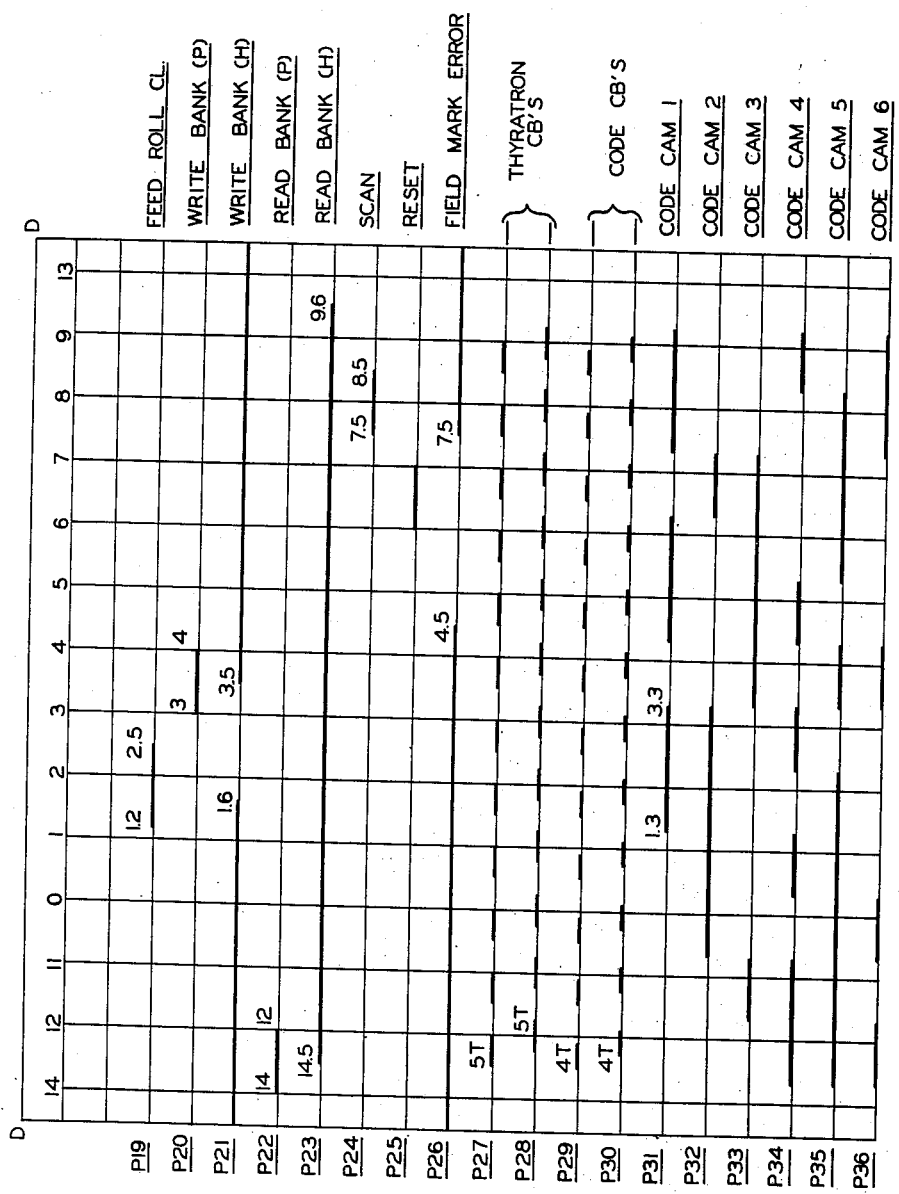
FIG_51

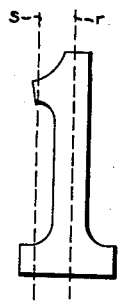
FIG_53a
B2s SEEN
Wr ≠ W1s
∴ WA1/CR
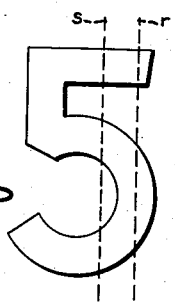
FIG_53b
Wr = W1s
∴ WA1/OR
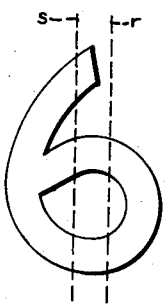
FIG_54a
W1s ≠ W1r
B2R SEEN   B3s SEEN
B3r NOT SEEN
W1s = Wr
∴ WB/OR
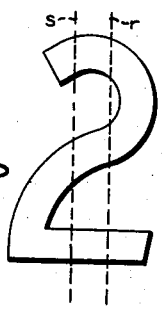
FIG_54b
$\overline{WB/OR}$
B3r SEEN
∴ WB/CR

United States Patent Office 2,963,683
Patented Dec. 6, 1960

2,963,683

CHARACTER SENSING SYSTEM

Frederick M. Demer, Johnson City, John F. Gaffney and William S. Rohland, Endicott, N.Y., assignors to International Business Machines Corporation, New York, N.Y., a corporation of New York Filed Dec. 31, 1956, Ser. No. 631,939

12 Claims. (Cl. 340—149)

The present invention relates to apparatus for sensing indicia manifestations on record media and producing manifestations representative of said indicia manifestations.

A primary object of this invention is to provide a new and improved system for transcribing indicia manifestations on record media into a form more suitable for machine use.

Many attempts have been made in the past to produce apparatus for sensing indicia manifestations such as printed or otherwise formed characters. These characters may be alphabetic letters, numerals and various special symbols. Early atempts in sensing characters involved the use of a beam of light which progressively traversed the character and caused the characteristics of the area traversed to control the operation of a light-sensitive device. The logic used to identify the characters generally depended on the times at which certain unique portions of the character were sensed by the scanning beam. Such systems were relatively s'ow and were limited to the sensing of characters properly positioned in relation to the scanning beam. Other attempts were made along similar lines on characters which were specially formed with code marks. Although this provided a re'atively simple means of identifying characters, little commercial use resulted due to the extensive conversion necessary in printing equipment to produce the specially formed characters.

A later approach to sensing characters involved the so-called mask matching technique. In this approach, an opaque disc having a plurality of openings therein in the form of character outlines is disposed between an illuminated document having printed characters thereon and a photocell. When the photocell senses the fact that a match exists between a particular character out'ine on the disc and the character on a document, an output signal is produced indicative of the identity of the character.

It has been suggested in the past to utilize these relatively slow character sensing devices to feed various types of accounting machines such as punches and sorters. Commercial applications of such combined apparatus appear not to have been used, however. The reasons are undoubtedly due to the fact that they must operate at speeds which are litt'e if any faster than manual key punching and not nearly as reliable from the standpoint of accuracy.

The present invention comprises a relatively high speed character sensing system in which a record having characters thereon is scanned by a suitable scanning mechanism. The characters may exist in a number of rows on the record, each row containing one or more fields in which the characters are located. In the present invention, the vertical registration of the characters in a field relative to each other is not critical. Additionally, the characters may be spaced from each other in a field in any desired manner. The principal requirement is that they be completely within a field in order to be identified. A special circuit is furnished to detect the existence of a character which is partially out of the field.

Each character in a field is progressively scanned in the present embodiment from right to left. A photomultiplier is arranged to view the scanning operation so as to be controlled to produce output signals during the interval that a portion of the character is sensed. These signals are supplied through a video amplifier to an automatic contrast control and clipping circuit. In this circuit the signal from characters of a given ink density are governed to have a predetermined signal to background ratio. Additionally, the clipping circuit produces an output signal only if the video input signal surpasses a variable amplitude which is determined on the basis of whether a portion of the character is expected to be sensed.

Those signals supplied by the automatic contrast control and clipping circuit will be bipolar in nature. That is, one level will indicate the sensing of a portion of the character and may be termed a black signal, and the other level will represent the sensing of the background surrounding the character and may be termed a white signal. It should be understood that the terms black and white are used figuratively to distinguish between the character and the background. Actually, the characters could be red on a yellow background or any other combination of co'ors providing a suitable contrast is afforded.

The black and white signals are fed to a minimum black and minimum white circuit. This circuit produces black and white output signals which are modified to some extent from the input signals. For example, a very short black input signal will cause a black output signal of a predetermined duration. The same is true for white signals providing the input white signal occurs at a time other than during the production of a minimum black signal. Also, during the production of a minimum white signal, black input signa's will not be allowed to produce black output signals.

Since impact printed characters as well as many other types of printed characters often have rather fuzzy edges, there is provided a defuzzing circuit for eliminating the black signals which may be produced as the scanning means is entering a character portion and for eliminating the white signals which may be produced as the scanning means is leaving a character portion.

After defuzzing, the black and white signals are supplied to a recognition circuit. This circuit examines these signals and produces a coded output signal indicative of the identity of each character scanned. Basically, the recognition circuit looks at each scan as it ocurs and detects the existence of one or more included white areas in the character covered by the scan, the number of separate character portions encountered, and the relative times when the white areas and the character portions are encountered. A similar detection is made for a prior scan through a character. Voltages representative of the existence of the enclosed white areas, the character portions and the instantaneous black or white signals being received, are utilized to detect characteristics of the character which may be termed signature components. Several of the signature components represent certain background areas within a character which are bounded by portions of the character. Other signature components relate to such things as long and short positive slopes, right and left overhangs and vertical lines before and after three crossovers.

The number of signature components relating to the background areas within a character bounded by portions of a character will vary with the characters being scanned. The first included white area encountered in a character is identified as WA1. If a second included white area is encountered with WA1 still in existence, the second area is identified as WB. If WA1 is not in existence when a second included white area is encountered, this second area is labelled WA2. A determination is made as to whether WA1 and WB are open or closed to the right and/or left and as to whether WA2 is open or closed on the left. The WA1 component is initially assigned to exist in the upper portion of the character. This assignment is subject, however, to a later determination that WA1 is actually in the lower portion of the character.

The logic circuitry utilized to receive the various signature components to identify a character may use either the existence or non-existence of predetermined signature components to identify the character.

In the embodiment illustrated, the record cards having the characters thereon are fed to a scanning station during one cycle and punched several cycles later with manifestations representative of the characters on the card which were scanned and identified. So that the coded character identity signals will be available during the punching operation, they are fed to a register, which, in the present instance, is in the form of a magnetic drum.

As previously mentioned, the characters on a record card exist in rows. Each row of characters may comprise one or more fields in which characters may be located. For example, there may be five fields in a row with characters in each field. A field mark is utilized as the boundary between adjacent fields. In the present embodiment, the capacity is such that up to sixteen characters may be sensed in up to three of the five fields. However, these numbers are illustrative only, since with the teachings of this invention slight changes could be made to afford the recognition of characters in all of the fields and the total number of characters identified could be increased above sixteen.

Each field may be arbitrarily assigned to have a certain maximum number of characters therein. There are times, however, when it is desirable to have less than this maximum number of characters in a field. In the present invention, if the total number of characters identified in a field is less than the maximum number for that field, zeros are inserted after the last character in a field is identified to produce the proper number of characters in a field. The time for zero insertion occurs when a field mark is identified, indicating the end of a field. For example, if a field is adapted to contain a maximum of five digits and actually contains only three, then two zeros are inserted in storage following the highest significant digit identified. Following the identification of the field mark, characters in the next field may be sensed.

Special circuits are furnished which detect the existence of a field mark which is crowded on either the right or left by a character.

Once all of the characters and the inserted zeros are in storage, it is only necessary to await the arrival of the record card at the punching station. As is well known, record cards may be divided into eighty vertical columns, each column having twelve index points. These index points are designated 12, 11, 0, 1, 2, 3, 4, 5, 6, 7, 8 and 9. Similar numbered index points in the many columns are in rows which may be identified by the index point number. In this invention the record card is fed to the punching mechanism 12 row first. The card is fed intermittently row by row under a row of eighty punches. By the time the 0 row of the card is under the punches, all of the zeros to be punched in the card are read out of storage and used to set up punch magnets for the columns of the card in which zeros are to be punched. Once all of the punch magnets are set up for punching zeros, punching takes place. Next, the card advances until row 1 is under the punches. All of the ones in storage are read out, as in the case of the zeros, and punching takes place. This action continues until the card passes from the punching station.

Special circuits are provided to prevent punching of the card under various conditions where proper identification of the characters has not been made.

Another object of the present invention is to provide a new and improved system for sensing characters on record media and producing manifestations on record media representative of the identity of the characters scanned.

Another object of this invention is to provide a new and improved system for scanning and identifying characters which may be in random arrangement on a record medium and to store data representative of the characters in ordered positions on a record medium.

Another object of the invention is to furnish a new and improved character sensing system in which characters on a record medium positioned in one or more fields are automatically transcribed into predetermined fields of a record medium.

Still another object of the present invention is to read characters in a predetermined field in a record medium and to produce intelligence representative of said characters in a predetermined location in the same or a different record medium.

A further object of the present invention is to read one or more characters in a field in which a predetermined number of characters may exist and to produce in a record significant intelligence representative of the significant characters read and insignificant intelligence representative of the difference between the number of characters read and the number of characters which may exist in the field.

Still further, it is an object of this invention to read characters from one or more selected fields out of a plurality of fields in a record medium and to produce in a record medium significant manifestations representative only of the characters from the selected fields.

A still further object of this invention is to produce manifestations in fields in a record medium representative of characters read from one or more of a group of fields in a record medium unless an indication is received that one or more of the characters read are not properly registered in their respective fields.

Another object of this invention is to produce a character sensing system for reading characters from one or more of a group of fields and for sensing the total number of fields, there being provision for incorporating manifestations representative of the characters read in a record medium unless an indication is provided that the total number of fields sensed is not bearing the proper relationship to a predetermined number of fields.

Still another object of the present invention is to read significant characters and program characters from a record medium in which one or more of the significant characters are separated by said program characters and to produce manifestations in a record medium representative of one or more of the significant characters unless the total number of program characters sensed is not equal to the number which should have been sensed.

Another object of this invention is to read significant characters and program characters on a record medium in which one or more significant characters are separated by program characters and to produce manifestations in a record medium representative of the significant characters between selected pairs of said program characters and to incorporate manifestations of insignificant characters with the significant characters in the last-named record medium where the total number of characters sensed between a pair of program characters is not equal to a prescribed number.

Yet another object of this invention is to store in a first record medium manifestations representative of a character read from a second record medium in response to a signal indicative of the end of the reading operation for that character.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a block diagram of the present invention;

Figs. 2A, 2B, 2C, 2D, 2E, 2F, 2G, 2H, 2J, 2K, 2L, 2M, 2N, 2P, 2Q, 2R, 2S, 2T, 2a, 2b, 2c, 2d, 2e, 2f, 2g, 2h, 2i, 2j, 2k, 2m, 2n, 2p, 2q represent a detailed schematic block diagram of the present invention, the various figures being adapted to be combined as shown in Fig. 3;

Fig. 4 is an isometric view of the card feed and punch mechanism, various parts being broken away for clarity of illustration;

Fig. 5 is a schematic side elevation view of the card feed and punch mechanism;

Fig. 6 is a schematic view of the scanning mechanism;

Fig. 7 illustrates the manner in which the scanning of a character is accomplished;

Figs. 8 through 38 are schematic diagrams of various typical circuit configurations in block form as shown in Figs. 8a through 38a, respectively;

Fig. 39 shows the manner in which the general storage track of the drum is divided into four quadrants, each quadrant containing sixteen storage positions;

Fig. 40 shows a single storage position and the manner in which it is divided into three banks for storing a single three-out-of-six coded character in each bank;

Fig. 41 shows the relationship between card movement and the scanning, writing and reading operations;

Fig. 44 shows by way of example a record card suitable for use in the present invention;

Fig. 45 shows the detailed schematic block diagram of the registration detection circuit;

Fig. 46 shows the end of scan reset circuit;

Fig. 47 shows the end of character reset circuit;

Fig. 48 shows the end of card reset circuit;

Fig. 50 is a relay circuit which is utilized in the punch to control the circuit shown in Fig. 42;

Fig. 51 is a cam timing chart for the cams shown in the various drawings;

Figs. 52a, 52b and 52c illustrate the use of the defuzz circuit; and

Figs. 53a, 53b, 54a and 54b illustrate, by way of example, the manner in which certain signature components may determine the identity of the characters illustrated.

GENERAL DESCRIPTION

Figure 21:
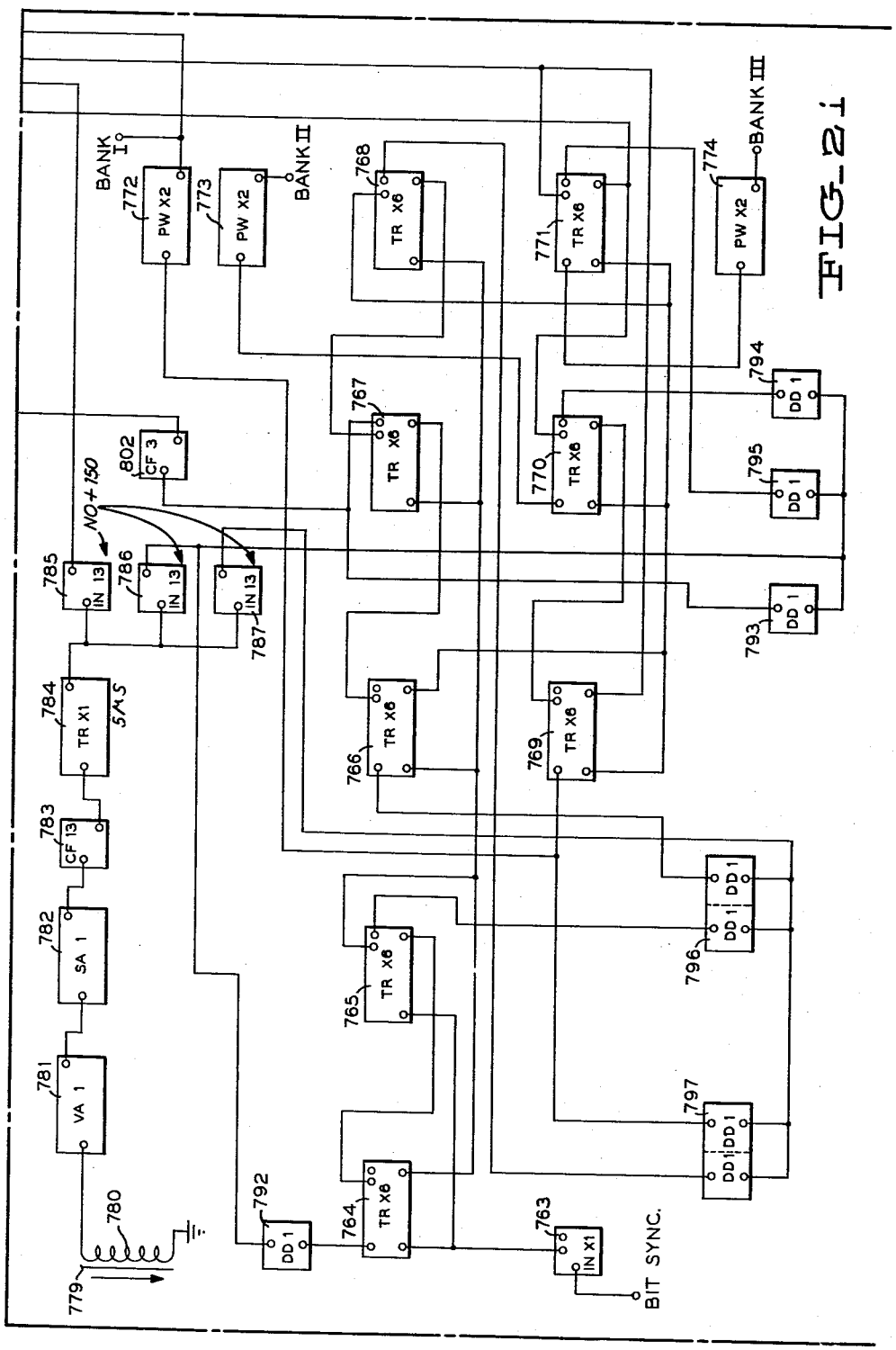

There is illustrated in Fig. 1 a functional block diagram of the present invention. The drawing is quite general and is intended, along with the following description, to serve as an introduction to the detailed description which is presented hereafter. In the interests of clarity, the interconnections of the synchronizing and reset circuits are not shown. However, these interconnections will be apparent from the detailed description. In Fig. 1, dotted lines are intended to represent a mechanical interconnection and solid lines represent electrical data flow. The one wavy line shown illustrates a light path.

The record cards which bear the character data are adapted to be fed from a card feed 21 past a scanner 1 to the punch 20. In the embodiment illustrated, the cards are picked one at a time and fed to a scanning station where they stop momentarily. While they are stationary, a lens system is caused to move in a manner to successively present images of the characters on the card to a mechanical image dissecting apparatus. That is, a character image is moved past the image dissecting apparatus in a manner such that successive vertical sweeps may be made through each character image. The photomultiplier and video circuits block 2 is shown to receive light information from the scanner. The photomultiplier views the successive portions of the character images presented thereto and supplies an electrical signal which is a function of the change in light energy received. The output of the photomultiplier is improved in the associated video circuits in terms of strength and reduced to a binarized signal having two levels. One level represents the fact that a portion of a character is sensed and may be termed a black signal. The other level represents the fact that a portion of the background surrounding the character outline is sensed and may be termed a white signal.

The black and white signals leaving the photomultiplier and video circuits box 2 are fed to a circuit 3 which is labelled as a minimum black-minimum white circuit. The function of this circuit is to assure that the first black signal presented thereto lasts at least a predetermined interval of time. If a black signal continues to exist or ends and begins again before the end of this predetermined interval of time, the output signal continues until a white signal is received. This white signal will also continue for a predetermined interval of time. Any black signal presented during the last-named interval will be excluded from the output. If a white signal is in existence at the end of the said last-named interval, the output will continue to be a white signal until a new black signal is received. This process is repeated throughout the scan so that minimum black and minimum white signals are produced according to the described rules.

The black and white signals from the minimum black-minimum white circuit are fed directly to a defuzz circuit 4 and indirectly thereto by way of a delay register on a magnetic drum storage device 5. It will be seen that there is a mechanical interconnection between the scanner and the magnetic drum. As will be more apparent from the detailed description, the scanner utilizes a rotating disc having a plurality of radial slits therein which are successively moved past a fixed slit. Each movement of a radial slit past the fixed slit results in a single scan through a character image. The outer periphery of the rotating disc is provided with a rim having a magnetizable surface. This magnetizable surface is divided into a number of tracks which are used for storage purposes.

The black and white signals entering the delay register from block 3 are delayed for a period equal to one scan through the character and then read out to the defuzz circuit 4. This circuit is utilized to improve the data which is obtained in scanning the fuzzy edges of character outlines, particularly the vertical portions thereof. This circuit continuously compares black and white signals obtained on a present scan with the black and white signals obtained on the previous scan. Thus, at any one time the signals compared are for laterally adjacent areas on the record card. A match of black signals or a match of white signals is sought. A match of black signals is used to set a trigger which can only be reset by a match of white signals. This provides an arrangement whereby the fuzzy edges on the right side of a character are eliminated by removing black signals from the output, and the fuzzy edges on the left side are eliminated by adding black signals. This circuit produces no overall change in the width of the vertical portion of the character being scanned.

The black and white output signals from the defuzz circuit are fed directly to a signature components circuit. In addition, the black signals from the defuzz circuit are supplied through a one scan delay register in the storage device 5 to the signature components circuit. Thus, the latter circuit has available, on a continuous basis, black and white signals representative of data on a present scan as well as black and white signals representative of data on a previous scan.

The function of the signature components circuit is to process the data supplied thereto and to supply output signals in a three-out-of-six code representative of the identity of a character scanned. Briefly, this circuit detects the number of crossovers and included white areas on each of the present and previous scans and relates them on the basis of time. These conditions are utilized to establish the existence of certain included white areas, i.e., the white signal on a scan between two black signals. Circuitry is provided to determine whether these included white areas are open or closed to the left and right sides thereof. As previously mentioned, there are a number of other conditions which are detected to provide signature components. The existence or non-existence of certain ones of these signature components after the termination of the scanning of a character is used to produce the afore-mentioned coded output signal.

At the end of the scanning of a character, the coded output signal from circuit 6 enters a write register 7. It is desired that the information in the write register be entered into the general storage area of the drum 5 but it must not be entered until the proper time.

It has previously been explained that the record card being scanned has one or more fields in which characters may be positioned. A field is defined as the area between a pair of field marks. Each field is arbitrarily assigned to contain up to a maximum number of characters. In the present embodiment, up to a maximum of sixteen characters may be identified in up to three separate fields in a single row of characters on the card.

In storing the identified characters on the drum, it is desirable to store those characters from a particular field on the card in predetermined positions on the drum. This is of value later in reading from the drum and punching a card in a manner such that the data representative of characters in predetermined fields in the scan area of the card may be punched in predetermined fields of the punching area of the card.

The detection of a field mark is carried out in the signature components circuit 6 after which a signal is supplied to the field selection and control circuit 8. This circuit is prewired in a manner to select those fields of the card which contain characters to be identified and to supply a signal back to the signature components circuit to allow the three-out-of-six coded signals to leave the signature components circuit and enter the write register 7.

As previously stated, a determination must be made as to the proper time for shifting the information from the write register into the general storage area of the drum 5. This action is governed by the write control circuit 9. The instantaneous position of the drum into which information may be entered is detected by the storage position circuit 10. This circuit contains a plurality of ring counters and a binary counter which are pulsed by the bit sync obtained from the sync track area of the drum. The storage position circuit continuously supplies an input to a comparing circuit 11 indicating the drum position.

Each time a character is entered on the drum, the write control circuit 9 adds one count into the character position circuit. The last-named circuit also supplies an input to the comparing circuit indicative of the number of characters which have been stored. When there is an equality in the comparing circuit 11 between the storage position and the character position, an output is supplied therefrom to the write control circuit 9, indicating that it is time for the shifting of the information from the write register 7 into the drum 5. However, before this can be carried out, additional inputs must be supplied to the write control circuit. The end of character signal must be supplied from the field selection and control circuit. There are additional inputs which select one of three banks of a particular storage position. These inputs are not illustrated but are necessary due to the fact that information from a maximum of three cards must be stored since that many cards may be read before the first card is punched. That is, first, second and third cards are successively scanned. As the third card is being scanned, the first card is being punched. Therefore, it is necessary to store the information from the first card in a first portion of each storage position, that from the second card in a second portion, and that from the third card in a third portion. The information from the fourth card is stored in the first portion since the first card has already been punched and the data relative thereto erased from storage.

Once all of the conditions of the write control circuit are satisfied, a signal is fed to the write register 7 to cause the information therein to be shifted into the proper storage location on drum 5. As the information enters the drum, a signal is supplied from the write control circuit to the character positions circuit. Thus, the latter circuit contains an indication at all times of the number of characters entered in storage for a particular card.

After all of the characters from the first selected field of the card have been entered in storage, an examination is made to determine whether the number entered is equal to the maximum number assigned to that field. This action begins when the field mark separating the first selected field from the next field is detected. When this occurs, a signal is supplied to a zero insertion control circuit 13 indicating the end of a scanned field. The zero insertion control circuit is prewired for the maximum number of characters which may exist in each of the selected fields. Its output, therefore, to a comparing circuit 14 indicates the total number of characters assigned to the selected field which have been scanned. If the number of characters which have been stored in the drum, as indicated by circuit 12, is not equal to the assigned number, as indicated by circuit 13, an output is fed to the write register 7 and to the write control circuit 9. Thereafter, the three-out-of-six code for a zero is written into storage in drum 5 until comparing circuit 14 indicates an equality between circuits 12 and 13. Thus, it is seen that if a field does not contain the number of characters assigned thereto, a number of zeros are inserted to fill up the field. This allows the characters in the next selected field to enter the correct storage positions.

The information in the drum for a particular card is punched in that card in the present embodiment. As the drum rotates, the character information stored thereon is read out through a read control circuit 15 to a read register 16. The read control circuit makes sure that only the information for the particular card to be punched is supplied to the read register. Since the card is advanced under the punches in punch 20 on a row by row basis, the punch supplies an input to the comparing circuit 17 in a three-out-of-six coding representing the particular character which is to be punched in that row. Thus, the first input from the punch to the comparing circuit would be the three-out-of-six coding for a zero. If the three-out-of-six coding for a zero exists in the read register, then an output is supplied from the comparing circuit to the thyratron matrix 18. There are sixteen thyratrons and associated punch magnets in the thyratron matrix. This is the same number as the number of storage positions on the drum and is of course equal to the total number of characters which the present embodiment may recognize from a single row of characters on the card.

Each thyratron and associated punch magnet controls a particular punch within the punch 20. Since scanning and recognition of the characters on the card occurs from right to left, the characters are successively stored on the drum in positions one through sixteen as they are scanned and recognized. If columns one through sixteen of the card are to be punched with the character information, then the characters in storage positions one through sixteen of the drum are punched in columns sixteen through one, respectively, of the card. Thus, if the character zero is stored in position one of the drum, the thyratron and associated punch magnet for column sixteen in the card should be energized. In order that this correlation may be provided, the storage position circuit 10 supplies inputs to the thyratron matrix indicative of the position of the drum. Therefore, any time the comparing circuit 17 supplies an input to the thyratron matrix indicating the occurrence of a match between the signals received from the punch and the read register, only that thyratron within the matrix selected by the storage position circuit 10 will be fired.

After all of the zeros in a particular storage position for a particular card have been read out and punched, and digits 1 through 9 are successively detected.

The block 19, which is labelled sync generators, is utilized to generate the many syncs necessary throughout the entire system. The use of these syncs will be more apparent from the detailed description.

CARD FEED AND PUNCH

In order that a better understanding of the present invention may be had, the card feeding mechanism and the punching mechanism will be briefly explained in conjunction with the diagrammatic illustrations in Figs. 4 through 7.

Referring to Fig. 4, the punching mechanism, illustrated generally by reference numeral 20, may be similar to that shown in Reissue Patent No. 21,133, granted to C. D. Lake on June 27, 1939, for Perforating Machine. The feeding mechanism is illustrated generally by reference numeral 21 and is comprised of a plurality of conventional elements which will be described briefly to explain the manner in which a record card is fed therethrough to the punching mechanism. A card 22 is adapted to be picked from a hopper (not shown) by picker knives 23 which are reciprocated in a manner to cause the leading edge of the card to enter continuously running feed rolls 24 and 25 respectively mounted on shafts 26 and 27. The picker knives are mounted on arms 28 which are fixed to a shaft 29. Shaft 29 is connected to a shaft 33 by means of a linkage comprising arms 30 and 31 on shafts 29 and 33, respectively, and a link 32 connecting the free ends of said arms. Shaft 33 is adapted to be oscillated in the usual manner from the punch mechanism such as that shown in the previously referred to patent.

The card is delivered to a second pair of opposed rolls comprising rolls 34 and 35 mounted respectively on shafts 36 and 37. These rolls are driven in a manner to stop at about the time they have placed a bite on the leading edge of the card. A pressure pad 38 mounted on a vertically reciprocating support 39 is adapted to be lowered onto the card. Thereafter, the under side of the card is scanned by the mechanism shown in Fig. 6 in a manner which will be described hereinafter.

After scanning is completed, the pressure pad is lifted and rolls 34 and 35 begin to move the card forward to skid rolls 40 and 41 which are respectively mounted on shafts 42 and 43. A pair of intermittently driven punch feed rolls 44 and 45 are mounted on shafts 46 and 47, respectively, these rolls being adapted to be periodically cammed open, as will be described later in the description, to permit the card to be fed therethrough until the leading edge of the card strikes a gate 48. The card is held against the gate by the aforementioned skid rolls. At an appropriate time, rolls 44 and 45 are closed and the card is fed intermittently to punching mechanism 20.

The portion of the punching mechanism shown includes a plurality of punches 49 which enter a guide block 50. A die block 51 is spaced beneath block 50 to allow the card to pass therebetween. Each of the punches is set up through an interposer 52 which may be operated by a link 53 connected to the armature of a magnet 54. If a particular interposer is actuated the swinging bail 55 is allowed to enter a slot 56 in the interposer and push the punch associated with the actuated interposer through the record card. The swinging bail 55 is mounted on a block 57 which is pivoted on a shaft 58. Block 57 is reciprocated by means of a shaft 59 which is eccentrically mounted in a disc 60, the disc being freely rotatable in a ring 61. Ring 61 is connected by means of an adjustable link 62 to block 57.

Referring again to gate 48, it is shown to be mounted on one end of a pair of rocker arms 63, these arms being pivotally mounted on shaft 42. The other ends of arms 63 are adapted to serve as followers on cams 64 which are fixed to a cam shaft 65. So that the card may be properly aligned laterally of gate 48, an end aligner is pivotally mounted by means of bolts 66 and is adapted to engage one end of the card at an appropriate time for moving it laterally of gate 48 up against a stop (not shown) adjacent the other end of the card. The end aligner has an arm 67 which is adapted to serve as a follower on cam 68 which is mounted on cam shaft 65.

The operation of the pressure pad 38 and its support 39 is controlled by a link 69 which is pivotally mounted on shaft 36. One end of this link engages cam 70 on shaft 65 and the other end engages support 39. Thus, at appropriate intervals, the pressure pad is raised and lowered. It will be understood that support 39 is adapted to move in a suitably vertically extending guideway (not shown) which receives the blocks 71 at each end of said support.

The control of cam shaft 65 and the non-continuous drive for shaft 36 can be better understood by additional reference to Fig. 5 which shows a schematic diagram of the gear drive therefor. Shaft 26 is adapted to be driven continuously from the main drive shaft of the punch mechanism. Meshing gears 72 and 73 on shafts 26 and 27, respectively, serve to drive feed rolls 24 and 25, respectively. A gear 74 mounted on a shaft 75 serves to drivingly connect a gear 78, also on shaft 26, with a gear 76 which is freely rotatable on cam shaft 65. A single detent ratchet disc 77 is secured to gear 76 for rotation therewith. A clutch disc 78a is fixed to cam shaft 65 and has a pivoted pawl 79 mounted thereon. This pawl normally is held out of engagement with the continuously rotating ratchet disc 77 by the armature 80 of a magnet 81. A pivoted dog 82 is adapted to engage a detent in disc 78 to prevent rotation of the disc in a clockwise direction. When magnet 81 is energized, pawl 79 is allowed to fall in the detent on ratchet disc 77. At this time clutch disc 78, as well as cam shaft 65, begin rotation. After rotation begins, magnet 81 is de-energized, so that at the end of one revolution, pawl 79 is lifted out of the detent in ratchet disc 77 by the armature 80, thereby causing the cam shaft to cease rotation. The above-described clutch mechanism is commonly referred to as a one revolution clutch and is well known in the art.

A similar one revolution clutch is provided for driving shaft 36. Gear 74 meshes with a gear 83 which is rotatably mounted on shaft 36. A disc 84 is secured to gear 83 for rotation therewith. Disc 84 is furnished with a detent which is adapted to receive a pawl 85 pivotally mounted on an arm 86 when permitted to by the armature 87 of a magnet 88. Arm 86 is fixed to shaft 36. The arrangement is such that when magnet 88 is energized, armature 87 is withdrawn from engagement with arm 86 and one end of pawl 85. As soon as disc 84 rotates sufficiently to allow pawl 85 to drop into the detent in the disc, arm 86 and the cam shaft 36 rotate one revolution. Rotation ceases at the end of one revolution since armature 87 lifts pawl 85 out of the detent in disc 84 and at the same time engages one end of arm 86.

As pointed out heretofore, feed rolls 44 and 45 are driven intermittently as in the conventional punch. Referring to Fig. 5, gears 89 and 90 are mounted on shafts 46 and 47, respectively, drive being furnished to shaft 46 through the usual Geneva mechanism as shown in the afore-mentioned Lake patent. So that the record card can be fed against gate 48 for alignment preceding punching, feed rolls 44 and 45 are periodically cammed open. This is accomplished by means of an arm 91 mounted on shaft 47. A slot 92 is provided in the arm for slideably receiving a cam shaft 93 which carries a cam 94. The cam shaft is driven from the main drive of the punch in a manner to rotate cam 94. Follower roller 95 is mounted at the lower end of arm 91 and is positioned to follow cam 94. It will be seen that in this manner cam 94 causes shafts 46 and 47, and thereby feed rolls 44 and 45, to periodically separate. The timing is such that the feed rolls close during a dwell in feed roll rotation. Thereafter, the gate is raised and the feed rolls can intermittently feed the card to the punching mechanism.

SCANNER

The mechanism for scanning the character data on a card at the scanning station is diagrammatically illustrated in Fig. 6. It will be remembered that the card is stopped shortly after the time the leading edge is gripped between feed rolls 34 and 35. A conventional card lever contact 96 is positioned beneath the scanning station in such a manner that a circuit is closed therethrough as long as a card is in the scanning station. The character data on the underneath side of the card is illuminated from a source 97. A lens 98 is mounted on a rack 99 which is suitably mounted within a light tight box 100 for reciprocating movement. The rack is driven by a pinion 101 which is mounted on a shaft 102. This shaft is coupled to a shaft 103, which is driven by motor 104, by means of an electrostatic clutch illustrated generally by reference numeral 105. This clutch utilizes the well-known Johnson-Rahbek effect of electrostatic attraction. Briefly, it comprises a disc 106a connected to shaft 103 and at its periphery has an outer ring 106 constructed from a conductive material. Ring 106 is suitably insulated from shaft 103. A second disc 107 is secured to shaft 102 and at its periphery has a ring 108 formed thereon. This last ring is constructed of a material such as brass. A thin layer of semiconductive material is provided on the outer surface of ring 108. On the inside periphery of ring 106, there is provided a steel band 109 having one end thereof connected to the ring. The other end of the band is connected by a spring to the inside of ring 106 approximately three-fourths of the way around the ring. The middle portion of band 109 is adapted to ride on the semiconductive surface of ring 108. Electrical contacts 110 and 111 are arranged to slideably engage rings 106 and 108, respectively. It should be noted that contact 111 engages the portion of ring 108 beneath the semiconductive layer. Contact 110 is adapted to have a voltage of approximately 200 v. D.C. applied thereto for selected intervals of time and contact 111 is connected to ground potential. When a potential difference exists across the contacts, the steel band 109 is electrostatically attracted to the semiconductive layer on ring 108 and shaft 102 is driven from shaft 103. As soon as the difference in potential is removed, the electrostatic attraction is removed and shaft 102 is no longer driven through the clutch.

From the above, it will be seen that lens 98 will be driven to the right, as shown in the drawing, by a clockwise rotation of pinion 101. A spring 112 is arranged to return the lens to a rest position when the motor drive to shaft 102 ceases. Various electrical control circuits will be described later. For the present, it is only necessary to point out that a contact 113 is suitably mounted to move with rack 99, and in the rest position of the rack is adapted to engage a fixed contact 114. As will be later described, these two contacts will be utilized to detect the fact that the rack has returned from a scanning operation and is in the rest position.

When lens 98 has scanned the proper amount of the record card, rack 99 engages a movable contact 115 and transfers it from engagement with fixed contact 116 to engagement with a fixed contact 117. As will be later described, when movable contact 115 leaves engagement with fixed contact 116, the power supply to clutch 105 is removed, allowing spring 112 to return the lens to its rest position. When contact 115 reengages contact 116, an impulse is initiated which will be referred to as an End of Card signal.

Inside the light tight box 100 there is further provided an inclined mirror 118 which is arranged to reflect the images from the card received through lens 98 to a lens 119. A fixed plate 120 having a slit 121 is mounted in the optical path of lens 119. It will be seen that as lens 98 is moved to the right, images of the characters on the card will move past slit 121 at right angles thereto.

A rotating disc 122 is mounted on a shaft 123 which is adapted to be driven in the present instance at approximately 3600 r.p.m. by a suitable drive mechanism from a synchronous motor. Disc 122 is furnished with thirty-six equally spaced radial slits, one of which is illustrated by reference numeral 124. The spacing of slits 124 is such that one slit can move across the optical path, as seen from fixed slit 121, before the next slit enters the optical path. A photomultiplier 125 is arranged to view whatever exists in the optical path from slits 121 and 124.

Referring to Fig. 7, the manner of scanning the character will be apparent when it is seen that the character images, such as that for the digit "3" move across the fixed slit 121 in the direction indicated. The radial slit 124 moves across that portion of the image which gets through slit 121. Thus, the photomultiplier 125 sees at any instant only that portion of the image which is at the intersection of slits 121 and 124. The effect is for the photomultiplier to make rapid successive vertical scans from top to bottom, each rapid scan being displaced to the left of a prior scan on the character. The slits may be in the order of .004" in width. The number of scans made in a vertical direction across the character depends on the rate of movement of lens 98 and the rate of rotation of disc 122.

The periphery of disc 122 has a peripheral ring 126 formed thereon. The outer surface of this ring is coated with a magnetic material. Thus, there is in effect provided a magnetic drum. A plurality of magnetic heads, one of which is illustrated by reference numeral 127, are furnished to perform reading, writing or erasing functions on the drum surface. The specific heads provided and their relationship to each other on the drum will be apparent from subsequent portions of the description.

SCANNER OPERATION

Figure 49:
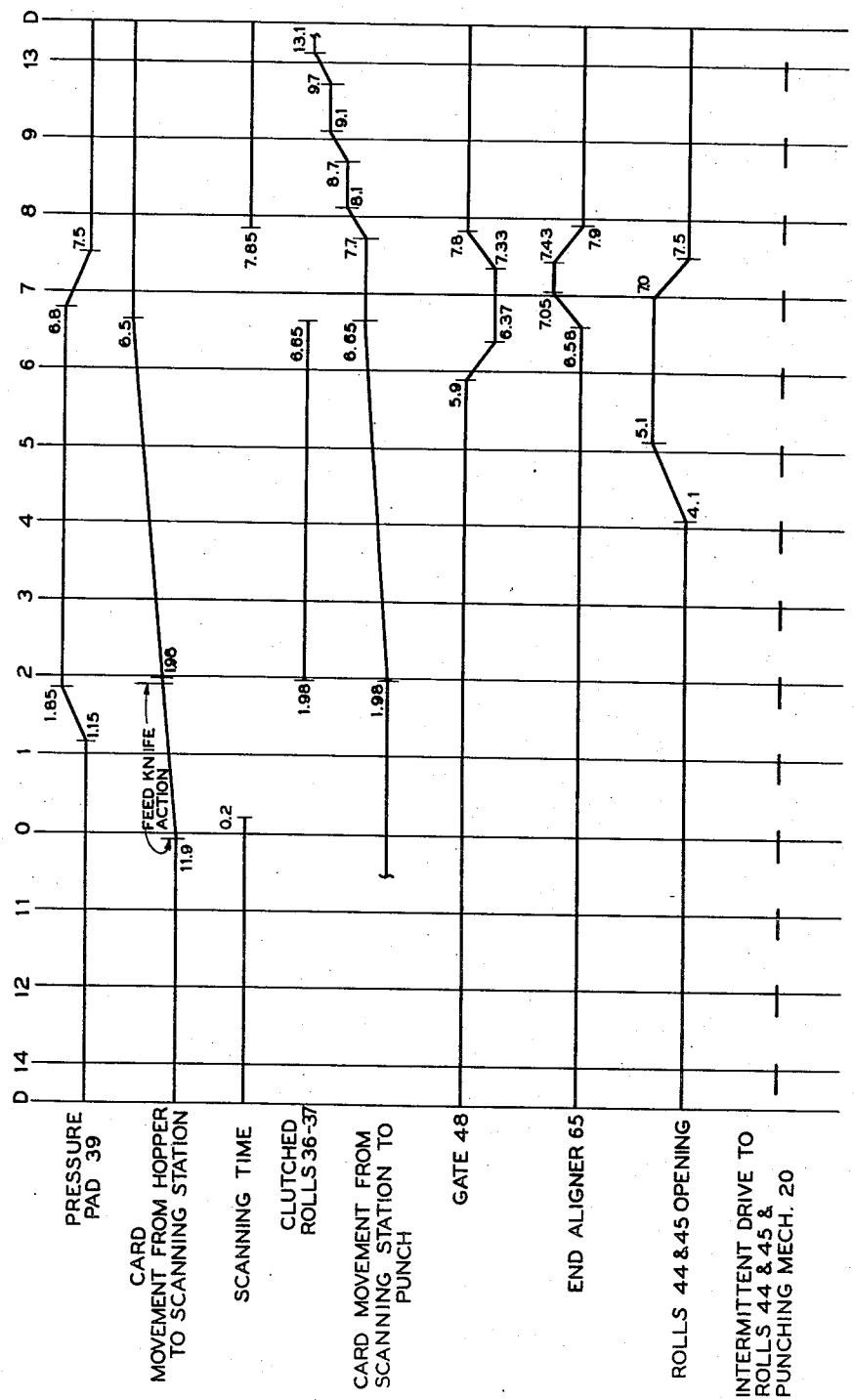
Fig. 49 is a diagram illustrating the operation of various mechanisms in the card feed and punching mechanism.

In order to correlate card feeding mechanism 21 to a punching mechanism 20, reference is made to Fig. 49 which shows a timing chart for card movement and various elements of both mechanisms. As is well known, this type of punch operates on a fourteen cycle point machine cycle. The cycle points are indicated at the top of Fig. 49 and various card movements and machine elements are indicated along the left side of the drawing.

Starting with the first machine cycle, operation always begins at D time. The first card is picked from the hopper by the feed knives at 11.9 time and fed to rolls 24 and 25. At 1.98 time the leading edge of the card is .062" past the center line of these rolls. Card movement continues toward the clutched rolls 36 and 37. These clutched rolls begin to rotate at 1.98 time but as yet they have not received the card. Shortly before 6.65 time, the leading edge of the card enters rolls 36 and 37 and at 6.65 time these rolls stop. It will be noted that the pressure pad was raised to allow the card to feed thereunder and then lowered after the card stops, lowering being completed at 7.5 time.

Scanning of this first card begins at 7.85 time and continues into the second machine cycle, scanning being completed at 0.2 time in said second machine cycle. It will be understood that at 11.9 time of the second machine cycle a second card begins to leave the hopper. By tracing the first card on through the machine, it will be apparent how successive cards pass therethrough during successive machine cycles.

At 1.98 time of the second machine cycle, clutched rolls 36 and 37 begin feeding the first card out of the scanning station. At 5.9 time, gate 48 begins lowering into the path of the card and by 6.37 time is completely lowered. At 6.65 time the leading edge of the first card strikes gate 48 and feed rolls 36 and 37 stop. From the diagram it is seen that while rolls 44 and 45 are intermittently driven, they are in addition cammed apart by 5.1 time to allow the card to pass therethrough to the gate. With the card being held against the gate by skid rolls 40 and 41, end aligner 65 is actuated to laterally align the card. By 7.5 time rolls 44 and 45 have closed. Note that they are on a dwell at the time they close. Thus, when they begin rotating at time 7.7, the card begins its movement toward the punch. The card movement at this time is intermittent and continues into the third machine cycle. By 12.0 time of the third machine cycle, the twelve row of the card is under the row of punches and selective punching may be made in the card at this time. The intermittent feeding and punching action continues in the normal manner and the card is stacked. Thus, it is seen that a card which is fed from the hopper on the first machine cycle is not punched until the third machine cycle. Meanwhile a second card fed from the hopper during the second machine cycle is not punched until the fourth machine cycle.

Reference is now made to the relay wiring diagram shown in Fig. 50 and the timing chart shown in Fig. 51 for the cams shown in Fig. 50. At the present time, only a small portion of these diagrams will be described, i.e., that portion relating to the timing for the magnets 88 and 81 shown in Fig. 4 and that portion which relates to the scanning mechanism shown in Fig. 6.

Referring to Fig. 50, it is seen that magnets 81 and 88 are adapted to be connected to a source of D.C. potential, herein illustrated as +40 v. D.C., under the control of a cam P19. As shown in Fig. 51, cam P19 makes at 1.2 time and breaks at 2.5 time. During this interval both of the one-revolution clutches controlled by these magnets are allowed to operate to permit various functions to be performed as shown in Fig. 49.

Referring again to Fig. 50, it will be seen that contacts 113 through 117, which were shown in Fig. 6, are now shown with their associated circuitry. With the lens in its rest position, contacts 113 and 114 engage and energize relay R51 which holds through contacts 115 and 116 as well as contact R51a. A cam P24, which makes at 7.5 time as shown in Fig. 51, energizes relay R50 providing a card is in the scanning station to close the card lever contact 96. R50 holds through its own contact R50a and through the normally engaged contacts 115 and 116. A contact R50d serves as a means for connecting a source of +220 volts D.C. to one side of the electrostatic clutch 105, the other side of said clutch being connected to ground potential.

As soon as the clutch 105 is energized, lens 98 begins its forward movement and scans the card. As soon as it leaves the rest position engagement between contacts 113 and 114 ends. However, R51 holds through contacts R15a, 115 and 116.

When rack 99 carrying the lens 98 engages movable contact 115 it breaks the engagement of this contact with fixed contact 116, thus dropping out R50 and R51. With further rack movement contact 115 engages fixed contact 117 and sends out an End of Card sample pulse to terminal 128. This sample pulse will be used in the recognition circuitry which will be described later.

When R50 drops, contact R50d opens and disconnects the voltage to the electrostatic clutch 105, thus stopping the positive forward drive of rack 99 and lens 98. The rack then begins to return under the action of spring 112. Shortly thereafter contact 115 breaks its engagement with contact 117 and engages contact 116. When the carriage returns to its rest position, contacts 113 and 114 engage and pick R51, thus conditioning the circuit for a subsequent scanning operation.

TYPICAL CIRCUITS

Before proceeding with a description of the detailed electrical circuitry found in Figs. 2A, 2B, etc., a number of typical circuits found in block form in these figures will be described. It should be made clear that insofar as the present invention is concerned, no claim for patentable novelty will be made on the specific details of a particular one of these circuits. In describing these circuits, each typical circuit will be shown in detail in one figure and in block form in a separate figure. Each circuit may be looked upon as an entity and the pin connections in the block diagram will be referenced in the detail diagram.

Since the present invention utilizes magnetic drum storage, it is necessary to provide amplifying circuits for reading and writing data on the drum. Fig. 8 shows a voltage amplifier which will hereinafter be referred to as type VA-1. An input signal from a reading head on the drum is adapted to be impressed at pin 3 which is connected by a resistor 130 to the grid of the left half of a twin-triode vacuum tube 131. The plate of said left half is RC coupled to the grid of the right half of tube 131. It is apparent that the usual grid return resistors and plate resistors are furnished for each half of tube 131 and that both cathodes are suitably connected to ground. The output from this circuit is taken from pin 8 which is connected to the plate of the right half of the tube. Thus, the input signal at pin 3 is amplified and inverted in the left half of the tube and the output from said left half is amplified and inverted in the right half of the tube. For simplification in the description to follow, the circuit shown in Fig. 8 will hereinafter be illustrated in the manner shown in Fig. 8a.

A shaping amplifier type SA-1, is illustrated in detail in Fig. 9 and in block form in Fig. 9a. Referring to Fig. 9, an input signal supplied to pin 3 is coupled by means of a capacitor 132 and a resistor 133 to the grid of the left half of a twin-triode vacuum tube 134. A grid return resistor 135 is furnished between the grid side of the capacitor and ground. The grid itself is connected to the cathode of a diode 136 whose plate is connected to ground. Thus, the grid of the left half of the tube is clamped to ground and only those signals which rise above ground will appear on the grid. The plate of said left half is connected to a source of potential by means of the usual plate resistor and is also coupled to the grid of the right half of tube 134 through a capacitor 137. The last-named grid is also connected to a point between resistors 138 and 139 which, in conjunction with cathode resistor 140, form a voltage divider network. The plate of the right half of tube 134 is connected by the usual plate resistor to the power supply and is also connected to output pin 8. The function of the type SA-1 amplifier is to shape an inductively produced type of input signal applied to the grid of the left half of the tube into an amplified square wave output which occurs at pin 8.

Fig. 10 shows a detailed schematic diagram of a type PW-2 power amplifier which is illustrated in block form in Fig. 10a. This unit is always used as the first stage in a two-stage write amplifier. Referring to Fig. 10, the input thereto appears at the left grid of the left half of a twin-triode 140 through a pin 3. The plate of the left half of the twin-triode of tube 140 is connected by means of a resistor 141 and an inductance 142 to an appropriate power supply terminal. The left half of the tube is normally non-conductive so that the application of a positive pulse having a pulse width of approximately two microseconds to the grid thereof causes the left half to begin conduction. Plate current will flow through the inductor 142 for a two microsecond interval, which is sufficient for the current to build up to about 70 percent of its maximum value, as determined by the grid drive, plate voltage, current limiting resistors, and plate resistance. The plate current stores energy in the inductor 142 so that when the sharp trailing edge of the pulse applied to the grid input terminal 3 renders the left half of tube 140 non-conductive, the energy stored in inductor 142 will cause an inductive spike of voltage to occur at the grid of the right half of tube 140 through a capacitor 143. Capacitor 143 serves as part of a voltage divider network which further includes resistors 144 and 145 which are connected between the positive source of D.C. potential and a negative source of D.C. potential. Due to the biasing of the grid of the right half of tube 140, only positive portions of the inductively produced signal will be effective in causing an output signal to occur at the cathode output terminal 8.

Fig. 11 illustrates the second stage of the power amplifier and is identified as type PW-3, comprising a triode 146 which has its control grid connected by means of a resistor 147 to an input pin 3. Resistor 148 serves as the cathode resistor of the right half of PW-2. The plate of triode 146 is connected by means of a resistor 149 to a positive source of D.C. potential and the cathode of said tube is connected to an output terminal 7, which is, in turn, connected through a write head to ground potential. Capacitor 149a is connected between the anode of triode 146 and ground. The PW-3 unit is primarily utilized in the data transfer circuitry as an impedance matching device. The biasing of the control grid is such that only positive pulses applied to the grid input terminal 3 whose amplitude is in excess of the predetermined minimum voltage amplitude will render the tube conductive. The power write amplifier type PW-3 is illustrated in block form in Fig. 11a.

Another form of power amplifier unit is identified as type PW-X2 and is illustrated in detail in Fig. 12 and in block diagram form in Fig. 12a. This amplifier comprises a twin-triode vacuum tube 150 which is connected by a current limiting resistor 151 and a voltage divider connected to an input terminal 3. The voltage divider comprises resistors 153 and 154 which are connected between pin 3 and a negative source of D.C. potential. A capacitor 152 is connected in parallel with resistor 153 for passing high frequency components in the input signal to the grid of the left half of twin-triode 150. The plate of the left half of the twin-triode is connected to the grid of the right half which is also connected through a resistor 155 to a positive source of D.C. potential. The cathode of the right half is connected by means of resistors 156 and 157 to a negative source of D.C. potential, the midpoint between resistors 156 and 157 being connected to the grid of the right half of twin-triode 150 by means of a resistor 158. The output is taken from pin 8 which is connected to the cathode of the right half. This circuit serves as a push-pull driver for driving relatively long cables which may have capacity loading. The operation is such that with the left half of tube 150 normally conducting, a negative input signal will turn the left half off which through its plate connection to the grid of the right half of the tube causes the right half to conduct and supply a sharp positive going output pulse from terminal 8. When the input pulse at terminal 3 terminates, i.e., goes positive, the left half of tube 150 is turned on which causes the right half to turn off and the cathode of the right half drops sharply.

Fig. 13 shows a detailed schematic diagram of a trigger circuit of the type TR-1, the block form of this trigger being shown in Fig. 13a. This is a conventional bistable circuit in which negative going pulses are used to change the state thereof. The circuit comprises a twin-triode vacuum tube 159 having left and right halves. The input to the grid of the left half is applied to pin 6 which is coupled by means of a capacitor 160 and a resistor 161 to said grid. Resistor 166 serves to connect the grid of the left half to a negative bias potential. The input to the grid of the right half is by way of pin 3, capacitor 162 and resistor 163, this grid being connected to a negative bias potential through resistors 163 and 169.

Resistors 170 and 171 are used to connect the plates of the left and right halves, respectively, to a positive source of D.C. potential. The plate of the right half is connected by means of capacitor 164 in parallel with a resistor 165 to the input side of resistor 161. Thus, if the right half of triode 159 is conducting, the left half is held cut off. The plate of the left half is connected by means of capacitor 167 in parallel with a resistor 168 to the input side of resistor 163 such that with the left half conducting, the right half is held cut off. The convention used in this trigger is that if the right half is conducting, the trigger is said to be Off. With the left half conducting, the trigger is said to be On. The trigger may be turned On by a negative going pulse supplied to pin 3 and may be turned Off by a negative going pulse applied to pin 6. Outputs from this trigger are taken from pins 7 and 8 connected to the plates of the right and left halves, respectively.

Fig. 14 shows a detailed schematic diagram of a trigger circuit of the type TR-4, the block form of this trigger being shown in Fig. 14a. This circuit differs only slightly from the trigger shown in Fig. 13, the difference being that the plate resistor for the right half of the tube is now divided up into two resistors 171a and 171b. Pin 8 is connected to the midpoint between the last-named resistors and is referred to as the tapped output. Thus, it will be seen that the output from the right half of this trigger is by way of pins 7 and 8.

Fig. 15 shows a detailed schematic diagram of a trigger circuit of the type TR-31, the block form of this trigger being shown in Fig. 15a. This trigger circuit is of the so-called "pullover" type and is used ordinarily to operate from cam produced inputs. The circuit comprises a twin-triode vacuum tube 172 whose right half is normally conducting and whose left half is normally non-conducting. To change the state of this trigger an input is adapted to be supplied to pin 6 which is connected by means of an integrator circuit comprising resistor 173 and capacitor 174 to one side of a resistor 175, the other side of the last-named resistor being connected to the grid of the left half of the tube. Similarly, an input to pin 3 is connected by means of an integrating circuit comprising resistor 177 and capacitor 178 to one side of a resistor 179, the other side of resistor 179 being connected to the grid of the right half of tube 172. Biasing resistors 176 and 180 serve to bias the grids of the left and right halves, respectively, to some negative potential. The plate of the right half is connected by means of resistors 181 and 182 to a source of positive potential and the plate of the left half is connected by means of resistors 183 and 184 to said positive potential. The plate of the right half is also connected to the input side of resistor 175 by means of a capacitor 185 in parallel with resistor 186. The plate of the left half is connected to the input side of resistor 179 by means of a capacitor 187 in parallel with resistor 188. The direct plate output of the left half is connected to pin 7 and the tapped plate output of said left half is connected to pin 8. The operation of this circuit is such that if a positive going pulse is applied to pin 6, the pulse is integrated by resistor 173 and capacitor 174. When the potential at the grid of the left half rises sufficiently, the left half will begin conduction. At this time, the plate of the left half drops and applies a negative pulse to the grid of the right half, thereby turning the right half off. As is conventional, the turning off of the right half raises the plate thereof and causes a positive potential to be applied to the grid of the left half. A positive going pulse applied to pin 3, with the trigger in its On condition, is intergrated by resistor 177 and capacitor 178 and is used to turn the right half of tube 172 on. When this occurs, a negative going transient is applied to the grid of the left half which causes the left half to go toward cut-off.

Fig. 16 shows a detailed schematic diagram of a trigger circuit of the type TR–X1, the block form of this trigger being shown in Fig. 16a. This circuit is adapted to operate as a single shot multivibrator which is operated by positive going pulses applied to the grid of the left half thereof. The time constant of this circuit may be varied so that different pulse width outputs may be produced. A twin-triode 189 is adapted to have its right half normally conducting and in this condition holds the left half non-conducting by way of a diode 193 and a resistor 191 which couple the plate of the right half to the grid of the left half. A positive input pulse applied to terminal 3 is coupled by way of diode 190 and resistor 191 to the grid of the left half of the tube and causes the left half to begin conducting. A grid biasing resistor 192 serves to connect a point between diode 190 and resistor 191 to a negative source of potential. The plate of the left half of tube 189 is connected to the grid of the right half by means of a capacitor 194 and a resistor 196, the ground return being through resistor 195. With the right half of tube 189 conducting, it will be seen that the plate of the left half will be at +150 v. D.C. Therefore, the plate side of capacitor 194 will be at this same potential. The other side of capacitor 194 will be at about −100 v. potential. When the left half of the tube begins to conduct, the plate thereof drops in potential which applies a negative pulse to the grid of the right half of the tube as capacitor 194 discharges. Capacitor 194 discharges for a period determined by the time constant of capacitor 194 and resistor 195 and at the end of this time constant a positive going pulse is applied to the grid of the right half which allows the right half to begin conducting again. As the right half begins conduction, its plate drops and applies a negative voltage by way of diode 193 and resistor 191 to the grid of the left half of tube 189. Therefore, an output pulse appears at pin 5, which is connected to the plate of the right half of the tube, of a duration dependent upon the time constant of the network composed of capacitor 194 and resistor 195.

Fig. 17 shows a detailed schematic diagram of a trigger circuit of the type TR–X2, the block form of this trigger being shown in Fig. 17a. This trigger is used for pulse shaping purposes and is adapted to receive a negative going input pulse and provide a negative output pulse of one of two predetermined durations. The duration of the output pulse depends upon the internal connections in the circuit. The circuit comprises a twin-triode vacuum tube 197 which comprises a left half and a right half, the left half being normally conducting. An input pulse which is applied to pin 3 is connected to the grid of the left half by means of a differentiating circuit comprising capacitor 198 and resistor 199 and a resistor 200. The plate of the left half is connected by means of a capacitor 201 in parallel with a resistor 202 to the input side of a resistor 203, the other side of the last-named resistor being connected to the grid of the right half of tube 197. The input side of resistor 203 is connected by means of a resistor 204 to a negative source of biasing potential. The plate of the right half of tube 197 is connected to a positive source of D.C. potential by means of resistors 205 and 206 and the plate of the left half of said tube is connected to said positive source of D.C. potential by means of resistors 207 and 208. The output from this circuit is adapted to be taken from pin 7. It will be seen that the upper side of resistor 199 is adapted to be connected to either the midpoint between resistors 206 and 207 or directly to the plate of the right half of the tube. If the upper side of resistor 199 is connected to the said midpoint, an output pulse will be produced from the circuit which has a duration of approximately two microseconds. However, if the upper side of resistor 199 is connected directly to the plate of the right side of the tube, a negative output pulse of three microseconds duration is produced. The operation of the circuit is such that the negative going edge of an input pulse is adapted to appear on the grid of the left half of the tube as a relatively sharp negative spike turning the left half off and in so doing causing the right half of the tube to begin conduction. It will be seen that the right half of the tube, in going into conduction will provide a particular potential to the upper side of resistor 199. If the upper side is connected to the midpoint between resistors 206 and 205, then the said upper side will be at a higher potential than if it is connected to the plate of the right half. The higher the potential is at the upper side of resistor 199 the quicker the left side of the tube returns to conduction. This trigger circuit, therefore, is in effect a single shot multi-vibrator and its primary function is that of wave shaping.

Fig. 18 shows a detailed schematic diagram of a trigger circuit of the type TR–X3, the block form thereof being shown in Fig. 18a. A plurality of these triggers are adapted to be serially connected to form a shifting register such as that shown and described in application Serial No. 469,895, which was filed for Genung L. Clapper on November 19, 1954. This circuit has a normal Off condition wherein the right half of a twin-triode 209 conducts. The input to this circuit is to pin 3 which connects by means of resistor 210 to a terminal point 212. The plate of the right half of tube 209 is connected to the terminal point through a resistor 211. The potential existing at terminal point 212 is periodically interrogated by means of positive going pulses and negative going pulses which appear in synchronism at terminals 4 and 5, respectively, these terminals being connected to the terminal point by suitably oriented diodes 213 and 214, respectively. During these sampling or interrogating intervals the potential at pin 3 may, by way of example, be either at +30 volts or −30 volts. The same is true for the plate of the right half of tube 209. If the right half is conducting, the plate will be at −30 volts and if it is not conducting, the plate will be at +30 volts. First, let it be assumed that pin 3 is at +30 volts and the plate of the right half is at −30 volts. Since resistors 210 and 211 are of equal value, the terminal point 212 will be at ground. Thus, neither the negative going or positive going sync pulses at pins 4 and 5, both of which go to ground, will have any effect on the potential at point 212. The same is true if pin 3 is at −30 volts and the plate of the right half is at +30 volts. However, if both pin 3 and the plate of the right half are at the same potential, then terminal point 212 will be either at +30 volts or −30 volts, depending on the potential at pin 3 and the plate of the right half. If terminal point 212 is at +30 volts, then the negative sync applied to pin 5 will drop the potential at terminal point 212 to ground. This causes a negative pulse to be applied through a capacitor 217 to the grid of the left half of tube 209 which turns the trigger Off. As the left half of the trigger ceases conduction, a positive going voltage is applied through a capacitor 218 in parallel with a resistor 219 to the input side of a resistor 220, the other side of the last-named resistor being connected to the grid of the right half. This action keeps the trigger Off. A resistor 221 serves to connect the negative grid bias to the input side of resistor 220. It is seen that the grid of the left half is also connected to the midpoint of a voltage divider formed by resistors 215 and 216 between the plate of the right half and a negative source of bias potential.

If terminal point 212 is at —30 volts, then the positive sync applied to pin 4 will raise the potential at terminal 212 to ground. In so doing, a positive pulse is applied to the grid of the left half which causes the left half to go into conduction, thus turning the trigger On.

Fig. 19 shows a detailed schematic diagram of a trigger circuit of a type TR–X4, the block form of this trigger being shown in Fig. 19a. It will be seen that the details of this circuit are substantially identical to those for the trigger type TR–1 except that the input pin 3 has now been removed from connection to the grid of the right half of tube 159 and is now connected through a diode 222 to the grid of the left half of the tube. The arrangement is such that positive going impulses applied to pin 3 will turn the trigger On while negative going pulses applied to pin 6 will turn the trigger Off.

Fig. 20 shows a detailed schematic diagram of a trigger circuit of the type TR–X5, the block form of this trigger being shown in Fig. 20a. The details of this trigger are substantially identical to those for trigger type TR–4, the only difference being the addition of a pin 5 to the plate of the left half of tube 159. This pin is used to obtain an additional output from the trigger.

Fig. 21 shows a detailed schematic diagram of a trigger circuit of the type TR–X6, the block form thereof being shown in Fig. 21a. This trigger is very similar to trigger type TR–X5 except that resistors 165, 168, 170, 171a and 171b and capacitors 160, 162, 164 and 167 have been reduced in value whereas resistors 166 and 169 have been increased in value. The different valued components of this circuit make it possible for the type TR–X6 trigger circuit to operate at a higher rate of speed than TR–X5.

Fig. 22 shows a detailed schematic diagram of an inverter circuit of the type IN–4, the block form thereof being shown in Fig. 22a. This circuit basically is a standard inverter with a divider type input and a tapped plate output. The circuit comprises a triode vacuum tube 223 having its cathode connected to ground and its plate connected through resistors 224 and 225 to a positive source of D.C. potential. The input to the grid is to pin 5 which is at the top side of a divider comprised of resistors 226 and 227, there being a capacitor 228 in parallel with resistor 226. The output from the midpoint of the divider is connected by means of a current limiting resistor 229 to the grid. Inverters of this type are D.C. coupled and the inverse of the input at pin 5 appears at pin 7 between resistors 224 and 225 as the output.

Fig. 23 shows a detailed schematic diagram of an inverter circuit of the type IN–5, the block form of this inverter being shown in Fig. 23a. This inverter is very similar to that shown in Fig. 22 except that pin 7 is now tied directly to the plate of triode 223. A single plate resistor 230 is used in lieu of the two plate resistors 224 and 225. The voltage divider input to the grid is identical with that shown in Fig. 22.

Fig. 24 shows a detailed schematic diagram of an inverter circuit of the type IN–13, the block form of this inverter being shown in Fig. 24a. It is apparent from a quick inspection of this circuit that it is similar to the circuit shown in Fig. 23, except that now pin 5 is connected directly to the input side of the current limiting resistor 229, thus eliminating the divider type of input. It should perhaps be pointed out that the inverter circuit shown in Fig. 23 is for a high level input to produce a high level output whereas the circuit shown in Fig. 24 is for a low level input and a high level output.

Fig. 25 shows a detailed schematic diagram of an inverter circuit of the type IN–X1, the block form thereof being shown in Fig. 25a. This circuit is adapted to receive a low level input and to provide a high level output. It is similar to the circuit shown in Fig. 24 except that now resistor 230 has been equally divided for a tap at pin 8 by resistors 230a and 230b. Pin 6 now serves as the direct plate output and pin 5 is connected to a current limiting resistor 231 which is of a somewhat lower value than the resistor 229 used in Fig. 24.

Fig. 26 shows a detailed schematic diagram of an inverter circuit of the type IN–X2, the block form of this inverter being shown in Fig. 26a. This circuit comprises a twin-triode vacuum tube 232 having a left half which is used directly as an inverter in a manner which will now be described. The input to pin 8, which is connected directly to the grid of the left half and to the plate of the right half, comes from a line which has a capacitor connected therefrom to ground. This capacitor is adapted to be charged by pulses which are supplied from another portion of the circuit so that the potential at pin 8 rises in the manner of a staircase. The output appears at pin 7 which is connected directly to the plate of the left half and through a resistor 233 to a positive source of D.C. potential. The right half of tube 232 is used as a means for discharging the capacitor connected to pin 8. This is accomplished by an input pulse to pin 5 which, when applied through a capacitor 234 and resistor 235 to the grid of the right half, causes the right half to conduct. In so doing, the capacitor is discharged through the right half of the tube to a negative source of D.C. potential in the cathode of the right half. The grid of the right half is normally biased off by a negative source of D.C. potential connected to the input side of resistor 235 by means of a resistor 236.

Fig. 27 shows a detailed schematic diagram of an inverter circuit of the type IN–X3, the block form thereof being shown in Fig. 27a. This inverter circuit comprises a triode 237 whose cathode is grounded and whose plate is connected through a resistor 238 to a positive source of D.C. potential. The output is taken directly from the plate at pin 7. The input is by way of pin 6 which is at the top of a divider comprising resistors 239 and 240, the lower end of the divider being connected to a pin 5. The usual by-pass capacitor is provided around resistor 239 and is illustrated by reference numeral 241. In this circuit, the potential supplied to pin 5 is adapted to be received from a potentiometer which can thereby control the point at which the input from the midpoint of the divider through resistor 242 is allowed to cause tube 237 to cease conduction.

Fig. 28 shows a detailed schematic diagram of an inverter circuit of the type IN–X5, the block form of this trigger being shown in Fig. 28a. This circuit comprises a triode 243 having its cathode connected to a negative source of D.C. potential and its plate connected through a resistor 244 to a positive source of D.C. potential. Pin 7 is connected to the plate to obtain an output signal. The input to this circuit is through a voltage divider which is comprised of resistors 245 and 246 connected between an input terminal pin 6 and a negative source of D.C. potential. The usual by-pass capacitor 247 is provided in shunt with resistor 245. A current limiting resistor 248 connects the midpoint of the divider to the grid of tube 243. This inverter circuit is used to receive a high level input and to provide a low level output.

Fig. 29 shows a detailed schematic diagram of an inverter circuit of the type IN–X6, the block form of this inverter being shown in Fig. 29a. This circuit is a simple double inverter with a full plate as well as a tapped plate output. The circuit comprises a twin-triode vacuum tube 249 with the plate of the left half connected through a resistor 250 to a positive source of D.C. potential and the plate of the right half connected through resistors 251 and 252 to said positive source of D.C. potential. The tapped output is taken from between resistors 251 and 252 and is supplied to pin 7, whereas the full plate output is supplied directly to pin 8. The input to this circuit is by way of pin 3 through a current limiting resistor 253 to the grid of the left half of the tube. The plate of the left half is connected to the upper end of the voltage divider network which comprises resistors 254 and 255, the lower end of resistor 255 being connected to a negative source of D.C. potential. A capacitor 256 is connected in shunt with resistor 254, and a current limiting resistor 257 connects the midpoint of the divider to the grid of the right half of the tube. Therefore, an input to pin 3 will appear at pins 7 and 8 in amplified form, the phase being the same but the potential level being dependent upon the values of resistors 251 and 252 and the positive source of D.C. potential which serves as the plate source.

Fig. 30 shows a detailed schematic diagram of an inverter circuit of the type IN-X7, the block form thereof being shown in Fig. 30a. This circuit is used to couple a low level input to serve as a pull down entry for a trigger of the type TR-X3. The circuit comprises a triode 258 having its plate connected directly to an output pin 5 and its cathode connected to a negative source of D.C. potential. The input to the circuit is by way of pin 6 which is connected by means of a voltage regulator tube 259 to the top side of the voltage divider comprising resistors 260 and 261, the lower end of resistor 261 being connected to a negative source of D.C. potential. The input from the midpoint of the divider is connected by means of a current limiting resistor 262 to the grid of triode 258. The circuit operates in a manner which is well known in the art, it only being necessary to point out that the gas tube 259 is used to provide a fixed voltage drop during periods of conduction.

Fig. 31 shows a detailed schematic diagram of a cathode follower circuit of the type CF-1, the block form thereof being shown in Fig. 31a. This is a conventional circuit which is used in general to receive an input which may be of a high impedance level and to produce a low impedance level output. The circuit comprises a triode vacuum tube 263 whose plate is connected to a positive source of D.C. potential and whose cathode is connected by means of resistor 264 to a negative source of D.C. potential. The input to the circuit is by way of pin 3 through current limiting resistor 265 to the grid of the tube and the output is taken directly from the cathode at pin 5.

Fig. 32 shows a detailed schematic diagram of a cathode follower circuit of the type CF-3, the block form thereof being shown in Fig. 32a. This circuit is identical with the circuit shown in Fig. 31 with the exception that pin 3 is now connected to the input side of current limiting resistor 265 by means of a voltage divider network which comprises resistors 266 and 267. Pin 3 is connected to the top side of resistor 266 and a negative source of D.C. potential is provided at the lower side of resistor 267. A capacitor 268 is provided in shunt with resistor 266. As before, the output is taken from pin 5 on the cathode of tube 263.

Fig. 33 shows a detailed schematic diagram of a cathode follower circuit of the type CF-13, the block form thereof being shown in Fig. 33a. This circuit comprises a triode 269 whose plate is connected to a positive source of D.C. potential and whose cathode is connected directly to pin 9 for output purposes and by way of a resistor 270 to a negative source of D.C. potential. The input signal for this circuit is adapted to be supplied to pin 3 which is coupled by capacitor 271 to the grid of tube 269. The input signal is clamped to some negative D.C. potential by means of a diode 273 which is connected between said negative source of D.C. potential and the grid. A resistor 272 is provided in shunt with diode 273. The negative source of D.C. potential to which the input signal is clamped is somewhat more positive than the negative source of D.C. potential that is supplied to the cathode of the tube. This circuit is used to take a high impedance A.C. signal supplied to pin 3 and to produce a low impedance output signal for D.C. coupling at pin 9.

Fig. 34 shows a detailed schematic diagram of a cathode follower circuit of the type CF-X1, the block form of this cathode follower being shown in Fig. 34a. This circuit comprises a triode vacuum tube 274 whose plate is connected to a positive source of D.C. potential and whose cathode is connected by means of a resistor 275 to a negative source of D.C. potential. The input is adapted to be connected to pin 3 which is at the top of a divider comprising resistors 276 and 277, the lower end of resistor 277 being connected to a negative source of D.C. potential. The output from the divider is taken from the midpoint between the afore-mentioned resistors and is connected through resistor 278 to the grid of tube 274. The output of this circuit is taken from pin 5.

Fig. 35 shows the details of a vacuum tube diode circuit which is shown in block form in Fig. 35a, this circuit being of the type DD-1. It is apparent that this circuit comprises a vacuum diode 280 whose plate is connected to pin 3 and whose cathode is connected to pin 7. In the description of the drawings to follow, there will be instances where a single block as shown in Fig. 35 is used alone and other instances where two of these blocks are combined to form what might be referred to as a double unit. It will be understood that where two blocks are shown together, that the left half is completely independent of the right half unless internal connections are shown within the block.

Fig. 36 shows a detailed schematic diagram of a diode circuit of the type DD-X1, the block form of this diode circuit being illustrated in Fig. 36a. As shown, this circuit comprises a twin vacuum diode 281 comprising a left half whose plate is connected to pin 9, to the cathode of the right half and to pin 5. The cathode of the left half is connected directly to pin 3 and the plate of the right half is connected directly to pin 6. The operation of this circuit will be apparent when the entire circuit in which this unit is used is described at a later point in the description.

Fig. 37 shows a detailed schematic diagram of a comparing unit of the type CU-X1, the block form of this unit being illustrated in Fig. 37a. This circuit comprises a triode vacuum tube 282 whose plate is connected through a resistor 283 to a positive source of D.C. potential, the output from the circuit being taken by way of pin 6 connected directly to the plate. The input to the grid of this tube is by way of a voltage divider network comprising resistors 284 and 285 with a capacitor 286 in shunt with resistor 284. The cathode of this circuit is connected to one side of a bridge comparing circuit 287, the other side of said bridge comparing circuit being connected to the upper side of the voltage divider. The comparing circuit comprises diodes 288, 289, 290 and 291. The arrangement is such that the cathode of tube 282 is connected to the plates of diodes 288 and 289 with the cathodes of these diodes being connected to pins 7 and 8, respectively. Pins 7 and 8 also connect to the plates of diodes 290 and 291, respectively, whose cathodes are commoned and connected to the top of the voltage divider network. The arrangement is such that if the inputs to pins 7 and 8 are equal, the tube will be cut off. If the inputs are unequal then the tube will be turned on. It will be seen for example, that if a relatively positive voltage is applied to a pin 7 and a relatively negative voltage is applied to pin 8, then the relatively positive voltage will appear at the top of the voltage divider through diode 290 and the relatively negative voltage will appear at the cathode of tube 282 through diode 289. Since the grid is considerably higher than the cathode of tube 282 the tube will conduct. It is apparent that the tube will also conduct if pin 7 receives a relatively negative voltage and pin 8 receives a relatively positive voltage. However, if both pins 7 and 8 receive the same voltage, it will be seen that the input to the voltage divider will be at the same level as the cathode potential, thus holding the tube off.

Fig. 38 shows a detailed schematic diagram of a thyratron circuit of the type TH-X1, the block form thereof being shown in Fig. 38a. This circuit comprises a four element gas tube 292 whose plate is connected through a resistor 293 to a movable contact 296 which is adapted to be operated by means of a cam 294 to engage a fixed contact 295, the latter contact being connected to a positive source of D.C. potential. The cathode of tube 292 is connected through the coil 297 of a punch magnet to ground. A resistor 298 and a diode 299 are connected in shunt with coil 297. It will be seen that the plate of the diode is connected to ground and the cathode thereof is connected to the upper side of coil 297. Induced negative spikes which occur when the tube is cut off are thereby shorted to ground through the diode. The input to the first control grid of tube 292 is by way of pin 7 which is connected to said control grid by means of a parallel RC network comprising a resistor 300 and a capacitor 301. The input to the second control grid is from a pin 3 through a parallel RC network comprising a resistor 302 and a capacitor 303. It should be apparent that if cam 294 moves contact 296 so that it engages contact 295, a positive source of D.C. potential is connected to the plate of tube 292. The tube will not conduct unless both grids are raised by relatively positive signals at pins 7 and 3. If this is the case, then the tube conducts and a potential difference appears across the coil 297 which operates a punch magnet. Once the tube 292 goes into conduction it will remain in conduction until contact 296 is allowed to break its engagement with contact 295 by cam 294.

THE CARD

The card utilized with the present invention is divided up into two general areas. Referring to Fig. 44, it is seen that the right side of the card is for the entry of data and is labeled as the Scan Area. The left side of the card is for punching purposes. It will be seen that the Scan Area portion contains a plurality of field marks which are arranged in spaced relation in horizontal rows. Each field mark is composed of at least five vertically arranged dots. A field is comprised by the area between the field marks. The fields are illustrated by reference numerals F1, F2, F3, F4 and F5. It will be appreciated that other types of field marks could be used but the circuit in the present invention requires one having at least five dots. The field marks are normally twice the height of the character to be identified and are equal to the scan length. The length of the field is dependent on the data to be entered. The present invention is arranged to recognize characters in any three fields in a row on a single scan of that row. Some of the fields contain pre-printed information such as Stock No., Dept., etc. These fields would not normally be sensed.

RECOGNITION

Sync generation

Figure 2M:
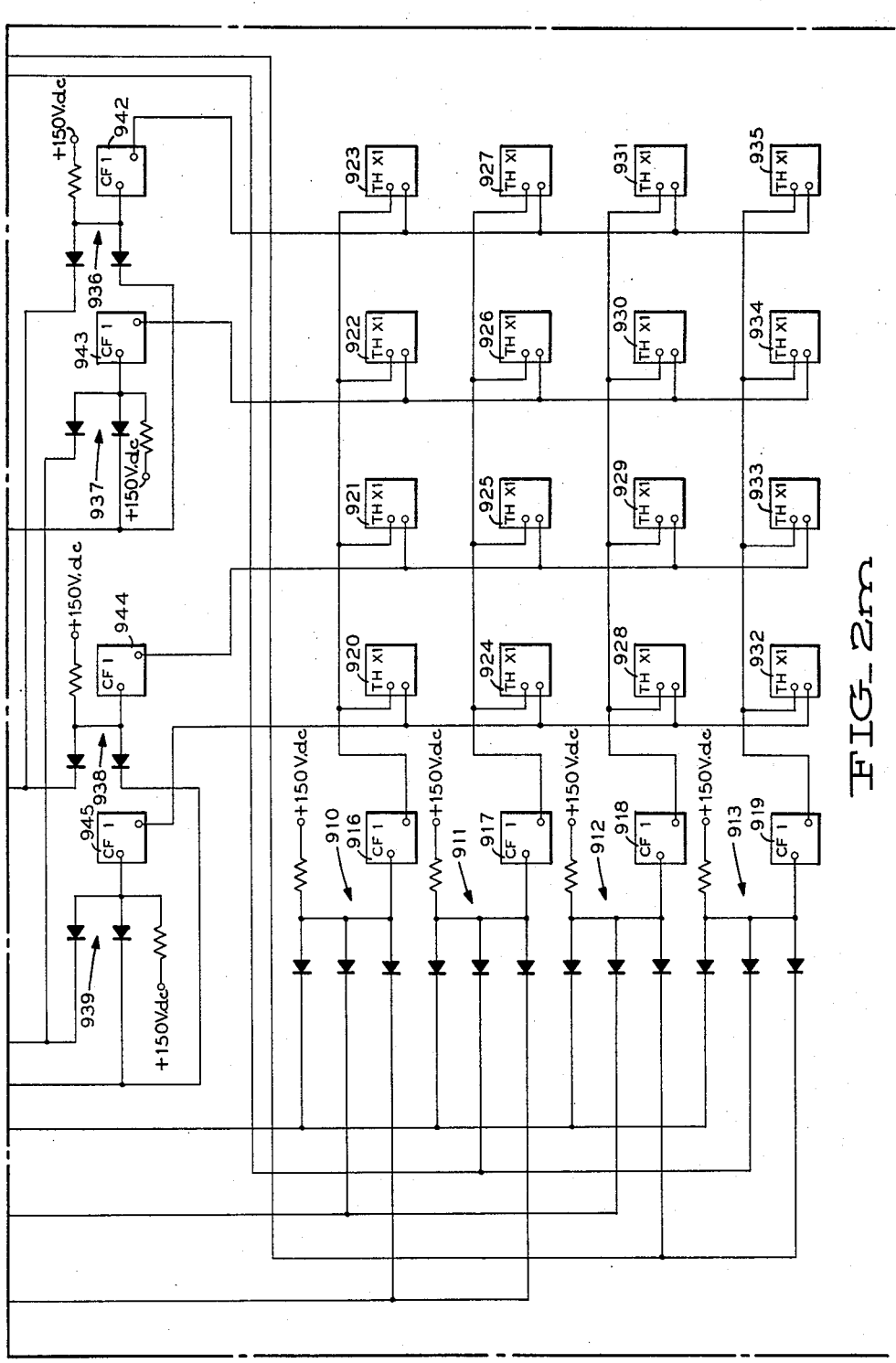

Reference is now made to Figs. 2A through 2H, 2J through 2N, 2P through 2T, 2a through 2k, 2m, 2n, 2p and 2q, and the following detailed description will be given thereon. These various figures are adapted to be combined as shown in Fig. 3. In Fig. 2A there is illustrated a portion of a recording track 310 on the surface of drum 126. A read head 311 is provided adjacent said track, one end of said head being grounded on the other end being supplied to an amplifier 312. Track 310 is the basic sync track for the system and is provided with 1152 equally spaced magnetized spots. Thus, there are 1152 bits per revolution of the drum. With the drum rotating at 3600 r.p.m., the basic sync track supplies 69,120 bits per second. The output from amplifier 312 is shaped in amplifier 313 and supplied through cathode follower 314 to a plurality of triggers 315, 316 and 317, which triggers are connected as single shot multi-vibrators. The positive going portion of the input to each of the triggers initiates an output pulse of a duration determined by the time constant of the circuit. The duration of the pulse from trigger 315 is two microseconds, which pulse is supplied through cathode follower 318 to serve as the Write Sync for the entire system.

Trigger 316 supplies an output pulse of seven microseconds duration through inverter 319 and cathode follower 320 to another trigger 321. This last-named trigger is in the form of a single shot multivibrator which is adapted to supply a two microsecond output pulse to cathode follower 322, the output from the cathode follower being that which is adapted to serve as the Read Sync throughout the system. The output from trigger 316 is a seven microsecond positive pulse which, when inverted, becomes a negative pulse of the same duration. The two microsecond pulse from trigger 321 begins at the trailing edge of the output pulse from trigger 316.

The output pulse from trigger 317 is of eleven microseconds duration and is supplied through inverter 323 and cathode follower 324 to trigger 325. The trailing edge of the pulse leaving trigger 317 is positive going at the input to trigger 325. Therefore, it initiates this trigger into operation to supply a two microsecond output pulse, which output pulse is used in the system as the Storage Write Sync.

Video input circuit

As described previously, the scanning apparatus is adapted to make successive vertical scans across the character, the successive scans proceeding from right to left. This type of scanning is illustrated in Fig. 52a wherein the digit "1" is scanned. The photomultiplier 125 is allowed to view the particular portions of the character or background as the scanning proceeds. The output from the photomultiplier is amplified in a conventional video amplifier 309. This amplifier may be provided with automatic clipping control such as that described in application Serial No. 478,430 for Data Handling System, filed December 29, 1954, by M. D. Rogers. This means that the output from the photomultiplier which exceeds the clipping level will be represented as a fixed amplitude signal out of the amplifier 309. If the photomultiplier output does not exceed the clipipng level, then the amplifier 309 will supply only a reference voltage. Thus, the output from the amplifier may be said to be digitalized. The output from the video amplifier 309 represents the clipped video data and is supplied to one side of a diode switch 326, the other side of said switch being held relatively positive before any data is received.

Minimum black-minimum white circuit

The object of the circuit now to be described is to provide minimum black and minimum white output signals. That is, the first character outline data (black) received will produce a black output signal of at least a predetermined period. Background data (white) signals which occur after this predetermined period will produce a white output signal of at least a predetermined period. The first video data can pass through switch 326 and cathode follower 327 to a trigger 328. Trigger 328 is a single shot multivibrator having a time constant arranged to supply a thirty-five microsecond output pulse. This output pulse is supplied through inverters 329 and 330 to serve as one input to a four position diode switch 333. The output from cathode follower 327 is also supplied to inverter 331. It will be noted that the plates of inverters 329 and 331 are tied together. In such an arrangement, a single plate resistor to a power supply is used, thereby forming a logical OR circuit. That is, the plate of inverter 331 is not connected to the usual +150 v. D.C. power supply normally supplied in the type IN-13 unit. Instead, it is connected directly to the plate of the inverter 329 and uses its plate resistor to the +150 v. D.C. to complete the circuit therethrough. To indicate the above fact, inverter 331 is labeled NO+150. Other inverters throughout the drawings may be similarly marked and indicate the fact that the plate resistor and +150 v. D.C. power supply within that inverter are not used. Similarly, two or more cathode followers may have their cathodes commoned to form a logical OR circuit. Here only one of the two or more cathode folowers will utilize its own cathode resistor and −70 v. D.C. power supply. The remaining cathode followers are labeled NO—70. Thus, the output from inverters 329 or 331 which lasts the longest will appear at inverter 330 and cathode follower 332. The output from cathode follower 332 is supplied to serve as one input to a four position diode switch 334.

It will be seen that the output from inverter 330 and cathode follower 332 will be exactly out of phase with one another. That is, when the output from inverter 330 is a relatively positive potential, the output from cathode follower 332 will be relatively negative. It is in this manner that the so-called black and white outputs are furnished. That is the output from inverter 330 represents the character outline data and the output from cathode follower 332 represents the background data. The output from cathode follower 332 is also supplied to a trigger 335 which is connected as a single shot multivibrator to produce a thirty-five microsecond pulse. As soon as the output from inverters 329 and 331 rises, trigger 335 generates a thirty-five microsecond positive pulse. This output pulse is inverted at 336 and supplied through cathode follower 337 to serve as the other input to diode switch 326. Since the thirty-five microsecond output pulse from trigger 335 is a positive pulse which is inverted in inverter 336, the switch 326 will be held Off for at least thirty-five microseconds. This means that no more information can come through the switch for at least thirty-five microseconds.

*Defuzz circuit*

Referring now to Fig. 2B, the Scan Sync track 338 is illustrated. It will be understood that this track is a part of drum 126. There is provided a read head 339, one end of which is grounded and the other end of which is connected through amplifiers 340 and 341 and cathode follower 342 to set a trigger 343. This trigger supplies an output pulse of one hundred fifteen microseconds to an inverter 344. Therefore, the output from the inverter 344 is a negative pulse of one hundred fifteen microseconds which is supplied through cathode follower 345 to serve as inputs to switches 333 and 334. This input to the switches is termed the Scan Sync input. Another input to switches 333 and 334 comes from the End of Card Sample pulse which is supplied from the punch. It will be remembered that this sample pulse is supplied from terminal 128 in Fig. 50. The End of Card Sample pulse is supplied through a resistor 346 to the input of a trigger 348. As shown, a capacitor 347 is arranged with resistor 346 in a manner to form an integrating circuit. As soon as the amplitude of the charge on the capacitor builds up to a potential to flip the trigger, a negative output pulse is supplied from the left side of trigger 348 through cathode follower 349 to a trigger 350. This trigger is connected as a single shot multivibrator and supplies an output pulse of eleven microseconds to a trigger 351 which will hereinafter be referred to as the lens return blanking trigger. This trigger is used to assure that no character data goes into the recognition circuit during the time interval that the lens is returning to its normal position. The output from trigger 351 is supplied through cathode follower 352 to each of switches 333 and 334 and will prevent any character data from going through the switches from inverter 330 and cathode follower 332 during intervals when trigger 351 is On.

It will be noted up to this time that certain of the triggers have provided thereunder one or more asterisks. These asterisks are provided on one side or the other at the bottom of the block representing the trigger. A single asterisk indicates that the trigger is reset at the end of a single scan, two asterisks indicate that a trigger is reset at the end of a character, and three asterisks indicate that a trigger is reset at the end of a card. The side of the block on which the asterisks are located indicates the side which is conducting in the reset condition. For example, the lens return blanking trigger 351 has three asterisks on the right side thereof which indicate that this trigger is reset at the end of a card and that the right side thereof is conducting in the reset condition. The reset to these triggers are in almost all instances plate pulldown resets and the plate which is pulled down is on the same side as the asterisks are located and has an input thereto labeled R\*, R\*\* or R\*\*\*. The detailed description of the reset circuitry to produce the reset inputs to the plates will be described at a later time in the description.

Switches 333 and 334 are also supplied with the Write Sync informatiton from cathode follower 318. The Write Sync produces outputs from switches 333 and 334 providing all of the other inputs to the switches are up. The output from switch 333 is representative of the character outline data and is fed through cathode follower 353, amplifier 354, amplifier 355 and a resistor 356 to the write head 357 which is located adjacent the surface 358 of the drum. This means that we are now writing the bits of data representing the character outline on the drum. The information being placed on the drum for the digit "1" which is scanned in the manner shown in Fig. 52a, may be similar to that illustrated in Fig. 52b. The small $x$ is used to represent bits of data which were obtained by sampling the video input. It will be understood, that the information regarding each scan is stored serially and that successive scans are written by the same write head as the information is received.

In the present invention, one of the most basic logical steps is to look for included white areas on a single scan. For example, as shown in Fig. 52b, there is an included white area between bits "c" and "d." These and other included white areas which may exist in a particular character help identify the character. However, vertical lines often have fringe areas on both sides thereof which may appear to produce included white areas on a single scan. For example, the bits "e," "f" and "g" in Fig. 52b are fringe bits and an included white area is found between bits "f" and "g." This can cause the logical analysis of the character to make a mistake in the identification of the character. To eliminate this possibility, a circuit has been devised which looks at side by side bits of data from a present and a prior scan. For example, if the bit "a" comes from a prior scan and bit "b" from a present scan, then a bit "a·b" is provided as an output, as shown in Fig. 52c. However, if bit "e" is observed on a present scan and compared with the lack of a bit on a prior scan, then no data will be provided as an output. The same is true for bits "f" and "g." Thus, the right side of the digit "1," above the base, will be devoid of extraneous bits.

It will be remembered that present scan data was written on track 358 by write head 357. Less than one scan time later by an amount equal to the time difference between the Write Sync and the Read Sync, the data on surface 358 is picked up by read head 359 and supplied through amplifiers 360 and 361 and the cathode follower 362 to one side of a switch 363. The other input to the last-named switch is the Read Sync which is used to switch the information supplied from head 359 into trigger 364. Therefore, trigger 364 is receiving the information obtained on a prior scan just slightly less than one scan time later. This trigger produces an eleven microsecond output pulse to one side of a switch 365 and through an inverter 366 and a cathode follower 367 to one side of a switch 368. The Write Sync is used to switch the information in switches 365 and 368 through cathode followers 369 and 370, respectively, to switches 371 and 372, respectively. By using the Write Sync for this switching function, the prior scan data appears at switches 371 and 372 in synchronism with the present scan data from switches 333 and 334, respectively. For example, the bits "a" and "b" shown in Fig. 52b would appear at switch 371, simultaneously. The bit "a" would come from switch 365 and the bit "b" would come from switch 333. Switch 372 would receive relatively positive inputs when there is no character data from a present and a prior scan at a particular bit time. When a coincidence occurs between present scan character data and prior scan character data, an output is produced from switch 371 and supplied to trigger 373. When a coincidence occurs between present scan background data and prior scan background data, an output is supplied from switch 372 to trigger 374. However, if the coincidences do not occur, then no outputs are supplied to the triggers.

Each of triggers 373 and 374 supplies a seven microsecond output pulse, when it receives an input pulse, to the right and left sides, respectively, of trigger 375. The arrangement is such that the trailing edge of the output pulse of trigger 373 will turn trigger 375 On and the trailing edge of the output pulse from trigger 374 will turn trigger 375 Off. Thus, for example, if signals representing bits "a" and "b" shown in Fig. 52b are being supplied to switch 371, trigger 373 will turn trigger 375 On. The trigger will stay On for the next two bits to produce signals representing "a" and "b," i.e. "a·b," as shown in Fig. 52c. However, at the time for the following two bits only background data appears. Thus, an output is supplied from switch 372 which causes trigger 374 to turn trigger 375 Off. Once trigger 375 is set On or Off, it will stay in that condition until the opposite coincidence data condition exists. For example, if "XX" occurs, the trigger will be turned On. Should "X0" or "0X" exist thereafter, the trigger will remain On. However, if "00" exists, i.e., the absence of character data on the present and prior scans, then the trigger 375 will be turned Off. This action can be witnessed in Fig. 52c. Note that bits "e," "f" and "g" are eliminated in the defuzz operation. On the left side of the character, the first included white in Fig. 42b is filled in in Fig. 52c by the circuitry next to be described.

The right side of trigger 375 is connected through cathode follower 376 to serve as one input to a two-position diode switch 377, the other input to the last-named switch being the Write Sync. The output from the left side of trigger 375 is supplied through cathode follower 387 to serve as one input to the two-position diode switch 379, the other input to the last-named switch being the Write Sync. Therefore, at Write Sync times, outputs will be supplied from either of switches 377 or 379, depending upon whether the trigger 375 is On or Off, respectively. It will be seen that bits "e," "f" and "g" are eliminated since "00" existed before bit "e" to cause trigger 375 to be Off. Thus, switch 379 will provide outputs indicating Ws for "e," as well as "f" and "g." However, "xx" existed before the first included white area on the left side of the character, as shown in Fig. 52b, to cause trigger 375 to be On. Thus, switch 377 will produce outputs indicating Bs for the entire included white area, thus filling it in as shown in Fig. 52c.

The output from switch 377 is supplied through cathode follower 380 to a trigger 382, this trigger being arranged to supply a five microsecond output pulse therefrom. Positive pulses at the output of this trigger indicate a black signal on a present scan, i.e. Bs. The output from switch 379 is supplied through cathode follower 381 to a trigger 383 which also supplies a five microsecond output pulse. Positive signals from this trigger indicate a white signal on a present scan, i.e. Ws.

In the present application, it is desired to look at the defuzzed video information for the present scan as well as that for a prior scan and make comparisons therebetween to determine various signature components for use in the recognition circuitry. Therefore, the output from cathode follower 380, which represents the character outline data, is supplied to write amplifiers 384 and 385, Fig. 2F, and through resistor 386 to a write head 387 which is positioned adjacent the recording surface 388. The information on surface 388 is picked up slightly less (the difference between the Read Sync and the Write Sync) than one scan thereafter by a read head 389. The delayed information is supplied through amplifiers 390 and 391 and cathode follower 392 to serve as one input to a two-position diode switch 393, the other input to the last-named switch being the Read Sync. The output from switch 393 is supplied to a trigger 394. This trigger is arranged to produce an eleven microsecond output pulse which is supplied directly to serve as one input to a two-position diode switch 395 and through inverter 396 and cathode follower 397 to serve as an input to a two-position diode switch 398. Both switches 395 and 398 are supplied with Write Sync so that their outputs are now precisely one scan delayed from the present scan. The output from switch 395 is supplied through cathode follower 399 to a trigger 401, this trigger being arranged to supply a five microsecond output pulse representing what will hereinafter be termed the character outline data for a register scan. This may be termed the black register (Br) data. The output from switch 398 is supplied through cathode follower 400 to trigger 402. This trigger is also arranged to produce a five microsecond output pulse which will hereinafter be referred to the white register (Wr) output data and represents the background data for a previous scan.

Once the information from recording surfaces 358 and 388 have been picked up by read heads 359 and 389 it is necessary to erase the information so that more data can be written thereon. Therefore, erase heads 403 and 404 are provided adjacent recording surfaces 358 and 388, respectively, and are supplied with a D.C. voltage sufficient to erase the information on the recording surfaces.

*Scanning black-white ring*

Referring again to triggers 382 and 383 shown in Fig. 2c, it will be remembered that five microsecond output pulses are supplied from each one. The output from trigger 382 is a positive pulse and is supplied through inverter 405 to the right side of triggers 406 and 407 and to the left side of triggers 408, 409, 410 and 411, shown in Fig. 2E. This group of triggers, along with certain ones which will be mentioned hereinafter, are used as a sequencing circuit. One of the things which it is desired to know is the number of times there are included white areas on a single scan. An included white area may be defined as an area of the character on a scan which is preceded by a character outline signal and followed by a character outline signal. In the present system, there may be up to four included white areas, which means that there may be as many as five character bits of information on a single scan.

The first Bs signal from trigger 382 which is detected on a scan turns trigger 406 On. It is seen that this trigger is provided with a single asterisk which means that it is reset at the end of each scan. The first Bs signal also turns on trigger 407. This trigger may be termed the B1s trigger, which means that it is turned On by the first crossover of a character. Since triggers 408, 409, 410 and 411 are initially reset at the end of a scan so that their right side is conducting, the application of a negative pulse to the left sides of these triggers has no effect on them. However, when a Ws signal is supplied through inverter 412 to the left side of triggers 407, 413, 414 and 415, trigger 407 will be turned Off. Since none of triggers 413 through 415 were On the application of a negative pulse to the left side thereof will have no effect on them. However, when trigger 407 turns Off a negative pulse is supplied from the right side thereof to trigger 408, turning this trigger On. This is termed the W1s trigger, which means that it is the first white area which is encountered after the first crossover. The output from the right side of trigger 407 is also supplied to the right side of trigger 416 turning this trigger On. The output from the right side of trigger 416 is now relatively positive, and after being supplied through inverter 417, serves as a clamp to hold trigger 407 Off. From the circuit arrangements shown, it is seen that the plate of trigger 407 is tied to the plate of inverter 417. This means that thereafter during a single scan, the application of a Bs pulse thereto will no longer turn the trigger On.

On the second Bs pulse within a single scan, trigger 408 is turned Off and in so doing supplies a negative pulse from the right side thereof to the right side of trigger 413 which turns this trigger On. The next Ws pulse turns trigger 413 Off. This produces a negative output pulse from the right side of trigger 413 which is supplied to turn trigger 409 On. Trigger 409 is termed the W2s trigger. The third Bs signal during the scan is applied to the left side of trigger 409, turning the trigger Off. In going Off trigger 409 supplies a negative pulse to the right side of each of triggers 415 and 418. Trigger 418 is termed the B3s Seen trigger and will remain On for the rest of the scan. However, trigger 415, which is termed the B3s trigger is turned Off by the next Ws pulse during the scan. When trigger 415 turns Off it supplies a negative output pulse to turn the trigger 411 On, this last trigger being termed the W3s trigger. The fourth Bs pulse during a single scan turns trigger 411 Off, and in going Off it supplies a negative pulse to turn trigger 414 On, trigger 414 being termed the B4s trigger. The fourth Ws pulse within a single scan turns trigger 414 Off which, in turn, sets trigger 410 to an On condition, this trigger being termed the W4s trigger. The fifth Bs signal during a single scan turns trigger 410 Off which supplies a negative output pulse to turn trigger 419 On, which trigger remains On for the remainder of the scan. Trigger 419 is termed the B5s trigger and means that during a single scan five crossovers have been seen.

From the above it will be seen that it is possible to count the number of crossovers during a single scan and to set up various triggers which will be On if a certain number of crossovers have been seen. For example, the B3s Seen trigger 418 will remain On once three crossovers have been seen.

*Register black-white ring*

The circuit as described so far represents those conditions for a present scan. Somewhat the same operation is performed on the data for a prior scan, i.e. the register scan. It will be remembered that the output from triggers 401 and 402 represented Br and Wr data, respectively. The Br data is supplied through an inverter 420 to the right side of trigger 421 and to the left sides of triggers 422 and 423. Thus, the first Br pulse will turn trigger 421 On, this trigger being termed the B1r trigger. The first Wr pulse after the first Br pulse from trigger 402 is supplied through an inverter 424 to the left side of triggers 421, 425 and 426. When the first Wr pulse is applied to trigger 421, it turns this trigger Off, thus producing a negative output pulse to turn trigger 422 On. Trigger 422 which is termed the W1r trigger, is turned Off by the second Br pulse, and in going Off it supplies a negative pulse to turn trigger 425 On. Trigger 425, which is termed the B2r trigger, is turned Off by the second Wr pulse, and in going Off it turns trigger 423, the W2r trigger, On. Trigger 423 is turned Off by the third Br pulse, and in going Off it turns trigger 426, the B3r trigger, On. Trigger 426 in going On, supplies an output pulse to inverter 432 to turn trigger 433 On, this trigger being labeled the B3r Seen trigger. The third Wr pulse is arranged to turn trigger 426 Off.

It will be noted that the output of trigger 421 is connected to trigger 427 such that when trigger 421 turns Off, trigger 427 will be turned On. At this time the output from the right side of trigger 427 becomes relatively positive and supplies an output through an inverter 428 whose plate is tied to the plate of trigger 421. This arrangement clamps trigger 421 so that it cannot come On again during a single scan.

A two-position diode switch 429 is arranged to receive an input from the Br line and also an input from a cathode follower 537 which is connected to the right side of trigger 425. The output from switch 429 is supplied to an inverter 430 to turn a trigger 431 On, the last-named trigger being labeled B2r Seen.

*Signature components*

To this point, the description has shown how the number of crossovers and the included white areas between the crossovers on a single present scan and on the immediate prior or register scan are obtained. These indications will be utilized at a later time in the recognition circuitry and will be referred to at those times.

It will be remembered that an End of Scan signal was supplied from trigger 343 (Fig. 2B) of one hundred fifteen microseconds duration. This signal is supplied to a trigger 434, Fig. 2J, which produces an output pulse of twenty-five microsecond duration. This last-named pulse is connected to cathode followers 435 and 436 which are arranged in parallel and whose outputs are connected to a terminal which is identified by a circle having the numeral "1" therein. The output at this terminal will hereinafter be referred to as the End of Scan Sample pulse. If at other points in the circuit there is shown a circle having the numeral "1" therein, it means that that point is adapted to be connected to the output of cathode followers 435 and 436.

The twenty-five microsecond pulse from trigger 434 is also connected through inverter 437 and cathode follower 438 to a trigger 439, this trigger being arranged to produce an output pulse having a thirty microsecond duration. This thirty microsecond output pulse is supplied to a line which is labeled with an asterisk and is provided with a legend End of Scan Reset. This means that the output from trigger 439 is utilized in reset circuitry which will be described at a later time to produce the plate pull-down reset for all triggers which have a single asterisk thereunder. As shown in the circuit, the End of Scan Reset is utilized directly to reset trigger 415, Fig. 2H, through an inverter 1204. Also, it is supplied through an inverter 648, Fig. 2J, to reset a trigger 555, Fig. 2M, which will be discussed at a later time in the description.

One of the first signature components which is determined in scanning a character in the manner previously described is referred to as WA1. The B2s trigger 413, Fig. 2H, has its right side connected through cathode follower 440 and inverter 441 to set trigger 442, Fig. 2J. The right plate of trigger 442 is connected to the right grid of trigger 454. It is noted that trigger 442 is turned Off at the end of the scan if it has been turned On during a scan. Therefore, if it is turned from On to Off at the end of the scan, a relatively negative signal is applied to the right side of trigger 454 which turns this trigger On. In going On, trigger 454 supplies an output pulse through inverter 455 whose plate is tied to the plate of the right side of trigger 442, thus clamping trigger 442 Off. This means that once trigger 442 has been turned On during the scanning of a character, it will be turned Off at the end of the scan during which it was turned On and cannot thereafter be turned On during that character.

During the scan when trigger 442 is first turned On, a relatively positive voltage is applied through cathode follower 443 to one side of a two-position diode switch 444, indicating to the switch that an included white area has been found on a present scan, i.e. B2s. The other side of this switch receives an input which is derived by combining the W1s output from the right side of trigger 408, Fig. 2H, which is connected through a cathode follower 445 to a two-position diode switch 446, Fig. 2J, with the Wr input from trigger 402, Fig. 2E. When these two occur in coincidence at switch 446, an output signal W1s=Wr is supplied through an inverter 447 to set a trigger 448. If W1s does not occur in coincidence with Wr, i.e., W1s≠Wr, trigger 448 is not set and a relatively positive potential is supplied from the left side thereof which is W1s≠Wr. This signal is fed through a cathode follower 449 to serve as the other input to switch 444. Therefore, it will be seen that switch 444 will have an output only during the scan in which there is a first B2s in coincidence with Wr. The output from switch 444 is supplied through an inverter 450 to set a trigger 451, Fig. 2L, which may be termed the WA1 trigger.

The right side of the trigger 451, if set, will be relatively positive and will supply an output through cathode follower 452 which is indicative of the fact that WA1 is closed to the right, i.e., WA1/CR. This will be obvious when it is realized that if at the time B2s first occurs, there exists a lack of coincidence between W1s and Wr, then the first included white area is closed on the right. By way of example, Fig. 53a shows an instance of WA1/CR. Scan r is the register scan and scan s is the present scan.

If trigger 451 is not set during a character, the left side of the trigger will be relatively positive and the output therefrom through cathode follower 453 indicates that WA1 is open to the right, i.e., WA1/OR. An indication of this condition is evidenced in Fig. 53b. Therefore, it has now been determined whether WA1 is closed to the right or open to the right.

The next signature component which will be discussed is the WB component. This component is defined by the fact that it is a second included white area which is encountered within a character during the time that the first included white area is still in existence. To obtain this signature component, the output of the right side of the W1r trigger 422, Fig. 2K, is supplied through a cathode follower 456 to a two-position diode switch 457, Fig. 2L. This input is termed the W1r input. The other input to this switch is the W1s input which is obtained from cathode follower 445, Fig. 2J. If there is a coincidence of W1s and W1r, an output will be provided from switch 457 and supplied through inverter 458 to set trigger 459, Fig. 2M. If trigger 459 is not set, i.e., there is not a coincidence of W1s and W1r, the left side of this trigger will be relatively positive which is therefore an indication that W1s≠W1r. The output of the left side of trigger 459 is connected through a cathode follower 460 to a three-position diode switch 461. Another input to this switch is the B2r Seen input which is derived from the right side of trigger 431, Fig. 2K, through a cathode follower 462. The third input to switch 461 is the End of Scan Sample which is used to switch the other inputs into cathode follower 463 providing that at the time the End of Scan Sample pulse occurs, the other inputs to switch 461 are relatively positive.

The output from cathode follower 463 is supplied to each of switches 464, 465 and 466. Switches 464 and 465 are four-position diode switches which will be discussed at a later time. Switch 466 is a three-position diode switch which is adapted to receive, in addition to the output of cathode follower 463, B3s Seen from the right side of trigger 418, Fig. 2H, through cathode follower 467, Fig. 2J, and B3r Not Seen which is obtained from the left side of trigger 433, Fig. 2K, through cathode follower 468. If all of the inputs to switch 466, Fig. 2M, occur in coincidence an output is supplied through a cathode follower 469 to a switch 471.

It will be noted that cathode follower 470 has its cathode tied to the cathode follower 469, thus forming an OR circuit. Thus, cathode follower 470 serves as an alternate path for an input to switch 471.

An input to cathode follower 470 may be obtained from switch 477. This switch comprises four diodes which are arranged to receive information regarding the occurrence of B2s, B1r, B2r Seen, and $\overline{B3r}$. The B2r Seen input is derived from cathode follower 462 which is connected to the right side of trigger 431. The connections for the remainder of the inputs are not shown herein but it will be seen that they can be picked off various triggers where these conditions exist.

In view of the above, it is seen that there are two possible inputs to switch 471. The other input to switch 471 is from the right side of trigger 448 through a cathode follower 472, this last input being W1s=Wr. If the two inputs to switch 471 occur in coincidence, an output is supplied through an inverter 473 to set a trigger 474, Fig. 2Q, this trigger being the WB trigger. If the trigger is set, the right side thereof will be relatively positive and will supply an output through cathode follower 475 which is indicative of the fact that WB is open to the right, i.e., WB/OR. This condition is evidenced in Fig. 54a.

If trigger 474 is not set during the scanning of a character the left side will be relatively positive. Thus, an output is supplied through cathode follower 476 which indicates that WB is open to the right if it exists at all. It is seen that the fact that trigger 474 is not set does not necessarily mean that WB exists, i.e., WB/E. The determination of whether WB exists is detected in the switch 478, Fig. 2Q, which is adapted to receive the output from the cathode follower 476. The other input to switch 478 comes from cathode follower 518 which is connected to receive the output of the B3r Seen trigger 433. Therefore, switch 478 receives the fact that three crossovers have been seen in the prior scan and the fact that trigger 474 indicates that WB is closed to the right if it exists. Therefore, an output from switch 478 is indicative of the fact that WB is closed to the right, i.e., WB/CR, this output being supplied through the cathode follower 479. This condition is evidenced in Fig. 54b.

It will be remembered that the manner of obtaining WA1/CR and WA1/OR has been explained. However, it is not known whether WA1 is in the upper or lower portion of the character. The circuitry is arranged such that WA1 is arbitrarily defined to exist in the upper portion of the character unless conditions occur which indicate that WA1 is in the lower portion, i.e., WA1/L. To detect a WA1/L condition, the output from either of cathode followers 469 or 470, Fig. 2M, is connected through an inverter 480 to a trigger 481, Fig. 2L, which sets this trigger. If trigger 481 is set, the right side thereof rises and supplies an output through a cathode follower 482 indicating that WA1 is lower. This condition is the same as that shown in Fig. 54a except that WA1/L does not require W1s=Wr. If trigger 481 is not set, the left side will be relatively positive and its output through cathode follower 483 indicates that WA1 remains upper, at least for the present.

There are alternative conditions which indicate that WA1 is upper. Swith 647, Fig. 2L, is adapted to receive B1r, B2s and WA1/CR as inputs. If these conditions occur in coincidence, a trigger 545 is turned On so that its right side will supply a positive voltage to an inverter 546 whose plate is tied to the plate of the right side of trigger 481. Thus, it is seen that inverter 546 will clamp trigger 481 in an Off condition. The plate of the left side of trigger 481 will be relatively positive to indicate WA1/U.

Another condition for determining WA1/U is the existence of WA2. An inverter 544, Fig. 2L, has its plate tied to the plate of the right side of trigger 481. The input to this inverter is WA2/E. When WA2 does exit, trigger 481 is clamped Off, thereby allowing the plate of the left side thereof to be positive to indicate WA1/U.

The next signature component to be discussed is WA2. This is an included white area which is separated from WA1 by a vertical line. In other words, WA1 and WA2 cannot be in existence in the same scan. Referring now to the two four-position diode switches 464 and 465, Fig. 2M, it will be seen that their outputs are supplied to two cathode followers 539 and 540, respectively, whose cathodes are commoned to form an Or circuit.

Switch 464 is adapted to receive an input, $W1s \neq W1r$ in coincidence with B2r Seen, from switch 461 through cathode follower 463. Another input to switch 464 is B3s Seen from the right side of trigger 418, Fig. 2H, through cathode follower 467, Fig. 2J. Another input is $W1s \neq Wr$ which is supplied from trigger 448, Fig. 2J, through cathode follower 449. The remaining input to trigger 464 is WA1/CL. While the wiring for this input is not shown, it will be understood that it can be received from the left side of trigger 507 through cathode follower 513, Fig. 2S.

One input to switch 465 comes from switch 461 through cathode follower 463. The second input to switch 465 is W2s at the end of scan time. This input is supplied from the right side of trigger 409, Fig. 2H, through cathode follower 538, Fig. 2J. A third input to switch 465 is B3r Not Seen which is supplied from the left side of trigger 433, Fig. 2K, through cathode follower 468. The fourth input to switch 465 is WA1/CL which may be obtained as previously described. If either of switches 464 or 465 produce an output, inverter 541 will receive an input which will be supplied through inverter 542, Fig. 2S, to set triggers 506 and 510. If trigger 510 is turned On, an output from the right side thereof through cathode follower 543 indicates that WA/2 exists, i.e. WA2/E. If this trigger is not turned On, the output from the left side thereof through cathode follower 511 indicates that WA2 does not exist, i.e. $\overline{WA2/E}$.

Once the signature components WA1, WB, and WA2 have been determined to exist, it is necessary to track them to see whether they are open or closed on the left. Since substantially the same circuit is utilized in tracking WA1 and WA2, these signature components will be discussed first.

A trigger 507 is provided in Fig. 2S. This trigger is set in an Off condition at the end of scan time. The trigger may be turned On during the scanning of a character by the condition B2r Seen which is supplied from trigger 431, Fig. 2K, through cathode follower 462 and inverter 462a to the right side of trigger 507. Actually the circuit does not know whether WA1 is open left or closed left. Therefore, the condition of trigger 507 being On is arbitrarily defined to indicate WA1/OL. This output may be fed through cathode follower 1201 to serve as a signature component indication. If during the tracking of WA1, conditions are found to exist which determine that actually WA1 is closed left, then trigger 507 will be turned Off and an output will be supplied through cathode follower 513 to indicate WA1/CL. It will be remembered that trigger 506 was turned On by the existence of WA2. The condition with trigger 506 On is arbitrarily defined to indicate WA2/OL. This indication may be obtained from cathode follower 646 which is connected to the right side of trigger 506. If the trigger is Off at the end of the scan, an output is supplied through cathode follower 506a to indicate WA2/CL.

In view of the above, a circuit must be provided to determine whether conditions exist which indicate whether WA1 or WA2 are closed on the left. The present invention keeps looking for these conditions until the end of character time. Therefore, to determine the WA1/OL or WA1/CL and WA2/OL or WA2/CL, an inspection must be made at the end of character time.

Trigger 484, Fig. 2N, serves as the central factor in tracking WA1 and WA2. This trigger can be used to reset both of triggers 506 and 507. While it will be appreciated that WA1 is tracked before WA2, the description will deal with all conditions which may be used to reset these triggers.

Referring to Fig. 2N, a two-position diode switch 485 is adapted to receive as inputs W1r and Ws, W1r being obtained from cathode follower 456, Fig. 2K, and Ws being obtained from the Ws input line which passes through inverter 412, Fig. 2H, and cathode follower 486 to trigger 487. This trigger produces a five microsecond output pulse which is used to produce Ws at switch 485. If W1r and Ws occur in coincidence during a single scan, an output $W1r=Ws$ is produced from switch 485 which passes through cathode follower 488 to a first two-position diode switch 490, Fig. 2L. The other input to switch 489 may come from two sources, but for the present the description will only deal with the input WA1/U, which is supplied by way of cathode followers 483 and 491 from the left side of trigger 481, Fig. 2L. Therefore, if $W1r=Ws$ and WA1 remains upper an output is supplied from switch 489. The output from switch 489 is coupled through cathode follower 501 and inverter 502 to set trigger 484. If trigger 484 is set by the previously described conditions, then its output, when supplied through cathode follower 503 to switch 504, will prevent the End of Scan Sample pulse from passing through switch 504 and inverter 505 to reset triggers 506 and 507, Fig. 2S.

There is an alternate route provided for the input into switch 489, Fig. 2N, previously described as coming only from cathode follower 491. This alternate route is by way of either of cathode followers 492 or 493 whose cathodes are tied to the cathode of cathode follower 491 thereby forming a three way OR circuit. Treating cathode follower 493 first, it will produce an output which is relatively positive by means of a special tracking circuit. Referring now to an inverter 494, Fig. 2P, it is seen that this inverter is supplied with an input $W1r=Ws$ from cathode follower 488, Fig. 2N. The output of inverter 494 is supplied to set trigger 495, and in the event it is set, it will produce an output through cathode follower 496 to a two-position diode switch 497. However, note that the left side of trigger 495 is supplied with B2s from the right side of trigger 408, Fig. 2H, in the black white present scan ring. The other input to switch 497 is W2r which is received from trigger 423 by way of cathode follower 508, Fig. 2K. Therefore, an output will be produced from switch 497 providing trigger 495 is first set by $W1r=Ws$ and then not reset by B2s before W2r occurs. If this sequence of events is followed, an output will be produced from switch 497 which is supplied through inverter 498 to set a trigger 499, which trigger may be reset by a B3r Seen signal supplied from trigger 433, Fig. 2K, through cathode follower 518 and inverter 645.

As long as trigger 499 is On, a relatively positive voltage is supplied from the right side thereof through cathode follower 500 to cathode follower 493, Fig. 2N, which can serve as an input to switch 489. If this input is in coincidence with $W1r=Ws$ then trigger 484 will be turned On and prevent triggers 506 and 507, Fig. 2S, from being turned Off.

Cathode follower 492 may also supply an input to switch 489 in Fig. 2N. This switch is connected to receive the output of a two-position diode switch 1202. One input to this switch is WB/CL, which may be obtained from cathode follower 519, Fig. 2S, and the other input is WA1/L. When these inputs occur in coincidence, an output is supplied through cathode follower 492, Fig. 2N, to switch 489. If this input occurs in coincidence with $W1s=Wr$, then trigger 484 will be set, thus preventing the resetting of either of trigger 506 or 507, Fig. 2S.

An alternate path to trigger 484 is by way of cathode follower 526 whose cathode is commoned with the cathode of cathode follower 501, thus forming an OR circuit. The input to cathode follower 526 comes from a two-position diode switch 509. This switch is connected to receive as one input the fact that WA1 is lower. The other input to switch 509 will now be described in detail. Reference is made to trigger 510, Fig. 2S. If this trigger is not set, the left side thereof will be relatively positive indicating that WA2 does not exist, i.e. $\overline{WA2/E}$. The output from the left side through cathode follower 511 is supplied to serve as one input to a two-position diode switch 512, Fig. 2N. The other input to switch 512 may be either WB/CL received from cathode followers 514 or 520, respectively. The output from switch 512 is supplied through inverter 521 and cathode follower 522 to serve as one input to a three-position diode switch 523, Fig. 2L. That is, if WA2 does not exist and WA1 or WB are closed left, an output will be produced from switch 512, Fig. 2N, which, when inverted in 521 and supplied through cathode follower 522 to switch 523, Fig. 2L, will clamp switch 523 Off so that no information can pass therethrough. However, if an output is not supplied from switch 512 to switch 523, the input from cathode follower 522 to switch 523 will be relatively positive and therefore switch 523 will not be clamped off.

The other inputs to switch 523 are Ws, which is supplied from trigger 487, Fig. 2H, and W2r which is supplied from cathode follower 508 connected to the right side of trigger 423, Fig. 2K. An output from switch 523 is supplied through cathode follower 524 to switch 509, Fig. 2N. If there is an output from cathode follower 524, and WA1 is lower, switch 509 will supply an output through cathode follower 526 and inverter 502 to set trigger 484, in which event the left side of trigger 484 will be down. When this voltage is supplied through cathode follower 503, it will block switch 504 so that no input will be supplied to reset triggers 506 and 507.

It should be apparent that the End of Scan signal supplied to switch 504 in Fig. 2N, tries to get through the switch each time it occurs. Each scan during which trigger 484 is not turned On by the various combinations of signals previously described, the End of Scan signal will get through and turn triggers 506 and 507, Fig. 2S, Off if they have been On. Of course, if these triggers have been Off, the reset input thereto has no effect thereon.

The tracking of WB will now be described. Trigger 515, Fig. 2S, is the final factor in indicating the condition of WB on the left. Here again, when it is first learned that B3s has been seen, it is arbitrarily said that WB is open on the left. Thereafter, unless conditions occur on each scan which continue to assert that WB is open left, an indication is given that it is closed left. Thus, if trigger 515 is set by the occurrence of WB, its right side will be relatively positive and supply a signal through cathode follower 1203 to indicate WB/OL. If trigger 515 is turned On by B3r Seen and thereafter turned Off, the left side thereof will be relatively positive to indicate WB is closed on the left. This potential is fed to a switch 517 which also receives B3r Seen. Therefore, an output can be supplied from this switch through cathode follower 519 to indicate WB/CL. It is seen that switch 517 insists that trigger 515 must have been turned On and then Off before an output can be produced to indicate WB/CL.

Referring now to trigger 527, Fig. 2L, there is illustrated a trigger which serves as the basic control for determining whether WB is open or closed left. The input to this trigger is by way of inverter 533 and either of two alternate paths which feed cathode followers 531 and 532 whose cathodes are commoned to form an OR circuit.

The first path to be described is from a switch 490 to cathode follower 531. It will be remembered that W1r=Ws was supplied to switch 490 from cathode follower 488, Fig. 2N. The other input to this switch is by way of one of three alternate paths. The first path is from the right side of trigger 481 through cathode follower 482 and cathode follower 528. This means that if WA1 is lower, a relatively positive signal will be supplied from cathode follower 528 to switch 490. Note that the right side of the cathode of cathode follower 528 is also tied to the cathodes of cathode followers 529 and 530, Fig. 2N. It will be remembered that switch 512, Fig. 2N, produced an output if WA2 did not exist and if WA1 was closed left or WB was closed left. Therefore, the output from switch 512 can pass through cathode follower 529 to serve as the second alternate input to switch 490. The other alternate input to switch 490 may be by way of cathode follower 530 from cathode follower 500, Fig. 2P. This signal will be relatively positive providing trigger 499 has been set but has not yet been reset by B3r Seen.

If any of the three above-described alternate inputs are supplied as an input to switch 490, Fig. 2L, in coincidence with W1r=Ws, an output is produced. This output is connected through cathode follower 531 and inverter 533 to set trigger 527. If trigger 527 is set, the left side thereof will be relatively negative and hold switch 535 down by way of cathode follower 534. Therefore, the End of Scan Sample pulse supplied to switch 535 cannot get through to inverter 536 to reset trigger 515, Fig. 2S. However, if trigger 527 is not set during a scan, the left side thereof will be relatively positive so that the End of Scan Sample pulse supplied to trigger 535 will reset trigger 515.

The other alternate path to trigger 527 is by way of switch 525, cathode follower 532 and inverter 533, Fig. 2L. It will be seen that switch 525 receives the previously described output from switch 523 by way of cathode follower 524. The other input to switch 525 comes from trigger 481 which supplies an output through cathode follower 483 indicating the fact that WA1 remains upper. In the event that the two inputs to switch 525 are relatively positive in coincidence, an output will be supplied therefrom to set trigger 527, thereby preventing the resetting of trigger 515, Fig. 2S.

If a signal is allowed to be supplied from switch 535 at End of Scan Sample time by way of any of the alternate paths just described, the WB trigger 515, Fig. 2S, will be reset. If the trigger 515 remains On at the end of character scanning, the condition WB/OL is supplied as an output through cathode follower 1203. If the trigger 515 is Off at the end of character scanning, then WB is closed left if it exists. As previously described, the existence of WB/CL is finally determined by switch 517 which insists that trigger 515 must have been turned On and then Off in order to indicate WB/CL.

Another signature component which is to be determined is the coincidence of WA1/U and $\overline{WA2/E}$, i.e., WA1/U·$\overline{WA2/E}$. This condition is determined by switch 547, Fig. 2P, which is adapted to receive $\overline{WA2/E}$ from trigger 510 through cathode follower 511, Fig. 2S. The other input to switch 547 is WA1/U which comes from trigger 481, Fig. 2L, through cathode follower 483. If these two conditions occur in coincidence an output is produced from cathode follower 548, Fig. 2P, indicating the coincidence of these two conditions.

Another condition which is desired to be provided is whether either WA1/OR or WB/OR exists, i.e., WA1/OR+WB/OR. This is determined by utilizing cathode followers 549 and 550, Fig. 2S, with their cathodes commoned. The input to cathode follower 549, WB/OR, comes from the right side of trigger 474, Fig. 2Q, through cathode follower 475. The input to cathode follower 550, WA1/OR, comes from the left side of trigger 451, Fig. 2L, through cathode follower 453. If either cathode follower 549 or 550 are up an output is supplied from their common cathodes indicating

WA1/OR+WB/OR

Another signature component which is to be determined is whether there exists a positive slope which slants to the left, such as that which is found in the character "4." Referring to Fig. 2L, there is provided a three-position diode switch 551 which is adapted to receive B1r, Ws and $\overline{W1s}$. B1r is supplied from the right side of trigger 421 through cathode follower 552. Ws is supplied from trigger 487, Fig. 2H, which receives an input from the Ws line. $\overline{W1s}$ is received from the left side of trigger 408, Fig. 2H, through cathode follower 553. If these three conditions occur in coincidence, an output is furnished from switch 551, Fig. 2L, through inverter 554 to set a trigger 555, Fig. 2M. When trigger 555 is On, relatively positive voltage is supplied therefrom through cathode follower 556 to a two-position diode switch 557. The End of Scan Sample pulse is also supplied to switch 557 which, through cathode follower 558 and capacitor 559, supplies an input to the diode unit 560. It will be seen that trigger 555 is adapted to be reset at the end of each scan. This reset comes from the right side of trigger 439, the End of Scan Reset generator, shown in Fig. 2J, through inverter 648 to the left side of trigger 555. A capacitor 561 is provided between capacitor 559 and ground. The results of supplying a pulse to diode unit 560 during each scan in which there is a coincidence of B1r, Ws and $\overline{W1s}$ is to charge a capacitor 562 which has one side connected between the diode unit 560 and an inverter 563.

As the charge builds up on capacitor 562 due to inputs on a plurality of scans, inverter 563 produces lower and lower output potentials from the plate thereof to an inverter 564. The last inverter is a threshold device, the grid thereof being normally biased so that the inverter will conduct. The bias is accomplished by means of a potentiometer 565 which is connected to a negative source of D.C. potential, which, in the present instance, is shown as −250 v. D.C. When the input to inverter 564 becomes sufficiently negative to cut the tube off, the output therefrom rises sharply and is supplied through cathode follower 566 to turn a trigger 567 On, Fig. 2Q. When trigger 567 is turned On, the right side thereof will be relatively positive and supply an output signal through cathode follower 568, indicating that there exists a long positive slope, i.e., PSL. However, if during the scanning of a character trigger 567 is not turned On, the left side thereof will be relatively positive, and an output will be supplied from cathode follower 569 indicating that a long positive slope does not exist, i.e., $\overline{PSL}$.

One reset for the long positive slope circuit previously described is by way of a double inverter 570, Fig. 2M. This inverter is adapted to receive an input during the first scan in which no character outline is intercepted. This input is termed an All White Scan and may be obtained from switch 598 and cathode follower 599 in Fig. 2H. In the event of an All White Scan the output from inverter 570 is a relatively positive potential which causes the right side of inverter 563 to conduct. Since the plate of the right side is connected to the capacitor 562, the capacitor will be discharged.

Another signature component which is to be determined is the existence of a left overhang, i.e., LO and the non-existence of a left overhang, i.e., $\overline{LO}$. These conditions are determined by a circuit now to be described. A two-position diode switch 571, Fig. 2M, is adapted to receive W1s as one input from the right side of trigger 408, Fig. 2H, through a cathode follower 445, Fig. 2J. The other input to switch 571 is the End of Scan Sample pulse. Thus, for each time that W1s is in existence at the End of Scan Sample time, an input is supplied through cathode follower 572 and capacitor 573 to the diode unit 574. A capacitor 575 is connected between one side of capacitor 573 and ground. Each of these input pulses during the scanning of the character charges a capacitor 576 which, in charging, furnishes an increasingly positive voltage to an inverter 577. The output from this inverter becomes lower and lower and at some point cuts the inverter 578 off. The point at which inverter 578 cuts off is determined by potentiometer 579 which is connected to a negative source of D.C. potential, herein illustrated as −250 v. D.C. If inverter 578 is cut off, a relatively positive going signal is supplied through cathode follower 580 to a two-position diode switch 581. Since the left overhang is being dealt with, B2r must have been seen during the scanning of a character. If B2r has been seen, i.e. B2r Seen, a relatively positive signal will be supplied to switch 581 from the right side of trigger 431, Fig. 2K, through cathode follower 462. If these two conditions occur in coincidence, the output of switch 581 will set a trigger 582 so that the right side thereof is relatively positive and will supply an output signal through cathode follower 583 indicating the existence of LO. However, if trigger 582 is not set, the left side thereof will be relatively positive which will supply an output through cathode follower 584 indicating $\overline{LO}$.

The occurrence of B2s during the charging of capacitor 576, Fig. 2J, will discharge it. Thus, if the capacitor has not been charged sufficiently to produce a left overhang condition before B2s occurs, the capacitor is discharged and must start over again. The diode unit 585, Fig. 2M, is an OR circuit. It is adapted to receive as one input B2s which may be obtained from the plate of the right side of trigger 413, Fig. 2H. The cathodes of the diode unit are commoned and connected through a resistor 586 to −100 v. D.C. Thus, if B2s occurs, a positive voltage is applied to the right side of inverter 577 to discharge capacitor 576.

An alternate condition for discharging the capacitor is an All White Scan. As explained heretofore, the signal for this condition is supplied through inverter 570, Fig. 2M, to serve as another input to the OR diode unit 585. The output from this unit is applied to the right side of inverter unit 577 to discharge capacitor 576.

It is also desirable to determine whether there are any right overhangs, i.e., RO. Referring to Fig. 2N, this condition is determined by supplying a first input to a two-position diode switch 587 from the left side of trigger 431, Fig. 2K, to a cathode follower 588 indicating $\overline{B2r\ Seen}$. The second input to switch 587 comes from cathode follower 580, Fig. 2M, which it will be remembered, is positive only when W1s exists at the end of the scan for a predetermined number of scans without B2s or an All White Scan intervening. The remaining input to switch 587, Fig. 2N, is the fact that a vertical line right does not exist, i.e., $\overline{VLR}$. A vertical line right is defined as a vertical line to the right of three crossovers. If there is a coincidence of the inputs at switch 587, an output is supplied therefrom to turn trigger 589 On. If trigger 589 is set, a relatively positive signal is supplied from the right side thereof through a cathode follower 590 indicating RO. However, if during the scanning of a character trigger 589 is not set, the left side thereof will be relatively positive which will supply an output signal through the cathode follower 591 indicating $\overline{RO}$.

A number of other signature components which require identification during the recognition process will now be described. Referring now to the two two-position diode switches 649 and 650 shown in Fig. 2R, it will be seen that switch 649 receives B1r and Br while switch 650 receives W1r and Wr. As long as B1r is in existence, the Br pulses will be allowed to pass through switch 649. Therefore, the number of pulses from this switch is a measure of the duration of B1r, or in other terms, a measure of the length of the first crossover. Similarly, as long as W1r exists, Wr pulses can pass through switch 650. The number of pulses from this switch is a measure of the length of the first white area following the first crossover. The output from switches 649 and 650 go to inverters 651 and 652, respectively, whose plates are tied together, thereby making an OR circuit. The output from this OR circuit is taken from inverter 651 and supplied to the first position of a four-position binary counter circuit. This counter comprises triggers 653, 654, 655 and 656. The arrangement is conventional in that the right side of one stage is connected to the input of both sides of the next stage. Outputs may be taken from the right sides of stages 653 through 656 and supplied through cathode followers 657 through 660.

It will be apparent that if it is desired to count the number of B$r$ pulses during the first crossover, and then separately count the number of W$r$ pulses following the first crossover, it is necessary to reset the counter after the last B$r$. This reset is supplied from a trigger 661 which is adapted to produce an eight microsecond pulse upon the occurrence of W1$r$. The output of this trigger is supplied to an inverter 662 whose plate is tied to the plate of an inverter 663. The common plates are connected to each of diode units 664 through 667 which are tied to the plates of the right side of triggers 653 through 656, respectively. The End of Scan signal is supplied to inverter 663 to serve as an alternate or final reset on a scan. That is, either the first W1$r$ can reset this counter or the End of Scan signal. If there is only a single crossover during a scan there will not be a W1$r$ and it is therefore necessary to use the End of Scan signal to reset the counter. However, if W1$r$ occurs before the End of Scan signal the counter will be reset at that time.

Other circuits now to be described will utilize the outputs of cathode followers 657, 658, 659, and 660, which represent the binary values 1, 2, 4 and 8. Referring now to a five-position diode switch 668, Fig. 2R, it is seen that this switch is adapted to receive B1$r$ and one or more of the 1, 2, 4 and 8 outputs from the counter. Let it be assumed for example that a count of 14 is required. In this event, only the 2, 4 and 8 outputs will be used. The coincidence of these conditions at switch 668 results in an output through cathode follower 669 to each of two two-position diode switches 670 and 671. Switch 670 is adapted to also receive $\overline{B3r}$. The output from this switch will set a trigger 672. If trigger 672 is set during a character, an output is supplied through the right side thereof through the cathode follower 673 representing a vertical line right, i.e., VLR. As previously stated, a vertical line right is a vertical line which exists before three crossovers. In this case, a vertical line is defined by at least fourteen B$r$ pulses during B1$r$. If this trigger is not set during the scanning of a character, an output will be supplied from the left side thereof through cathode follower 674 indicating $\overline{VLR}$.

Switch 671, in addition to receiving the indication of a predetermined count from switch 668, also receives B3$r$. In the event of a coincidence, trigger 676 is set. If this trigger is set during a character, an output is supplied from the right side thereof through cathode follower 677 indicating that a vertical line has been recognized following three crossovers, i.e., VLL. In the event this trigger is not set during the scanning of a character, an output is supplied from the left side thereof through cathode follower 678 indicating $\overline{VLL}$.

Another condition which it is desirable to determine is a long included white signature component, i.e. LIW. The W$r$ count during W1$r$ for a long included white in the present instance has been selected to be nine. Therefore, a four-position diode switch 679, Fig. 2T, is provided. This switch may be connected to receive the 1, 2 and 8 positions of the counter, Fig. 2R, along with W1$r$. For a count of nine, however, only the 8 output from cathode follower 660, Fig. 2R, and the 1 output from cathode follower 657 are used by switch 679. If W1$r$ exists until a count of nine exists in the counter, an output is supplied to a trigger 680 which produces a one-hundred and forty microsecond output pulse to a switch 681. If during this time, B2$r$ occurs, an output is supplied to set trigger 682. The reason for using B2$r$ is that this assures that the W$r$ pulses being counted are in an included white area. If trigger 682 is set, the output from the right side will be relatively positive and, when supplied through cathode follower 683, will indicate a long included white area, i.e., LIW. If on the other hand, trigger 682 is not set, an output will be supplied from the left side thereof through cathode follower 684 indicating $\overline{LIW}$.

The reset for each of triggers 672 and 676 in Fig. 2R, and 682 in Fig. 2T, is supplied from the End of Character Reset through an inverter 685 to the left side of each of the triggers.

Another signature component detected in this invention is a short positive slope such as may be found in the digit "2." The circuit for detecting this component comprises a three-position diode switch 686, Fig. 2T, which is adapted to receive B2$r$, W1$s$ and B1$s$, the latter input being supplied to a switch 687 which supplies a one-hundred and seventy-five microsecond output pulse to the switch. If there is a coincidence of these three inputs, an output is supplied to a trigger 688 which supplies an eleven microsecond output pulse through a capacitor 689 to a diode unit 690, there being the usual capacitor 691 between the plates of the diode unit. The output of the diode unit is supplied to one side of a capacitor 692 and to an inverter 693. The output from this inverter is supplied to an inverter 694. As in the other circuits such as the overhang count circuit, inverter 694 is normally biased to conduct by having its grid connected through potentiometer 695 to a negative source of potential, herein illustrated as —250 v. D.C. If during the scanning of a character a sufficient potential has developed on capacitor 692 due to outputs from trigger 688 on a predetermined number of scans, inverter 693 will amplify the capacitor potential and turn off inverter 694. When this occurs, a positive going output is supplied through cathode follower 696 to set a trigger 697. If trigger 697 is set during the scanning of a character, an output is supplied from the right side thereof through cathode follower 698 indicating a short positive slope, i.e. PS2. If this trigger is not set during the scanning of a character, the left side thereof will be relatively positive and will supply an output through the cathode follower 699 indicating $\overline{PS2}$.

Up to this point, there has been described all of the circuitry necessary for obtaining the signature components capable of recognizing the digits 0 through 9. As illustrated in Figs. 2R, 2S, and 2T, these signature components exist on lines labeled with the signature components $\overline{RO}$, RO, $\overline{VLR}$, $\overline{VLL}$, VLR, VLL, WB/CL, WA1/L, WA1/CL, WA1/OR+WB/OR, WA1/OR, WA2/CL, WA2/OL, WA1/OL, WB/OL, WA1/U·$\overline{WA2/E}$, $\overline{B3}$, WA1/CR, $\overline{WA2/E}$, WA2/E, WB/CR, LIW, WB/OR, $\overline{PSL}$, PSL, $\overline{LO}$, LO, $\overline{LIW}$, PS2, and $\overline{PS2}$. One additional input which is utilized herein is identified by the line X7–8 which is supplied from cathode follower 516, Fig. 2S. It will be remembered that this cathode follower will supply a relatively positive voltage indicating that WB is closed left providing WB exists.

It is now necessary to combine all of these various signature components or certain ones thereof in various switches to produce output signals indicative of one or the other of digits 0 through 9. Referring to Figs. 2a, 2b and 2c, there is illustrated a number of diode switches, each of which is adapted to receive a plurality of these signature components. Sample plug wiring is shown in dotted lines between the signature component output lines and these diode switches. It will be understood that all hubs labeled with a particular signature component in Figs. 2R, 2S and 2T are adapted to be connected to similarly labeled hubs in Figs. 2a, 2b and 2c. To recognize and produce an output signal indicating a "1," diode switches 701a and 701b, Fig. 2c, are provided. The units position of the reference numeral indicates the digit identified and the letters a and b indicate that these switches are alternate paths for identifying the "1." For example, 701a is adapted to receive WA1/OL, WA1/CR, $\overline{LO}$ and RO. If these conditions occur in coincidence, an output will be supplied from switch 701a. Switch 701b is adapted to be connected to receive WA2/OL, $\overline{PS2}$, X7–8 and RO. In the event of a coincidence of these conditions, an output will be supplied from switch 701b.

There are three alternate conditions in identifying the character "2" and to identify this character there is provided three diode switches 702a, 702b, and 702c. The digit "3" has two alternate identifications which may be obtained from switches 703a and 703b. A single switch 704 is utilized to identify the digit "4." The digit "5" is identified in one of two switches 705a or 705b. The digits "6" and "7" are identified in switches 706 and 707, respectively, the digit "8" in one of the two switches 708a or 708b, and the digits "9" and "0" are identified in switches 709 and 710, respectively.

The output from each of these switches is supplied through an associated cathode follower. That is, switches 701a and 701b have their outputs connected through cathode followers 711a and 711b. Switches 702a, 702b and 702c have their outputs connected to be supplied through cathode followers 712a, 712b and 712c. The outputs from switches 703a and 703b are supplied through cathode followers 713a and 713b. The output from switch 704 is supplied through cathode follower 714 while the outputs from switches 705a and 705b are supplied through cathode followers 715a and 715b. The outputs from switches 706, 707, 708a, 708b, 709 and 710 are supplied through cathode followers 716, 717, 718a, 718b, 719 and 720, respectively.

The alternate outputs for the various switches which identify the same digits are commoned, and with the remainder of the switches, supply outputs to a plurality of switches 721, 722, 723, 724, 725, 726, 727, 728, 729 and 730, the last digit in each of these numbers identifying the digit which is recognized if an input is supplied to that switch. These switches, shown in Fig. 2e, are each sampled by the End of Character Sample pulse and supply outputs to cathode followers 731, 732, 733, 734, 735, 736, 737, 738, 739 and 740, respectively.

One special character is illustrated as being identifiable in the present machine. Inputs necessary to identify the special character are adapted to be supplied to a switch 41, Fig. 2b, whose ouput is connected through cathode follower 742 to a switch 743, Fig. 2e, the last-named switch also being sampled by the End of Character Sample and supplying an output to cathode follower 744.

The indication of the identity of a character is now available on a single line. For storing on the magnetic drum, it is desirable to encode the signals into a code more suitable for storage. Thus, the outputs from cathode followers 731 through 740 and cathode follower 744 are supplied to three out of a possible six Or circuits labeled 745, 746, 747, 748, 749 and 750, Figs. 2d and 2f. For example, the output from switch 721 is supplied to each of OR circuits 746, 748, and 749. Therefore, when the character "1" is identified, outputs are supplied from each of these OR circuits. The outputs from OR circuits 745 through 750 are supplied through inverters 751 through 756, respectively, to six output lines.

Before discussing the storage of the various character identifications on the drum, additional circuitry will be described in regard to determining when the scanning of a character commences, when character scanning ends, and when a field mark is recognized.

A four-position diode OR circuit, illustrated herein by reference numeral 594, Fig. 2J, is adapted to receive a plurality of inputs which in the present instance are PSL, WA1/CR, and Field Mark Scan. The last-mentioned input may be obtained from cathode follower 619, Fig. 2H. Another input is the combination of B2s and B2r seen in a two-position diode switch 592 which is used to set trigger 593 to produce a two microsecond signal at OR circuit 594. If any one of these inputs to OR circuit 594 are present, an output is supplied therefrom through an inverter 595 to turn a trigger 596 On, Fig. 2G. This trigger may be referred to as the "in character" trigger. That is, if this trigger is set during a scan, it is known that the scanning device is scanning a character. Trigger 596 is adapted to be reset in a manner now to be described.

During the first All White Scan after the "in character" trigger has been set, an output will be supplied from the left side of the trigger 406, Fig. 2H, through cathode follower 597 to a two-position diode switch 598. This switch also receives the End of Scan Sample, and the coincidence of these two inputs results in an output from cathode follower 599 which represents All White Scan. This output is supplied through inverter 600 to the left side of trigger 596, Fig. 2G. Therefore, if trigger 596 has been set, indicating that the scanning apparatus is scanning a character, it will be reset by this input to the left side of the trigger. When the trigger is reset, an output will be supplied from the left side thereof through cathode follower 601 to a trigger 602. Trigger 602 is adapted to provide a thirty microsecond output pulse through an inverter 603 and a cathode follower 604 to set a trigger 605. The trigger 605 is arranged to supply a thirty microsecond output pulse which is utilized in the end of character reset circuitry, Fig. 47, to generate End of Character Reset.

Referring now to a switch 606, Fig. 2E, there will now be described the details of the circuit for obtaining the End of Character Sample, which, it will be remembered, is used to sample each of the switches 721 through 730 and switch 743, Fig. 2e. The primary control over switch 606 is exercised by a trigger 607, Fig. 2E, which was referred to as the recognition gate trigger. This trigger is adapted to receive inputs from one of three alternate paths from Field Start plug hubs A, B and C. The input to these plug hubs will not be described at the present time but it should be understood that these plug hubs are used in the field mark circuitry. Hubs A, B and C are connected through cathode followers 609, 610 and 611, respectively. The cathodes of these cathode followers are commoned and connected to a trigger 612 which supplies an eleven microsecond output pulse to trigger 607 in response to an input thereto. The trailing edge of this eleven microsecond pulse is adapted to turn trigger 607 On. Once the trigger is set, the way is now clear to recognize the character. The output of trigger 607 is supplied through cathode follower 608 to serve as one of the inputs to switch 606.

Another input to switch 606 comes from trigger 602 which it will be remembered is the thirty microsecond pulse representing the end of a character. The remaining input to switch 606 comes from the cathode follower 614, Fig. 2G, which receives its input from the left side of a trigger 613. The trigger 613 can best be described as the All White Scan to B5s trigger. That is, if an All White Scan occurs and thereafter within a certain predetermined number of scans B5s occurs, this trigger will be turned On. If the left side of this trigger is relatively positive, i.e., the trigger is not On, an output will be supplied to switch 606, Fig. 2E. The output of this switch is fed to each of cathode followers 615 and 616. These cathode followers have their cathodes commoned and the output therefrom is used as the End of Character Sample.

FIELD MARK DETECTION

Since it is necessary to identify field marks in the present invention, it is necessary also to determine whether a character has merged into a field mark from the right or from the left of the field mark. In determining these instances, as well as the occurrence of a field mark, the output from the B5s trigger 419, Fig. 2H, is supplied through a cathode follower 617 to a two-position diode switch 618. Therefore, when five crossovers are seen during a scan an output will be supplied at the End of Scan time to cathode follower 619 representing B5s. The output from cathode follower 619 is supplied to a two-position diode switch 620 and a three-position diode switch 621, Fig. 2G.

The circuit now looks for an All White Scan. It will be remembered that trigger 406, Fig. 2H, will not be turned On during a scan if a crossover has not been seen. The output from the left side thereof is supplied through cathode follower 597 to a switch 622 which also receives the End of Scan Sample. When there is a coincidence of inputs at switch 622, an output is supplied therefrom through cathode follower 623 to a diode unit 624, Fig. 2G. The output of this diode unit is supplied to one side of a capacitor 625 whose other side is connected to —22 v. D.C. A voltage divider, comprising resistors 626 and 627, has its midpoint connected to receive the output of diode unit 624 and its one end connected to —22 v. D.C. The other end of the divider is connected to supply an input to inverter 628 whose output is again inverted in inverter 629 and supplied through a cathode follower 630 to serve as the other input to the two-position diode switch 620.

It should be understood that inverter 628 is normally at or near cut off due to the —22 v. D.C. grid bias. However, as soon as a sufficient charge builds up across capacitor 625 to turn inverter 628 on, the output therefrom will drop. This drop is inverted in inverter 629 and becomes a relatively positive voltage which is supplied through cathode follower 630 to switch 620. When this condition occurs in coincidence with B5s, an output is supplied from switch 620 through an inverter 631 to set trigger 613, thus indicating that there has been a proper transition from an All White Scan into B5s. A proper transition from All White to B5s occurs when at least one all white scan occurs, followed within at least three scans by B5s. If capacitor 625 receives one input indicating an all white scan, it will stay charged sufficiently for three scans to keep inverter 628 in conduction. Thus, for three scans following an all white scan, switch 620 will be held up to await B5s from cathode follower 619, Fig. 2H. If B5s occurs within the prescribed time, switch 620 supplies an output through inverter 631 to set trigger 613. If trigger 613 is turned On, the output from the right side thereof indicates that the field mark is not crowded to the right by a character.

Once trigger 613 is set, the right side thereof supplies an output signal through an inverter 632 to a two-position diode switch 633, the other input to this switch being the B5s input from switch 618, Fig. 2H. When these two conditions occur in coincidence an output is supplied through cathode follower 634 to another counting circuit. Here it is desired to know for sure that a field mark has been recognized and that it is not crowded left.

The output from cathode follower 634 is received by diode unit 635 whose output is connected to one side of a capacitor 636, the other side of said capacitor being connected to the afore-mentioned —22 v. D.C. The voltage divider, comprising resistors 637 and 638, is connected between this —22 v. D.C. potential and the grid of an inverter 639. The midpoint between resistors 638 and 637 is connected to the input side of capacitor 636. Since inverter 639 is normally at or near cutoff by the —22 v. D.C. potential, it will begin conduction as soon as the charge across capacitor 636 is sufficiently high. This occurs in the present circuit by the occurrence of one input into this circuit. When this occurs, inverter 639 begins conducting and supplies an output through inverter 640 and cathode follower 641 to the switch 642. The other input to switch 642 is the output of trigger 602. It will be remembered that this trigger is relatively positive for thirty microseconds after trigger 596, the "in character" trigger, is turned Off by an All White Scan signal. Capacitor 636 will remain sufficiently charged for three scans after the last B5s input thereto to keep the input to switch 642 from cathode follower 641 up. Therefore, if an all white scan occurs before the end of these three scans, an output will be supplied from switch 642 through an inverter 643 to the Field Mark Ring shown in Fig. 2D to indicate the recognition of a field mark. The output of inverter 643 is also supplied to the recognition gate trigger 607, Fig. 2E, turning it Off.

STORAGE

It will be remembered that the character data to be stored on the drum is in a three-out-of-six code. The makeup of each character at any one time is determined by the outputs from OR circuits 745 through 750, Figs. 2d and 2f. The outputs from OR circuits 745 through 750 are connected respectively through inverters 751 through 756 to stages 757 through 762, respectively, of a six-position shift register, Fig. 2j. This shift register is of the type described in application Serial No. 469,895 which was filed November 19, 1954, for G. L. Clapper. It should be understood, however, that this shift register is illustrative only. Other shift registers of a conventional nature could be used. The shift register as shown is set up to receive the input data in parallel.

The surface of the scanning disc 122 is provided with a magnetizable surface 126, as previously described, to form a drum storage device. In order to reduce the access time in entering the drum, one track thereof is divided up into four quadrants as illustrated in Fig. 39. Each quadrant is further divided up into sixteen storage positions labeled 1 through 16.

Referring now to Fig. 40, there is shown a layout of one of the sixteen positions in each of the quadrants shown in Fig. 39. Each position is divided up to form three sections labeled Bank I, Bank II and Bank III. Each bank is divided up into six bit positions. Thus, it is seen that a single character in a three-out-of-six code may be written in each bank.

The reason for having the three banks will be obvious when it is remembered that a card which is scanned during one machine cycle is positioned during the next cycle and punched on the third cycle. Thus, data concerning the first card is written in Bank I during the last portion of the first machine cycle and the first portion of the second cycle. Data concerning the second card is written in Bank II during the last portion of the second machine cycle and the first portion of the third cycle. Data concerning the third card is written in Bank III during the last portion of the third cycle and the first portion of the fourth cycle. This process continues for the remaining cards. The arrangement is such that on the third machine cycle, Bank I is read while on the fourth and fifth cycles Banks II and III, respectively, are read. Once a bank has been read, it must be erased in time to receive new information on the latter portion of the next machine cycle.

The above sequence of events may be better understood by reference to the diagram in Fig. 41. For example, a first card leaves the hopper and enters the scan station during cycle 1. The card is scanned and Bank I is written in. The card leaves the scan station and arrives at the punch entrance gate during cycle 2. It then begins entering the punch. During cycle 3, Bank I is read to supply data to the punch. The card continues on through the punch brush station (not shown) and arrives at the stacker (not shown) during cycle 5. It will be appreciated that the second card is delayed one cycle from the first card and the third card is delayed one cycle from the second card.

Figure 42:
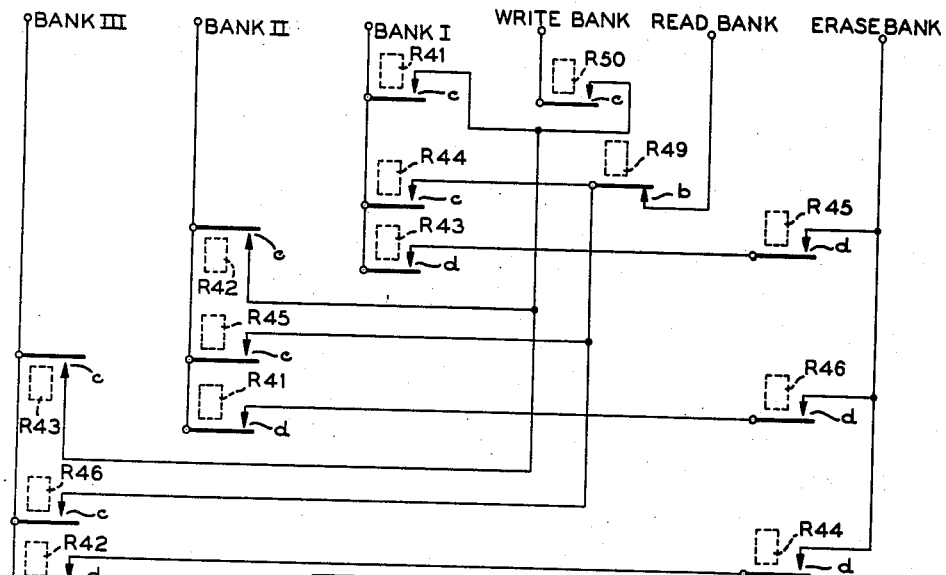
Fig. 42 shows a relay switching circuit which converts the Bank I, Bank II, and Bank III signals into Write Bank, Read Bank and Erase Bank signals.

With the above arrangement, it becomes necessary to produce various synchronizing and gating signals. Referring now to Figs. 42 and 50, relay circuits are shown which, when combined with the cam timings shown in Fig. 51, illustrate the manner for obtaining the write, read and erase signals for use in conjunction with the drum circuitry.

As shown in Fig. 40, the time duration of each bank is 87 microseconds. This is based upon the drum rotating at approximately 3600 r.p.m. Referring now to Fig. 42, input terminals labeled Bank I, Bank II and Bank III are illustrated. Banks I, II and III terminals are successively raised in potential for 87 microseconds each. The manner of generating these inputs will be explained later in the description. The object of the switching circuit associated with these inputs is to supply outputs to the terminals labeled Write Bank, Read Bank and Erase Bank. The control over these switches is exercised by the relays and cams shown in Fig. 50, the cams being operated in accordance with the timing chart shown in Fig. 51.

As shown in Figs. 50 and 51, cam P20 makes at "3" time, and picks R41(P) through contacts R46b(N/C) and R44e. This action causes contacts R41a, R41b, R41c and R41d to transfer. At "3.5" time, cam P21 makes and R41(H) holds through contact R41a until "1.6" time of the next machine cycle. Since contact R41c in Fig. 42 is transferred, an output will be furnished to the Write Bank terminal providing Bank I is relatively positive and the scan relay R50 is energized so as to transfer contact R50c. The energizing of R50 was discussed previously and need not be further discussed here.

At "14" time of the second machine cycle, cam P22 makes and energizes R46(P) through the transferred contact R41b, thus transferring contacts R46a, R46b, R46c and R46d. At "14.5" time cam P23 makes and R46(H) is energized through contact R46a. The contacts associated with this relay stay transferred until "9.6" time. As shown in Fig. 42, when contact 46d transfers, Bank II input is connected through contacts R41d and R46d to the output terminal labeled Erase Bank. This connection exists until "1.6" time when R41(H) drops out.

At the time contact R46c transferred the Bank III input became connected to the output terminal labeled Read Bank through the normally closed contact R49b. This connection continues to "9.6" time when R46(H) drops out.

During the second machine cycle, cam P20 again makes at "3" time. This time, R42(P) picks through contact R46b(N/O) and transfers contacts R42a, R42b, R42c and R42d. At "3.5" time, cam P21 makes and R42(H) holds through contact R42a. As shown in Fig. 42, when contact R42c transfers, the Bank II input is connected to the output terminal labeled Write Bank providing contact R50c is closed as it normally would be during scan time.

On the third machine cycle, cam P22 makes at "14" time. This time R44(P) picks and transfers contacts R44a, R44b, R44c and R44d. At "14.5" time, cam P23 makes and holds R44(H) through contact R44a until "9.6" time. As soon as contact R44d transfers, the Bank III input, Fig. 42, becomes connected with the output terminal labeled Erase Bank through contacts R42d and R44d. When contact R44c transfers, the Bank I input is connected therethrough to the output terminal labeled Read Bank.

At "3" time of the third machine cycle, cam P20 makes and energizes R43(P) through contact R44b, thus causing contacts R43a, R43b, R43c and R43d to transfer. At "3.5" time, cam P21 makes and holds R43(H) through contact 43a. As soon as contact R43c transfers, the Bank III input, Fig. 42 is connected to the output terminal labeled Write Bank if contact R50c is transferred.

On the fourth machine cycle, cam P22 makes at "14" time and picks R45(P) through contact R43b, thus causing contacts R45a, R45b, R45c and R45d to transfer. At "14.5" time cam P23 makes and holds R45(H) through contact R45a. As soon as contact R45d transfers, the Bank I input, Fig. 42, becomes connected through contacts R43d and R45d with the output terminal labeled Erase Bank. In addition, the transfer of contact R45c connects the Bank II input to the output terminal labeled Read Bank.

At time "3" of the fourth machine cycle P20 makes and picks R41(P) through contacts R46b and R44e. will be apparent that the relay circuit is back to the starting point and the operation just described is repeated.

To review the foregoing, during the first machine cycle a Write Bank signal was furnished for Bank I. During the second machine cycle, an Erase Bank signal was furnished to Bank II, and thereafter a Read Bank signal was furnished to Bank III and a Write Bank signal was supplied to Bank II. During the third machine cycle, signals were furnished to first erase Bank III and thereafter read Bank I and write in Bank III. During the fourth machine cycle, signals were furnished to first erase Bank I and thereafter read Bank II and write in Bank I. The fifth machine cycle would be identical with the second cycle etc.

Referring to Fig. 2j, it will be remembered that the coded identification of a character is entered in parallel in the shift register comprising stages 757 through 76 Therefore, the character which has been scanned and recognized now exists in storage. In order to determine when to read this information from the shift register and place it on the drum, it is necessary to know at a times the rotational position of the drum relative to the write head on the drum. To accomplish this position detection, the Bit Sync pulses are supplied through a inverter 763, Fig. 2i, to a two-position closed ring counter comprising stages 764 and 765 which produces one pulse for every two Bit Sync pulses. The operation is such that stage 764 is turned On at the beginning of each quadrant time in a manner later to be described. The first Bit Sync pulse turns stage 764 Off which, in going Off, turns stage 765 On. The second Bit Sync pulse turns stage 765 Off which, in going Off, turns stage 764 On.

When stage 765 gos Off, it also supplies an input pulse to a three-position closed ring counter comprising stages 766, 767 and 768. This counter can count up to three of the pulses supplied from the first two-position ring Therefore, by this time the output from the right side of stage 768 amounts to a count down by an order six. That is, there will be one output from stage 7( for every six Bit Sync pulses to inverter 763. The output of stage 768 is supplied to another three-position closed ring counter comprising stages 769, 770 and 77 This ring may be termed the Bank ring and the output from stages 769 through 771 are supplied through t power amplifier units 772 through 774, respectively, serve as the Bank I, Bank II and Bank III inputs to t Fig. 42 circuit previously described.

The output from stage 771 is now connected to ser as the input to a four-position binary counter, Fig. 2 which is of conventional design and is comprised stages 775, 776, 777 and 778. The arrangement in t counter is such that it can count up to sixteen. It w be seen that if this counter receives its first count the beginning of quadrant time, it will be back to ze at the beginning of the next quadrant time. Therefo this provides the sixteen position indications for ea quadrant.

All of the counters and rings which have been c scribed up to this point in regard to the position det tion circuit for the drum are reset at the end of ea quadrant. The manner of accomplishing this is by v of a Quadrant Sync on the drum. This Quadrant Sy can be found in a track 779, Fig. 2i, which is picked by the read head 780 and supplied through amplifi 781 and 782 and cathode follower 783 to a trigger 7

This trigger produces a five microsecond positive output pulse to each of inverters 785, 786 and 787. The output from inverter 785 is used to drive diode units 788, 789, 790 and 791 which reset stages 775, 776, 777 and 778, respectively, of the four-position binary counter. Inverter 786 is used to drive diode units 792, 793, 794 and 795 which are respectively used to reset stages 764, 767, 770 and 771. The output from inverter 787 is supplied to double diode units 796 and 797. Unit 796 resets stages 765 and 766 while unit 797 resets stages 768 and 769.

It will now be seen that the position of the drum can always be determined from a particular condition of the two-position ring, the two three-position rings and the four-position binary counter. As previously described, at End of Character Sample time an input is supplied to the shift register, Fig. 2j, comprising stages 757 through 762. At the same time, an End of Character Sample signal is supplied through an inverter 798, Fig. 2h, to turn trigger 799 On. Therefore, if the trigger is On, it indicates that a character has been recognized. The right side of the trigger supplies a relatively positive output through a cathode follower 800 to a switch 801. This switch is also adapted to receive the output from stage 767, Fig. 2i, of the first three-position ring, the output therefrom being supplied through cathode follower 802. Another input to switch 801, Fig. 2h, is the Write Bank input which is supplied from the circuit in Fig. 42 through inverter 803 and cathode follower 804 to the switch. The Write Bank signal is a positive signal but it is the negative going trailing edge thereof which is used to raise the portion of the switch to which it is supplied to allow the switching action to take place.

The output from switch 801 is supplied through cathode follower 805 to an inverter 806 whose plate is tied to another inverter 807. The common plates of inverters 806 and 807 are connected to serve as an OR circuit and to provide an input to an inverter 808 whose output is used to turn a trigger 809 On. The output from trigger 809 when it is On raises one of the inputs to a switch 829 in Fig. 2j, via cathode follower 830.

Referring to Fig. 2k, there is illustrated a four-position binary counter comprising stages 810, 811, 812 and 813. This counter is used to remember the number of characters which have been written on the drum. Since the characters are entered into their position on the drum in one of the four quadrants, in accordance with the order in which they are found on the card, it is desirable to compare the condition of this four position counter with the condition of the previously described storage position counter. Therefore, the outputs from the right side of stages 810, 811, 812 and 813 are supplied respectively through cathode followers 814, 815, 816 and 817 to serve as inputs to comparing units 818, 819, 820 and 821, respectively. The outputs of stages 775, 776, 777 and 778 of the drum position counter are supplied through cathode followers 822, 823, 824 and 825, respectively, to comparing units 818, 819, 820 and 821, respectively. When each of the comparing units 818 through 821 receive inputs which agree, an output is supplied from their commoned output connections through a cathode follower 826 to serve as one input to a two-position diode switch 827, Fig. 2j. This input indicates that the number of characters written on the drum agrees with the drum position. The other input to said switch 827 is the Write Bank input. The output from switch 827 is supplied through cathode follower 828 to serve as one input to a three-position diode switch 829. Another input to this switch is supplied by the Storage Write Sync and the remaining input is supplied from the previously described trigger 809, Fig. 2h, through cathode follower 830.

When the three inputs to switch 829 are in coincidence, an output is supplied through a double inverter unit 831 to a trigger 832. The output from this trigger is supplied through an inverter 833 to an inverter 834 and a cathode follower 835. Inverter 834 is adapted to supply a negative sync to each of the shift register units 857 through 862 and the cathode follower 835 is adapted to supply a positive sync to each of said units. The negative sync is a pulse which starts at +20 v. D.C., drops to zero and then goes back to +20 v. D.C. The positive sync starts at −20 v. D.C., goes to zero and then back to −20 volts. The frequency of these sync pulses is that of the Storage Write Sync, and the duration of each pulse is determined by trigger 832. Therefore, as soon as this sync is initiated, the information in the shift register is stepped out serially from the left side of stage 762 through an inverter 837 to a cathode follower 838 whose output serves as an input to a two-position diode switch 839. The other input to this switch is from double inverter 831 whose output is supplied through cathode follower 840 to the switch. The output of this switch, which is the character information in coded form, is supplied through a cathode follower 841, write amplifiers 842 and 843, and a resistor 844 to a write head 845, Fig. 2n. The write head 845 is positioned adjacent the recording surface 846.

It will be seen that the read head 845 is center tapped to ground. The reason for this is to allow the input just described to be written on the drum, but to allow another input to the other side of the winding at a different time to erase data on the drum. This erase signal is obtained by using a two-position diode switch 847 which is adapted to receive the Erase Bank signals and the Storage Write Sync. The output from this switch passes through a cathode follower 848 and amplifiers 849 and 850 to supply an erase signal across a diode 852 and through a resistor 851 to the winding 845. It will be seen that erasing only occurs at times when there is a coincidence between the Erase Bank signal and the Storage Write Sync signal. This provides a dynamic erase.

It will be remembered that the output from switch 827, Fig. 2j, indicated that the number of characters written on the drum was in agreement with the drum position at Write Bank time. The output of this switch was described as being fed through a cathode follower 828 to a switch 829. The output of this cathode follower is also supplied through a resistor 853 and across a capacitor to a double inverter unit 855, Fig. 2h. The resistor 853 and capacitor 854 form an integrating circuit which is adapted to supply a sufficient potential through the double inverter unit 855 to reset trigger 809, Fig. 2h. When trigger 809 is reset, it supplies an input to stage 810 of the character counter which adds a count of one into the counter. At the same time, trigger 809 turns trigger 799 Off. This allows the next End of Character signal to turn trigger 799 On to commence a new drum writing cycle.

Another reset which is furnished is that for the four-position character counter previously described. This reset is necessary after a complete card has been scanned. The reset is obtained from the End of Card Reset signal, Fig. 2k, which is supplied to inverters 856 and 857. The output of inverter 856 is used to drive diode units 858 and 859, which in turn reset stages 810 and 811, respectively, of the counter. The output of inverter 857 is used to drive diode units 860 and 861 whose outputs reset stages 812 and 813 of the counter. The End of Card Reset is also used to reset the shift register stages 757 through 762 by way of inverters 946 through 951, respectively, Fig. 2j. This prepares the shift register for data from the next card.

Now that the information has been placed on the drum it is desirable to read it off, store it briefly, and then supply a signal at the proper time to the punch for punching the character recognized into the card. The information is picked up at a read head 862, Fig. 2n, which is positioned adjacent the recording surface 846. The output from read head 862 is supplied through amplifiers 863 and 864 and a cathode follower 952 to serve as one input to a three-position diode switch 865. The other inputs to this switch are the Storage Write Sync and the Read Bank signal. When these inputs occur in coincidence, the data for one character is supplied through a cathode follower 866 and an inverter 867 to the first stage of a shift register which is comprised of stages 868, 869, 870, 871, 872 and 873. The positive and negative syncs for this shift register are supplied continuously by obtaining the Read Sync input, Fig. 2n, and supplying it through inverters 874 and 875 to an inverter 876 and a cathode follower 877, Fig. 2p. The outputs from these units are used as the negative and positive syncs, respectively, for the shift register. Therefore, it will be seen that under the circumstances just described a character will be brought into the shift register, stepped out and then another character will be brought into the shift register and stepped out. As to whether the character in the shift register is the one which it is desired to punch at a particular time, it is necessary to know what character the punch is ready to place into the card. This is detected by a plurality of code cams which are provided in the punch which indicate the character ready to be punched.

Figure 43:
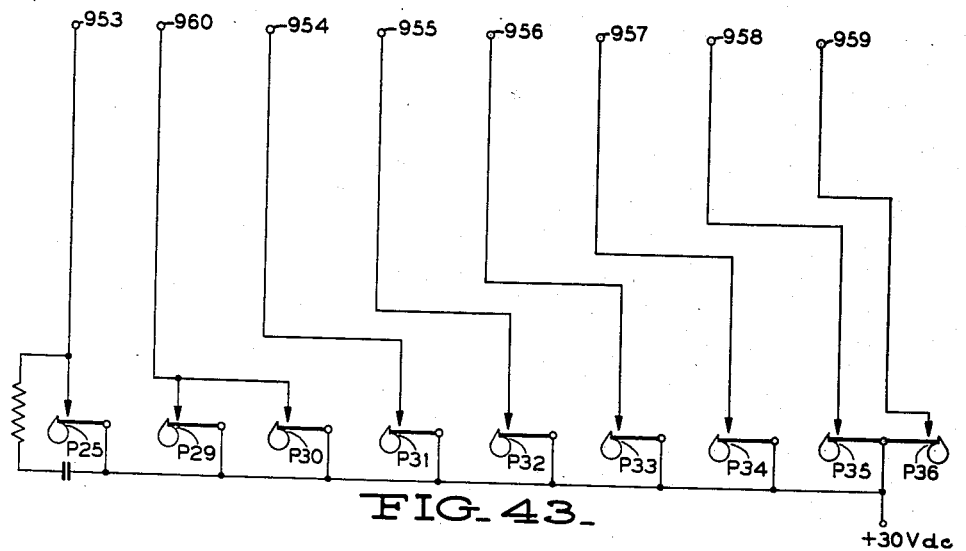
Fig. 43 shows a plurality of cam signal switches operated by the punch mechanism generating a number of signals to be used in the punching operation.

Referring now to Fig. 43, there is shown a plurality of cams which make and break in accordance with the timing shown in Fig. 51. For example, cam P25 makes at "6" time and breaks at "7" time thereby supplying a reset signal which is the End of Card Reset signal. This End of Card Reset is supplied to a terminal which is identified by reference numeral 953 and is the same signal previously described as being supplied to inverters 856 and 857, Fig. 2k, for resetting the four-position character counter. A plurality of code cams P31, P32, P33, P34 and P36 all make and break at times which are illustrated in Fig. 51. The arrangement is such that outputs will occur at terminals 954, 955, 956, 957, 958 and 959 in a three-out-of-six code for a particular digit which the punch is ready to place in the card. For example, at "zero" character time in the punch, the output at these afore-mentioned terminals will represent a zero in the three-out-of-six code. At "one" character time, the outputs will represent the numeral one in a three-out-of-six code. These outputs at terminals 954 through 959 are supplied to similar terminals in Fig. 2q. It will be seen that the outputs at terminals 954 through 959 in Fig. 2q are supplied through cathode followers 890 through 895, respectively, to serve as inputs to comparing units 884 through 889, respectively.

Comparing units 884 through 889, also receive inputs from stages 868 through 873, respectively, through cathode followers 878 through 883, respectively. In order that the inputs from terminals 954 through 959 which are supplied to the comparing units 884 through 889, respectively, will occur at the proper time, their entry into these comparing units is controlled by a gate signal which is supplied to a terminal 960 from cams P29 and P30, Fig. 43, which make and break in accordance with the timing shown in Fig. 51. As shown in Fig. 2q, the gate signal at terminal 960 is supplied to the upper side of a resistor 961 whose other side is connected to the upper side of a resistor 962. The lower side of the latter resistor is connected to —70 v. D.C. Terminals 954 through 959 are connected through resistors 963 through 968, respectively, to a point intermediate resistors 961 and 962. In addition, this common connection is also connected through a resistor 969 to ground. At a time when the proper voltage is supplied to the gate terminal 960 by cams P29 and P30, the inputs which exist on terminals 954 through 959 are allowed to be connected through the cathode follower units associated therewith to the comparing units 884 through 889, respectively. This arrangement assures that the proper timing is applied to the cam produced digits.

Referring to Fig. 44, there is shown a standard size record card. The card is divided into approximately two halves, there being one half reserved for punching and the other half arranged to have the data to be scanned printed therein. Columns 1–38 each contain index points 12, 11 and 0 through 9. Index points 12 and 11 may be used for special characters while index points 0 through 9 are used for the characters being scanned. The scan area of the card contains eight rows into which printed data may be placed. In the machine, only one row would be scanned at a time.

The record card is fed to the punch twelve row first. When the zero row is under the punches, any zeros in storage are punched in selected columns. For example, let it be assumed that the first sixteen columns are to be used for punching the data found in positions one through sixteen of the drum. A separate thyratron is associated with the punch magnet for each column. As the drum rotates so that positions one through sixteen in each quadrant pass the read head, the thyratrons for columns sixteen through one are successively conditioned. That is, when position one of the drum is passing the read head, the thyratron associated with column sixteen is conditioned. When position two of the drum is passing the read head, the thyratron associated with column fifteen is conditioned, etc. It will be seen that the information punched in the card will bear the same left to right order as that printed on the card. If a zero is found in position one in any of the four quadrants while the thyratron associated with column sixteen is conditioned, the thyratron is fired so as to energize the punch magnet for column sixteen. If a zero is found in position two in any of the four quadrants while the thyratron associated with column fifteen is conditioned, the thyratron is fired so as to energize the punch magnet for column two and etc. The card is positioned for punching zeros for approximately one and one-half revolutions of the drum. At the end of this time, the punch bail moves down and causes the punches whose magnets have been energized to perforate the card. Thereafter, the card moves until row one is under the punches. The same action described above with reference to the zero row ensues. This time, the ones in positions one through sixteen are looked for. It will be obvious that as the card is moved successively through the punch, the data in positions one through sixteen of the drum will be placed in columns sixteen through one, respectively of the card. It should be understood that the selection of columns one through sixteen for punching is purely arbitrary. Actually any sixteen of the first thirty-eight columns could be used. In fact, if it is desired to punch in the remaining columns, it could be carried out merely by wiring the thyratrons to the punch magnets for the selected columns.

The detailed manner of accomplishing the action described above will now be explained. The coincidence gate signal at terminal 960, Fig. 2q, is supplied through a cathode follower 896 to serve as one input to a three-position diode switch 897. Another input to switch 897 is the common output from comparing units 884 through 889, this output being supplied through a cathode follower unit 898. It will be understood that these comparing units will supply an output only at a time when each indicates that it is receiving two inputs which are equal, i.e., at a time when the inputs on terminals 954 through 959 are equal to the outputs of the shift register comprising stages 868 through 873. The other input to switch 897 is the Read Bank signal, previously described in Fig. 42, which is supplied through an inverter 899 and a cathode follower 900 to a trigger 901, Fig. 2n. This trigger produces an output pulse which is of five microseconds duration and supplies it to the switch 897, Fig. 2P. When the three inputs to this switch occur in coincidence, an output is supplied through an inverter 902 to set a trigger 903. At this time, a relatively positive output is supplied from the right side of the trigger 903 through a cathode follower 904 to a three-position diode switch 905.

The second input to switch 905 comes from the BANK I position trigger 769 in the second three-position ring, Fig. 21, which output is supplied through the unit 772. The third input comes from the trigger 767 in the first three-position ring, Fig. 21, which output is supplied through cathode follower 802 to the switch 905.

The output of switch 905 is supplied through an inverter 906 to set a trigger 907. When trigger 907 is turned On, a relatively positive output from the right side thereof is supplied through a cathode follower 908 and through an inverter 909 to reset trigger 903. At the same time, the output from cathode follower 908 is supplied to each of a plurality of three-position diode switches 910, 911, 912 and 913, Fig. 2m. The input to these switches indicates that a character in a position on the drum which has just been scanned is one which the punch is ready to receive.

The thyratron matrix comprises thyratrons 920 through 935. It will be remembered that a thyratron may be fired only if there are inputs to both grids thereof in coincidence. An input to one grid merely conditions the tube so that if another input is applied to the other grid the tube will fire.

Switches 910 through 913 are used to drive the horizontal lines of the thyratron matrix. The second input to switch 910 comes from stage 777 of the four position binary counter, Fig. 2k, which indicates the drum position. This output is supplied through cathode follower 914. This second input is the $\overline{4}$ input. The third input to switch 910 is the $\overline{8}$ input supplied from the left side of position 778, Fig. 2k, through a cathode follower 915.

The second input to switch 911 is the 4 input supplied from the right side of trigger 777 through cathode follower 824, and the third input is the $\overline{8}$ input received from cathode follower 915. The second input to switch 912 is the $\overline{4}$ input from cathode follower 914, and the third input is the 8 input from cathode follower 825. The second input to switch 913 is the 4 input received from cathode follower 824, and the third input is the 8 input received from cathode follower 825.

The outputs from switches 910 through 913, Fig. 2m, are supplied through cathode followers 916 through 919, respectively, to the horizontal drive lines of the thyratron matrix. Cathode follower 916 therefore supplies one input to each of thyratrons 920 through 923. Cathode follower 917 supplies an input to each of thyratrons 924 through 927. Cathode follower 918 supplies an input to each of thyratrons 928 through 931, and cathode follower 919 supplies an input to each of thyratrons 932 through 935. It should be appreciated that outputs will be supplied to the horizontal drive lines only if there is the indication that a character just scanned by the read head on the drum is one which the punch is ready to receive.

The vertical drive to these thyratron units will now be described. Four two-position diode switches, labeled 936, 937, 938 and 939, are utilized in the vertical drive circuitry. The inputs to switch 936 are the 1 input from cathode follower 822, Fig. 2k, and the 2 input from cathode follower 823. Therefore, when stages 775 and 776 of the four-position binary counter are On, switch 936 will supply an output. Switch 937 is adapted to receive the $\overline{1}$ input from cathode follower 940 and the 2 input from cathode follower 823. Therefore, when stage 775 is Off and stage 776 is On, an output will be supplied from switch 937. Switch 938 is connected to receive the 1 input from cathode follower 822 and the 2 input from cathode follower 941. Thus, when stage 775 is On and stage 776 is Off, an output is supplied from switch 938. Switch 939 is adapted to receive the $\overline{1}$ input from cathode follower 940 and the $\overline{2}$ input from the cathode follower 941.

The outputs from switches 936 through 939 are supplied through cathode followers 942 through 945 to the vertical drive lines for the thyratron matrix. That is, cathode follower 942 supplies an input to each of thyratrons 923, 927, 931 and 935, cathode follower 943 supplies an input to each of thyratrons 922, 926, 930 and 934, cathode follower 944 supplies an input to each of thyratrons 921, 925, 929 and 933, and cathode follower 945 supplies an input to each of thyratrons 920, 924, 928 and 932.

From the description just given, it will be seen that the horizontal and vertical drives to the thyratrons would attempt to raise thyratrons 920 through 935 in sequence. However, it must be remembered that one of the inputs to switches 910 through 913 is an indication that a character in the position on the drum which has just passed the read head is one which the punch is ready to receive. Therefore, a thyratron which may be conditioned to be raised will not be raised unless an input which this thyratron represents, in terms of character and column is provided.

To summarize the operation of the drum read-out and card punching operation, the card to be punched advances row by row under the punches. The punch knows what row is ready to be punched by means of the code cams illustrated in Fig. 43. These cams supply a three-out-of-six coded input for the character to be punched in a particular row to comparing units 884 through 889. Thus, when the card is positioned for punching zeros, the comparing units will receive from the code cams a three-out-of-six coding for the character zero. Now it is necessary to scan the drum and look for all zeros stored thereon. Each character stored on the drum in a particular bank in each position is entered into the shift register comprising stages 868 through 873, Fig. 2p, as the drum rotates. The characters enter the shift register in serial fashion. The character in the shift register at any one time is compared with the character supplied by the code cams in the comparing units, Fig. 2q.

Meanwhile, vertical rows of thyratrons in the thyratron matrix, Fig. 2m, are being successively conditioned by the drum position counter, 2k. When the comparing units indicate an identity between the character supplied by the code cams and the character in the shift register, an input is supplied to one of the horizontal drive lines and one of the thyratrons in the matrix fires and energizes the punch magnet associated therewith. Because the thyratrons are controlled by the drum position counter, a thyratron for one of columns 1 through 16 will be energized in accordance with which one of positions 1 through 16 on the drum the identified character is located. For example, if the character identified is in position 5 on the drum, the thyratron for column 5 of the punch will be fired.

It will be remembered that up to sixteen characters in a single row of data on the card may be sensed. However, in the embodiment illustrated, these characters must exist in not more than three fields of the row. There are instances, for example, where it is only desired to sense ten characters which may be in one, two or three fields. If all ten characters exist in one field, the machine is plugged to read only one field, i.e., the field containing the ten characters. Since the present embodiment is arranged to punch a total of sixteen characters the difference between ten and sixteen is punched as zeros. This may be referred to as zero insertion. The present invention accomplishes this insertion automatically as will be more apparent hereinafter.

FIELD SELECTION

There has already been described the manner in which a field mark is recognized. The output from switch 642, Fig. 2G, through inverter 643 indicated the recognition of a field mark. The occurrence of this output also signifies that the field mark recognized was not crowded on the right or the left by a character. This field mark detection signal was supplied to the recognition gate trigger 607, Fig. 2E, to reset this trigger to indicate that nothing more could be recognized until a new field start pulse is obtained from trigger 612. The field mark detection signal is also supplied to a field mark ring shown in Fig. 2D as being comprised of triggers 970, 971, 972, 973, 974, 975 and 976. This trigger ring, as connected, has the first trigger, i.e., trigger 970, reset On. The remaining stages are reset Off. When the first input is supplied to this ring, the trigger 970 goes Off, which, in going Off, turns trigger 971 On. The second pulse turns trigger 971 Off, which, in going Off, turns trigger 972 On, etc. Trigger 970 is referred to as the zero position. The output of triggers 970 through 976 are connected to cathode followers 977 through 983, respectively. The output of cathode follower 978 is connected to hub 1 which is the first of a group of hubs labeled Field End, Fig. 2E. Cathode followers 979, 980, 981 and 982 are connected to the Field End hubs marked 2, 3, 4 and 5, respectively. In addition, cathode followers 979 through 982 are connected to hubs 1, 2, 3, and 4 which are labeled Field.

Let it be assumed for the present that it is desired to read row 5 of the card shown in Fig. 44. It will be seen that this row contains five fields but that only fields F1, F3 and F4 contain information to be recognized by the character sensing system. The number 325 is shown in field F1, the number 56021 in field F3 and the number 9478 is shown in field F4. The total number of characters here is twelve. In the present invention, it does not matter within limits what horizontal position the characters of any field have relative to each other. It is only important that they be between the field marks, not crowded against the field marks, and that they be within the upper and lower limits of the field marks. Let it also be assumed that field F1 would normally be assigned four digits, field F3 eight digits and field F4 four digits. This means that the punch should be able to punch in columns 1 through 16, for example, the digits 9, 4, 7, 8, 0, 0, 0, 5, 6, 0, 2, 1, 0, 5, 2, 3. It should be understood, however, that the card is read from right to left. In the manner described, all of the zeros for a field would be punched to the left of the last digit in a field.

It is now necessary to make the proper pluggable connections between the Field End hubs, Fig. 2E, and the Field Start hubs. The Field Start hubs are labeled A, B and C. Therefore, for the example above, Field End hub 1 is plugged to the Field Start hub A, Field End hub 3 is plugged to the Field Start hub B and Field End hub 4 is plugged to the Field Start hub C.

When the first field mark detection pulse arrives at the field ring counter, Fig. 2D, trigger 970 is turned Off which turns trigger 971 On. When trigger 971 turns On, the right side thereof rises and through cathode follower 978 supplies an output signal through the Field End hub 1 and the Field Start hub A to cathode follower 611. The output from this cathode follower is used to initiate a positive pulse from trigger 612, the trailing edge of which causes the recognition gate trigger 607 to be turned On. It will be remembered that when the recognition gate is On, the recognition circuitry is allowed to recognize characters until the trigger is turned Off by the next field mark detection signal. Therefore, the first field mark in row 5 of the card will be sensed and turn the trigger 607 On. Thereafter, the characters 5, 2 and 3 are scanned and their identity is stored on the drum in the manner previously described.

When the second field mark is detected, an output is supplied from switch 642 through inverter 643 which resets trigger 607, and in addition, steps the field mark ring one step. That is, it causes trigger 971 to be turned Off which turns trigger 972 On. When trigger 972 comes On, a relatively positive signal is supplied therefrom through cathode follower 979 to the Field End hub 2. However, it is noted that the Field End hub 2 is not connected so as to supply an input to trigger 607. Therefore, nothing will be recognized in field F2 of the card. However, when the third field mark is detected, the field mark ring is stepped one step so that trigger 973 is turned On. This produces an output pulse from cathode follower 980 which, through the Field End hub 3 and the Field Start hub B, supplies an output through cathode follower 610 to trigger 612, Fig. 2E. Trigger 612 produces an eleven microsecond output pulse, the trailing edge of which turns trigger 607 On, thus allowing the recognition circuit to identify characters in field F3.

The above-described operation continues on through the fourth field mark which turns trigger 607 Off and steps the ring along. This, in turn, initiates another impulse to turn trigger 607 On. When the fifth field mark is recognized, trigger 607 is turned Off. It will remain in this condition for the remander of the card.

PUNCH INHIBITING CIRCUITS

It will be seen that the row which has been scanned on a card contains six field marks. It is desirable to know that every possible field mark which should have been recognized on that row has been recognized This recognition is accomplished by taking the outputs of cathode followers 977 through 983, Fig. 2D, and supplying them to the two-position diode switches labeled 984 through 990, respectively. The other input to these switches comes from the Field Mark Check hubs labeled 1 through 7, Fig. 2E. Since the total number of field marks which should have been recognized in the row being scanned is six, the two hubs labeled six are connected so that +30 v. D.C. is supplied through hubs 6 to switch 989. If the field mark ring, Fig. 2D, is standing at six, then an output is supplied from switch 989 through a diode 996 to an inverter 998. It will be seen that diode 996 is arranged in OR fashion so that if there is an output from switch 989 this output will be supplied to the inverter.

It will also be seen that switch diode 996 is one of a plurality of diodes arranged in OR fashion which are marked 991 through 997 and connected to receive the outputs of switches 984 through 990, respectively.

If an output is supplied from switch 989 to inverter 998, the inverter will provide a negative output signal through a cathode follower 999 to a two-position diode switch 1000, Fig. 2E, thus holding the switch down. Let it be assumed, however, that an input is not received from the switch 989. It will be readily apparent that inverter 998 will be cut off, since its grid is connected through a resistor to a −100 v. D.C. source. This means that its plate will be relatively positive, which, when connected through cathode follower 999 to switch 1000, will supply a relatively positive input to the switch. When the End of Card Sample signal occurs at terminal 128, Fig. 2B, to produce an eleven microsecond output signal from trigger 350, an output signal will be supplied through switch 1000, Fig. 2E, and cathode follower 1001 to an output terminal which is labeled Field End Check, Fig. 2H.

Referring now to Fig. 50, it will be seen that the Field End Check hub is connected to one side of a relay R47 whose other side is connected to ground. Since it is necessary to remember the fact that an incorrect number of field marks were obtained, on a particular card being scanned, for two more card cycles before the card is punched, it is necessary to provide a sequencing circuit which will produce the output signal at the time the card is being punched. This signal will prevent reading the information from the drum which was placed therein when the card was scanned. This circuit will now be described.

When relay R47 is energized, contact R47a transfers so that the next time cam P20 makes, relay R48(P) will be picked. When R48a transfers, cam P21 makes and energizes R48(H). On the next machine cycle cam P22 makes and picks R49(P) through the transferred contact R48b. Shortly thereafter, R49(H) is energized when cam P23 makes to supply an input thereto through contact R49a. When R49(P) was picked, contact R49b in Fig. 42 opens, thereby preventing any of the Bank inputs from being connected to the Read Bank output terminal. Therefore, it is not possible for the information which is obtained during recognition relative to this card to be read out and punched in the card.

There are other inputs to the Field End Check hub, Fig. 2H, which would cause a card not to be punched. There is a switch provided carrying the reference numeral 1002, Fig. 2G, which is adapted to receive three inputs. The first input to switch 1002 is from trigger 613 by way of cathode follower 632. This input will be a relatively positive signal providing there has been a transition from an all white scan to B5s as previously described. The second input to switch 1002 comes from the field mark crowded left circuit. If capacitor 636 is not charged, indicating that there has been more than three scans since the last B5s, a relatively positive signal will be supplied to the switch by way of inverters 639, 640 and 1003 and cathode follower 1004. The third input to the switch comes from trigger 596. This trigger produces a positive going signal, when it is reset by the first all white scan following the scanning of a character. This signal is fed through a cathode follower 601 to a trigger 602. This trigger produces a thirty microsecond positive output pulse which is used as said third input to switch 1002. Therefore, switch 1002 will produce an output signal if a field mark is crowded left. This output signal is supplied through a cathode follower 1005 to the Field End Check hub, Fig. 2H, and will cause the sequence of operations described with respect to Figs. 42 and 50 to occur at the proper time to prevent punching of the card having the crowded left field mark.

The other alternate input to the Field End Check hub comes from a switch 621, Fig. 2G. This switch will produce an output if a field mark is crowded right. Three inputs are required in coincidence to indicate this condition. The first input to switch 621 is the B5s condition which is obtained from switch 618, Fig. 2H, by way of cathode follower 619. It will be remembered that B5s indicates a scan through a field mark. The second input comes from the left side of trigger 613, Fig. 2G, by way of cathode follower 614. This input will be relatively positive if there has not been a proper progression from an all white scan to a B5s condition. The third input, via inverter 1007 and cathode follower 1008, will be relatively positive if a sufficient charge does not exist on capacitor 625 to cause inverter 628 to conduct. In other words, it has been too long since the last all white scan. If the three inputs to switch 621 are relatively positive in coincidence, a field mark crowded right condition is indicated. The indication of this condition passes through a cathode follower 1006 to the Field End Check hub and will prevent punching of the card in the manner previously described.

Another input to the Field End Check hub comes from a circuit found in Fig. 45. This is the registration detection circuit. Basically, this circuit determines whether a character is out of the field at the top or bottom thereof. The bottom registration is determined by B2s and B2r to a two-position diode switch 1009. It will be appreciated that these inputs may be obtained from the circuits previously described. The B2s input may be obtained from the right side of trigger 413, Fig. 2H, by way of cathode follower 440, Fig. 2J. The B2r input may be obtained from the right side of trigger 425, Fig. 2K, by way of cathode follower 537. If B2s and B2r are in coincidence, an output is supplied through a cathode follower 1010 to serve as an input to a two-position diode switch 1011. The other input to this switch is the End of Scan Sample. Therefore, if B2s and B2r occur in coincidence with the End of Scan Sample, an output is supplied from switch 1011 through an inverter 1012 to a trigger 1013. This trigger can only be reset at End of Character time or by B5r. If trigger 1013 is On, indicating that a portion of the character still exists at the bottom of the scan, an output is supplied through a cathode follower 1014 to a switch 1015. The other input to this switch is the End of Character Sample signal. The output from this switch indicates that the character is out of the field at the bottom thereof. It passes through a cathode follower 1016 to the Field End Check hub, thereby preventing punching of the card.

An alternative circuit for obtaining this indication is that which utilizes $\overline{B3r}$ and B3s Seen. The condition $\overline{B3r}$ is obtained from the left side of trigger 426, Fig. 2K. That is, if trigger 426 is not turned On to indicate B3r, the left plate thereof will be relatively positive and indicate $\overline{B3r}$. The condition B3s Seen may be obtained from the right side of trigger 418, Fig. 2H, by way of cathode follower 467, Fig. 2J. The input $\overline{B3r}$ is changed to B3r by an inverter 1018 and supplied to switch 1017, and B3s Seen is supplied directly to the switch. If these inputs are in coincidence, an output is supplied from switch 1017 through a cathode follower 1019 to the already described switch 1011. Thus, if these conditions exist at End of Scan Sample time an output is supplied to the remainder of the circuit which will supply a signal to the Field End Check hub.

The top out-of-registration signal is obtained from a switch 1020, Fig. 45. The first input to this switch is a forty microsecond pulse obtained from a trigger 1021 which is adapted to receive the End of Scan Gate. The other inputs are Bs and Br which may be obtained from appropriate places in Figs. 2C and 2F, respectively. If the inputs to switch 1020 occur in coincidence, an output is supplied through an inverter 1022 whose plate is tied to inverter 1012. Therefore, inverters 1012 and 1022 form an OR circuit. If there is an output from switch 1020, this signal will be passed on to produce a signal at the Field End Check hub.

ZERO INSERTION

Referring now to Fig. 2E, it will be remembered that each time trigger 607 is turned Off it represents the end of a scan field. Therefore, an output is taken from the left side of this trigger and supplied through a cathode follower 1023 to serve as the Scanned Field End signal. This output is utilized to automatically insert the proper number of zeros to the left of the highest significant digit in a field. Referring now to Fig. 2h, the Scanned Field End signal is supplied to an inverter 1024 which turns a trigger 1025 On, Fig. 2g. This trigger has its right side connected to supply an output through a cathode follower 1026 to serve as one input to a three-position diode switch 1027. The second input to switch 1027 is the Read Bank signal and the third input is received from the right side of trigger 767, Fig. 2l, by way of cathode follower 802. If there is an output from switch 1027, it is supplied through a cathode follower 1028 to inverters 1029, 1030 and 836, Fig. 2j. When these inverters receive a signal, they will set a zero in a three-out-of-six code into the shift register comprising stages 757 through 762.

However, a zero is not entered into the shift register after a Scanned Field End signal providing the total number of characters recognized is equal to the field size. It will be remembered in the previous example that there were only three characters in field F1 but that the field size was for four characters. Therefore, it is necessary to insert one zero to fill up the field. A pluggable unit is provided in Fig. 2g and is illustrated by reference numeral 1031. This pluggable unit contains four sets of plug hubs. Each pair of plug hubs has diodes associated therewith so as to form OR circuits, 1032, 1033, 1034 and 1035. It will be appreciated that if an input signal is supplied to either hub associated with an OR circuit an output will be supplied from that circuit. The output from the OR circuit 1032 is supplied through a cathode follower 1036 to serve as one input to a comparing unit 1037. The other input to said comparing unit is supplied from cathode follower 814 which is associated with the trigger 810 in the four-position character counter Fig. 2k. The OR circuit 1033, Fig. 2g, has its output connected through a cathode follower 1038 to the comparing unit 1039, the other input to this comparing unit being from cathode follower 815 of trigger 811 in the four-position character counter, Fig. 2k. The OR circuit 1034, Fig. 2g, has its output connected through cathode follower 1040 to a comparing unit 1041, the other input to the unit being from cathode follower 816 which receives its input from trigger 812 in the four-position binary counter, Fig. 2k. The OR circuit 1035, Fig. 2g, has its output connected through cathode follower 1042 to serve as one input to comparing unit 1043, the other input thereto being supplied from cathode follower 817 which receives a signal from trigger 813, Fig. 2k.

With the arrangement shown, it will be seen that if a count of one is in the four-position character counter, an input only to OR circuit 1032 will allow a coincidence output from the plates of comparing units 1037, 1039, 1041 and 1043. Similarly, a count of two in the character counter and an input only to OR circuit 1033 will produce an output from the comparing units. It follows that counts of four or eight in the character counter and inputs only to OR circuits 1034 or 1035, respectively, will produce outputs from the comparing units at those counts. In addition, two or more of the OR circuits may be connected to receive inputs at the same time. For example, inputs to both of OR circuits 1034 and 1035, at a time when a count of twelve is in the character counter, will produce an output from the comparing units.

In the card under consideration, the field size for the first field in row 5 was indicated in the example above as being four characters. Thus, a pluggable connection is made between hub 1 of the Field hubs, Fig. 2E, and the OR circuit 1034. The field size of the third field was eight characters. This requires a pluggable connection from hub 3 of the Field hubs and both OR circuits 1034 and 1035, thereby making a total of twelve characters up to this point. It is not necessary to make additional connections for field F4. At the end of this field, zeros will automatically be inserted, if necessary, to produce a total of sixteen characters.

When only three characters are recognized in the first field of the card, the character counter, Fig. 2k, will have a count of three therein. This means that the plates of comparing units 1037, 1039, 1041 and 1043, Fig. 2g, will be down indicating an unequality with the plugging in unit 1031. Thus, the output from the comparing units is inverted by inverter 1044 and supplied through cathode follower 1026 to the switch 1027. This input is allowed to be positive only when a second field mark is recognized to cause a Scanned Field End signal to be supplied through inverter 1024 to set trigger 1025. That is, inverter 1044 is clamped in a conducting condition by trigger 1025 until this trigger is turned On by the Scanned Field End signal. Then, if the inverter wants to cease conduction, it can, thereby producing a relatively positive input to switch 1027. When a Read Bank signal is supplied from the circuit in Fig. 42 to switch 1027, and there is a further input from the "2-4" position trigger 767, Fig. 2i, through cathode follower 802, an output is supplied from the switch through cathode follower 1028 to each of inverters 1029, 1030 and 836, Fig. 2j. Stages 758, 761 and 762 are adapted to have their left sides pulled down by these inverters which turn these stages On, thereby placing the three-out-of-six coding for a zero in the register. Thereafter, the character is read out of the shift register in the same manner as all other characters and stored on the drum in the proper position. Also as before, the storage of the character supplies an input to the character counter, i.e., trigger 810, Fig. 2k, and now the counter has a count of four therein. At this time, there is a match at the comparing units between the character counter and the input from OR circuit 1034, Fig. 2g, causing the plates of the comparing units to supply a positive going signal to inverter 1044. The output from inverter 1044 is a negative going signal which pulls down the right side of trigger 1025, turning it Off, and also clamps switch 1027 off. This clamp on switch 1027 by the comparing units is released as soon as the first character in the third field is recognized and stored in the drum, thus entering another input to the character counter. However, the switch is still held down by trigger 1025.

After all five characters in the third field have been recognized and stored on the drum, the character counter will have a count of nine therein. This, of course, does not match with the count of twelve signals supplied from OR circuits 1034 and 1035. When the end of field F3 is sensed, an input signal Scanned Field End sets trigger 1025 which raises the input therefrom to switch 1027. Since this switch is not clamped Off at this time by the comparing units, i.e., they are not receiving matching inputs, zeros will be entered into the shift register and written on the drum successively until a match is obtained. In the example under consideration, three zeros would have to be entered. After the third zero is entered, the character counter would have a count of twelve therein, thus allowing the comparing units to clamp switch 1027 off and turn trigger 1025 Off.

During the fourth field, four characters would be recognized and the counter would now have received sixteen inputs which returns the counter to zero. Since hub 4 of the Field hubs, Fig. 2E, is not connected to the OR circuits 1032 through 1034, Fig. 2g, the cathode followers 1036, 1038, 1040 and 1042 will receive as inputs the —100 v. D.C. to which their grids are returned, thus cutting them off. Therefore, their outputs to comparing units 1037, 1039, 1041 and 1043, respectively, will be relatively negative. With the character counter at zero, it also will supply relatively negative outputs to the comparing units. Since the inputs to the comparing units match, the plates thereof rise and clamp switch 1027 down, thereby preventing zero insertion. When trigger 1025 attempts to go On by the Scanned Field End signal, it cannot because it is clamped Off by the comparing units.

TRIGGER RESET CIRCUITS

The reset circuits which provide End of Scan Reset, End of Character Reset and End of Card Reset are illustrated in Figs. 46, 47, and 48, respectively. The input to the circuits shown in Fig. 46 is the End of Scan Reset signal supplied from the right side of trigger 439, Fig. 2J, this signal being a positive pulse of thirty microseconds duration. This input signal is used to drive a plurality of diode units 1045, 1046, 1047, 1048, 1049, 1050, 1051, 1052, 1053, 1054, 1055 and 1056 through a plurality of inverters 1057, 1058, 1059, 1060, 1061 and 1062. It will be seen that each inverter drives two diode units. For example, inverter 1057 drives both of diode units 1045 and 1046. The outputs R* from each side of each diode unit are negative pulses of thirty microsecond duration. These pulses are distributed to the various triggers marked with a single asterisk (*) in Figs. 2A through 2q, for pulling the plates of the sides down under which the asterisk is located, thereby resetting them. It should be appreciated that the reason for using a number of the diode units and inverters is to develop sufficient driving power to reset all of the triggers requiring reset. Additionally, the diode units serve as isolation means, The circuit shown in Fig. 47 receives the End of Character Reset signal from the right side of trigger 605, Fig. 2G. This input signal is a positive pulse of thirty microsecond duration. It is used to drive diode units 1063 through 1070 through inverters 1071 through 1076. Here, some of the inverters drive two diode units and others drive only a single diode unit. The outputs R from both sides of the diode units are used to reset those triggers marked with two asterisks (). Inverter 1077 is used directly to reset trigger 506, Fig. 2S.

The input to the circuit shown in Fig. 48 is the End of Card Reset signal from terminal 953, Fig. 43. This is a positive pulse generated by cam P29 which makes at "6" time and breaks at "7" time of the punch. This pulse is used to drive diode units 1078 through 1081 by means of inverters 1082 through 1084. The outputs R* from both sides of these inverters are used to reset those triggers marked with three asterisks (*).

From the preceding description, it will be seen that we have provided a new and improved character sensing system for identifying information characters in selected fields of a record and producing a perforated record with the same information in similarly related fields. The invention includes an arrangement for inserting insignificant characters to the left of the highest order significant digit in an information field which is selected to be sensed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In apparatus for reading characters arranged in fields on a record and producing perforations in said record representative of the characters in selected fields, said apparatus comprising means for feeding a record to a scanning station, means for scanning a plurality of the characters on said record and producing video signals representing the sensing of portions of said characters, a recognition circuit responsive to said video signals for producing character signals indicative of the identity of the characters scanned, a storage device, control circuit means responsive to the recognition of predetermined ones of said characters for selecting those character signals produced in scanning the characters in selected fields of said record, means responsive to said selected character signals for producing manifestations in said storage device representative thereof, perforating means, means for feeding said record from said scanning station to said perforating means, means for reading the manifestations in said storage device representing the selected characters in the record being presented to said perforating means and controlling the last-named means in a manner to perforate said record with indicia arranged in fields corresponding to the characters within said selected fields.

2. In apparatus for reading characters arranged in fields on a record and producing perforations in prescribed fields of said record representative of the characters in selected ones of the character fields, said apparatus comprising means for feeding a record to a scanning station, means at said scanning station for scanning a plurality of the characters on said record and producing video signals representing the sensing of portions of said characters, a recognition circuit responsive to said video signals for producing character signals indicative of the identity of the characters scanned, storage means, control circuit means responsive to the signals produced in the recognition of predetermined ones of said characters for selecting the character signals produced in scanning the characters in predetermined fields of said record, size control means for determining the maximum number of characters which a field may contain, means responsive to character signals in said selected fields for producing manifestations in said storage device representative thereof, means responsive to the number of characters formed in a field for inserting insignificant character manifestations in said storage device equal to the difference between the number of characters identified in a field and the maximum number determined by said size control means, means for reading the manifestations in said storage device representing the selected characters in the record being presented to said perforating means and controlling the last-named means in a manner to perforate said record with indicia arranged in fields corresponding to the characters within said selected fields.

3. In apparatus of the type described, means for feeding documents to a scanning station, said documents having significant characters thereon arranged in fields, means at said scanning station for scanning the significant characters in said fields and producing video signals representative of the sensing of portions of said characters, field selection control means, means including a recognition circuit responsive to said video signals and governed by said field selection control means for producing output signals representative of the identity of the significant characters in the fields selected by said field selection control means, field size control means for determining the maximum number of significant characters which may be found in said selected fields, storage means, and circuit means responsive to said output signals for producing manifestations in said storage means representative of the significant characters in said fields and for producing a number of manifestations of insignificant characters in said storage means equal to the difference between the number of significant characters identified in a field and the maximum number of significant characters which may be found in a field as determined by said field size control means.

4. In apparatus of the type described, means for feeding documents to a scanning station, said documents having significant characters thereon arranged in fields, means at said scanning station for scanning the significant characters in said fields and producing video signals representative of the sensing of portions of said characters, field selection control means, means including a recognition circuit responsive to said video signals and governed by said field selection control means for producing output signals representative of the identity of the significant characters in the fields selected by said field selection control means, field size control means for determining the maximum number of significant characters which may be found in said selected fields, storage means, and circuit means responsive to said output signals for producing manifestations in said storage means representative of the significant characters in said selected fields and for producing a number of manifestations of insignificant characters in said storage means equal to the difference between the number of significant characters identified in a field and the maximum number of significant characters which may be found in a field as determined by said field size control means, said circuit means including means responsive to said field size control means and said field selection control means for producing the manifestations in storage of insignificant characters required for each field immediately following the manifesting of the significant characters of each field.

5. In apparatus of the type described, means for feeding documents to a scanning station, said documents having significant characters thereon arranged in fields, means at said scanning station for scanning the significant characters in said fields and producing video signals representative of the sensing of portions of said characters, field selection control means, means including a recognition circuit responsive to said video signals and governed by said field selection control means for producing output signals representative of the identity of the significant characters in a field selected by said field selection control means, field size control means for determining the maximum number of significant characters which may be found in said selected field, storage means, and circuit means responsive to said output signals for producing manifestations in said storage means representative of the significant characters in said selected field and including means governed by said field size control means for producing a number of manifestations of insignificant characters in said storage means equal to the difference between the number of significant characters identified in said selected field and the maximum number of significant characters which may be found in said selected field as determined by said field size control means.

6. Character reading apparatus comprising means for feeding documents to a scanning station, said documents having fields thereon designated by field characters, said fields having significant characters therein, means at said scanning station for scanning said field characters and said significant characters and producing video signals in response to the scanning operation, a recognition circuit connected to receive and analyze said video signals and to produce output signals representing the identification of the field designating characters, a field selection control circuit, said field selection control circuit comprising means for receiving said output signals and supplying control signals after predetermined ones of said field designating characters are identified, said recognition circuit being governed by said control signals for producing output signals representing the identity of the significant characters within selected fields as determined by said control signals, field size control means for determining the maximum number of significant characters which may be found in said selected fields, and means responsive to said output signals and governed by said field size control means for supplying signals representing the significant characters within each selected field and signals representing insignificant characters immediately following said significant characters equal in number to the difference between the number of significant characters identified in a field and the maximum number of significant characters which may be found in a field as determined by said field size control means.

7. In apparatus of the type described, a sensing station and a punching station, means for feeding records to said sensing station and thereafter to said punching station, said records having characters thereon arranged in fields, means at said sensing station for scanning the characters on said record and producing video signals representative of the sensing of portions of the characters, field selection control means, a recognition circuit responsive to said video signals and governed by said field selection control means for producing output signals representative of the identity of the characters in predetermined ones of said fields as determined by said field selection and control means, cyclically operable storage means having predefined groups of storage positions therein, storage position detecting means, means responsive to said output signals and governed by said storage position detecting means for storing the output signals representing the identity of the characters in the selected fields of successive records in different groups of said storage positions, punch means at said punching station, and means for selecting the signals stored in a particular group of storage positions which represent the identity of the characters in the selected fields of a record being fed to said punch means and controlling said punch means in a manner to cause said punch means to perforate the record with character designations representative of the last-named signals.

8. In apparatus of the type described, a sensing station and a punching station, means for feeding records to said sensing station and thereafter to said punching station, said records having characters thereon, means at said sensing station for scanning the characters on said record and producing video signals representative of the sensing of portions of the characters, a recognition circuit responsive to said video signals for producing output signals representative of the identity of the characters scanned in said record, cyclically operable storage means having predefined groups of storage positions therein, storage position detecting means, means responsive to said output signals and governed by said storage position detecting means for storing the output signals representing the identity of the scanned characters in successive records in different groups of said storage positions, punch means at said punching station, and means for selecting the signals stored in a particular group of storage positions which represent the identity of the characters scanned in a record being fed to said punch means and controlling said punch means in a manner to cause said punch means to perforate the record with character designations representative of the last-named signals.

9. In apparatus of the type described, a sensing station, means for feeding records to said sensing station said records having characters thereon, means at said sensing station for scanning the characters on said record and producing video signals representative of the sensing of portions of the characters, a recognition circuit responsive to said video signals for producing output signals representative of the identity of the characters scanned on said record, cyclically operable storage means having predefined groups of storage positions therein, write register means connected to receive said output signals, storage position detecting means, character position detecting means, and a comparing circuit connected to said storage position detecting means and said character position detecting means for determining the proper time for entering the information in said write register means into said storage means, the information in successive records being stored in different groups of storage positions.

10. In apparatus of the type described, a sensing station and a punching station, means for feeding records to said sensing station and thereafter to said punching station, said records having characters thereon, means at said sensing station for scanning the characters on said record and producing video signals representative of the sensing of portions of the characters, a recognition circuit responsive to said video signals for producing output signals representative of the identity of the characters scanned in said record, cyclically operable storage means having predefined groups of storage positions therein, write register means connected to receive said output signals, storage position detecting means, character position detecting means, a comparing circuit connected to said storage position detecting means and said character position detecting means for determining the proper time for entering the information in said write register means into said storage means, the information in successive records being stored in different groups of storage positions, punch means at said punching station, and means for selecting the signals stored in a particular group of storage positions which represent the identity of the characters scanned in a record being fed to said punch means and controlling said punch means in a manner to cause said punch means to perforate the record with character designations representative of the last-named signals.

11. In apparatus of the type described, a sensing station and a punching station, means for feeding records to said sensing station and thereafter to said punching station, said records having characters thereon, means at said sensing station for scanning the characters on said record and producing video signals representative of the sensing of portions of the characters, a recognition circuit responsive to said video signals for producing output signals representative of the identity of the characters scanned in said record, cyclically operable storage means having predefined groups of storage positions therein, write register means connected to receive said output signals, storage position detecting means, character position detecting means, a comparing circuit connected to said storage position detecting means and said character position detecting means for determining the proper time for entering the information in said write register means into said storage means, the information in successive records being stored in different groups of storage positions, punch means at said punching station, said punch means supplying signals representing the character designations which it is ready to produce in a record supplied thereto, means for reading the information in said storage means and producing signals which represent the identity of the characters scanned in the record supplied to said punch means, a comparing circuit connected to receive the signals from said punch means and the reading means and supplying a punch signal when there is a coincidence therebetween, and means responsive to said punch signal for producing character designations in said record indicative of the identity of the signals supplied to the last-mentioned comparing circuit.

12. In apparatus of the type described, a sensing station, means for feeding records to said sensing station said records having characters thereon, means at said sensing station for scanning the characters on said record and producing video signals representative of the sensing of portions of the characters, a recognition circuit responsive to said video signals for producing output signals representative of the identity of the characters scanned on said record, cyclically operable storage means which is divided into a plurality of sectors of equal storage capacity, each sector being divided into a plurality of sequential character groups, each sequential character group being divided into a plurality of character storage positions for characters in successive records, write register means connected to receive said output signals, means for manifesting data in said storage means in response to the output from said write register, and means for controlling said write register means for determining the proper time for entering the output from said write register means into said storage means so that the characters identified on a record may be stored in similarly situated storage positions in a character group and each successive character stored in ordered character groups in any one of said sectors.

References Cited in the file of this patent

UNITED STATES PATENTS

| | | |
|---|---|---|
| 2,379,880 | Burgess | July 10, 1945 |
| 2,616,983 | Zworykin | Nov. 4, 1952 |
| 2,723,308 | Vroom | Nov. 8, 1955 |
| 2,738,499 | Sprick | Mar. 13, 1956 |

OTHER REFERENCES

"Photoelectric Reader Feeds Business Machines," by Shepard and Heasly, "Electronics," May 1955.